US008578419B2

(12) United States Patent
Bayrakeri et al.

(10) Patent No.: US 8,578,419 B2
(45) Date of Patent: *Nov. 5, 2013

(54) SERVER-CENTRIC CUSTOMIZED INTERACTIVE PROGRAM GUIDE IN AN INTERACTIVE TELEVISION ENVIRONMENT

(75) Inventors: Sadik Bayrakeri, Foster City, CA (US); Donald F. Gordon, Los Altos, CA (US); John P. Comito, Redwood City, CA (US); Edward A. Ludvig, Redwood City, CA (US); Harold P. Yocom, Fremont, CA (US); Jeremy S. Edmonds, Redwood City, CA (US); Eugene Gershtein, Redwood City, CA (US)

(73) Assignee: Comcast IP Holdings I, LLC, Wilmington, DE (US)

(*) Notice: Subject to any disclaimer, the term of this patent is extended or adjusted under 35 U.S.C. 154(b) by 1292 days.

This patent is subject to a terminal disclaimer.

(21) Appl. No.: 11/059,055

(22) Filed: Feb. 16, 2005

(65) Prior Publication Data
US 2005/0155063 A1 Jul. 14, 2005

Related U.S. Application Data

(63) Continuation of application No. 09/605,522, filed on Jun. 27, 2000, now Pat. No. 6,904,610, which is a continuation-in-part of application No. 09/293,526, filed on Apr. 15, 1999, now Pat. No. 6,754,905, and a continuation-in-part of application No. 09/359,559, filed on Jul. 22, 1999, now abandoned, and a continuation-in-part of application No. 09/384,394, filed on Aug. 27, 1999, now Pat. No. 6,621,870, and a continuation-in-part of application No. 09/602,547, filed on Jun. 21, 2000, now Pat. No. 6,704,359.

(60) Provisional application No. 60/141,334, filed on Jun. 28, 1999.

(51) Int. Cl.
G06F 3/00 (2006.01)
G06F 13/00 (2006.01)
H04N 5/445 (2011.01)
H04N 7/173 (2011.01)

(52) U.S. Cl.
USPC .......... 725/47; 725/39; 725/41; 725/44; 725/52; 725/61; 725/105; 725/114

(58) Field of Classification Search
USPC .......... 725/39, 40, 43, 46, 47, 49, 52, 61, 82, 725/91, 103, 138, 144
See application file for complete search history.

(56) References Cited

U.S. PATENT DOCUMENTS

| 3,754,211 A | 8/1973 | Rocher et al. |
| 4,213,124 A | 7/1980 | Barda et al. |

(Continued)

FOREIGN PATENT DOCUMENTS

| EP | 0721253 A2 | 7/1996 |
| EP | 0725539 A2 | 8/1996 |

(Continued)

OTHER PUBLICATIONS

U.S. Appl. No. 09/357,941, filed Jul. 1999, Knudson et al.*

(Continued)

Primary Examiner — Nasser Goddarzi
Assistant Examiner — Mary A Kay
(74) Attorney, Agent, or Firm — Banner & Witcoff, Ltd.

(57) ABSTRACT

Techniques to create, generate, and deliver customized interactive program guide (custom-IPG). In one embodiment, selections indicative of a set of channels to be included in the custom-IPG are received. In response, one or more custom-IPG screens including the set of selected channels are rendered at a headend. Custom-IPG screens can be formed as subsets of the regular IPG screens, or as new screens. The rendered custom-IPG screens are provided from the head end to a set top terminal upon receiving a viewer request for the custom-IPG. Commands indicative of a particular location at which to overlay the custom-IPG screens may also be received, and the custom-IPG screens are re-rendered at the indicated location. Custom-IPG screens can be overlaid on a video sequence provided on a particular channel being viewed, used to carry regular program guide, or a channel independent of the channel used to carry regular programming and program guide.

22 Claims, 26 Drawing Sheets

(56) References Cited

U.S. PATENT DOCUMENTS

| | | | |
|---|---|---|---|
| 4,250,521 A | 2/1981 | Wright | |
| 4,290,063 A | 9/1981 | Traster | |
| 4,381,522 A * | 4/1983 | Lambert | 725/93 |
| 4,437,093 A | 3/1984 | Bradley | 340/726 |
| 4,479,142 A | 10/1984 | Buschman et al. | |
| 4,496,976 A | 1/1985 | Swanson et al. | 358/147 |
| 4,520,356 A | 5/1985 | O'Keefe et al. | |
| 4,520,921 A | 6/1985 | Vissing | |
| 4,567,512 A | 1/1986 | Abraham | |
| RE32,187 E | 6/1986 | Barda et al. | |
| 4,600,921 A | 7/1986 | Thomas | 340/825.31 |
| 4,633,297 A | 12/1986 | Skerlos et al. | 358/22 |
| 4,706,121 A | 11/1987 | Young | 358/142 |
| 4,712,239 A | 12/1987 | Frezza et al. | 380/20 |
| 4,734,764 A | 3/1988 | Pocock et al. | 358/86 |
| 4,739,318 A | 4/1988 | Cohen | 340/750 |
| 4,742,344 A | 5/1988 | Nakagawa et al. | 340/723 |
| 4,745,468 A | 5/1988 | Von Kohorn | 358/84 |
| 4,751,578 A | 6/1988 | Reiter et al. | 358/183 |
| 4,792,848 A | 12/1988 | Nussrallah et al. | 358/86 |
| 4,792,849 A | 12/1988 | McCalley et al. | 358/86 |
| 4,829,372 A | 5/1989 | McCalley et al. | 358/86 |
| 4,829,569 A | 5/1989 | Seth-Smith et al. | 380/10 |
| 4,847,825 A | 7/1989 | Levine | 369/47 |
| 4,860,123 A | 8/1989 | McCalley et al. | 358/342 |
| 4,866,770 A | 9/1989 | Seth-Smith et al. | 380/20 |
| 4,876,592 A | 10/1989 | Von Kohorn | 358/84 |
| 4,884,267 A | 11/1989 | Miyamoto et al. | |
| 4,885,775 A | 12/1989 | Lucas | 380/10 |
| 4,890,321 A | 12/1989 | Seth-Smith et al. | 380/20 |
| 4,905,094 A | 2/1990 | Pocock et al. | 358/342 |
| 4,908,713 A | 3/1990 | Levine | 358/335 |
| 4,926,255 A | 5/1990 | Von Kohorn | 358/84 |
| 4,941,040 A | 7/1990 | Pocock et al. | 358/86 |
| 4,963,994 A | 10/1990 | Levine | 358/335 |
| 4,977,455 A | 12/1990 | Young | 358/142 |
| 4,991,011 A | 2/1991 | Johnson et al. | 358/141 |
| 4,994,908 A | 2/1991 | Kuban et al. | 358/86 |
| 4,994,909 A | 2/1991 | Graves et al. | |
| 5,014,125 A | 5/1991 | Pocock et al. | 358/86 |
| 5,027,400 A | 6/1991 | Baji et al. | |
| 5,034,807 A | 7/1991 | Von Kohorn | 358/84 |
| 5,038,211 A | 8/1991 | Hallenbeck | 358/142 |
| 5,057,915 A | 10/1991 | Von Kohorn | 358/84 |
| 5,058,160 A | 10/1991 | Banker et al. | 380/20 |
| 5,070,400 A | 12/1991 | Lieberman | |
| 5,109,279 A | 4/1992 | Ando | 358/147 |
| 5,113,496 A | 5/1992 | McCalley et al. | 395/200 |
| 5,119,188 A | 6/1992 | McCalley et al. | 358/86 |
| 5,123,046 A | 6/1992 | Levine | 380/10 |
| 5,128,752 A | 7/1992 | Von Kohorn | 358/84 |
| 5,130,792 A | 7/1992 | Tindell et al. | |
| 5,146,210 A | 9/1992 | Heberle | 340/709 |
| 5,151,789 A | 9/1992 | Young | 358/194.1 |
| 5,153,763 A | 10/1992 | Pidgeon | |
| 5,182,640 A | 1/1993 | Takano | |
| 5,191,410 A | 3/1993 | McCalley et al. | 358/86 |
| 5,195,092 A | 3/1993 | Wilson et al. | 370/94.2 |
| 5,208,665 A | 5/1993 | McCalley et al. | 358/86 |
| 5,227,874 A | 7/1993 | Von Kohorn | 358/84 |
| 5,231,665 A | 7/1993 | Auld et al. | 380/20 |
| 5,239,540 A | 8/1993 | Rovira et al. | 370/77 |
| 5,247,364 A | 9/1993 | Banker et al. | 358/191.1 |
| 5,249,044 A | 9/1993 | Von Kohorn | 358/86 |
| 5,260,778 A | 11/1993 | Kauffman et al. | 358/86 |
| 5,270,809 A | 12/1993 | Gammie et al. | 358/84 |
| 5,283,734 A | 2/1994 | Von Kohorn | 364/412 |
| 5,293,357 A | 3/1994 | Hallenbeck | 348/734 |
| 5,297,204 A | 3/1994 | Levine | 380/10 |
| 5,301,028 A | 4/1994 | Banker et al. | 348/570 |
| 5,303,295 A | 4/1994 | West et al. | 380/10 |
| 5,307,173 A | 4/1994 | Yuen et al. | 358/335 |
| 5,317,391 A | 5/1994 | Banker et al. | |
| 5,319,454 A | 6/1994 | Schutte | 348/5.5 |
| 5,319,455 A | 6/1994 | Hoarty et al. | |
| 5,319,707 A | 6/1994 | Wasilewski et al. | 380/14 |
| 5,335,079 A | 8/1994 | Yuen et al. | 358/335 |
| 5,351,075 A | 9/1994 | Herz et al. | |
| 5,353,121 A | 10/1994 | Young et al. | 348/563 |
| 5,357,276 A | 10/1994 | Banker et al. | |
| 5,359,601 A | 10/1994 | Wasilewski et al. | |
| 5,361,091 A | 11/1994 | Hoarty et al. | |
| 5,365,282 A | 11/1994 | Levine | 348/734 |
| 5,373,330 A | 12/1994 | Levine | 348/734 |
| 5,376,969 A | 12/1994 | Zdepski | |
| 5,382,983 A | 1/1995 | Kwoh et al. | 348/716 |
| 5,400,401 A | 3/1995 | Wasilewski et al. | 380/9 |
| 5,400,402 A | 3/1995 | Garfinkle | |
| 5,406,558 A | 4/1995 | Rovira et al. | 370/77 |
| 5,410,367 A | 4/1995 | Zahavi et al. | |
| 5,414,448 A | 5/1995 | Wada et al. | 345/194 |
| 5,414,756 A | 5/1995 | Levine | 379/67 |
| 5,420,647 A | 5/1995 | Levine | 348/734 |
| 5,420,866 A | 5/1995 | Wasilewski | |
| 5,422,674 A * | 6/1995 | Hooper et al. | 375/240.15 |
| 5,428,404 A | 6/1995 | Ingram et al. | 348/726 |
| 5,438,370 A | 8/1995 | Primiano et al. | 348/476 |
| 5,440,632 A | 8/1995 | Bacon et al. | 380/20 |
| 5,448,568 A | 9/1995 | Delpuch et al. | |
| 5,473,609 A | 12/1995 | Chaney | 370/94.1 |
| 5,473,704 A | 12/1995 | Abe | 382/235 |
| 5,475,382 A | 12/1995 | Yuen et al. | 340/825.72 |
| 5,477,262 A | 12/1995 | Banker et al. | 348/7 |
| 5,479,266 A | 12/1995 | Young et al. | 358/335 |
| 5,479,268 A | 12/1995 | Young et al. | 358/335 |
| 5,481,542 A | 1/1996 | Logston et al. | |
| 5,483,287 A | 1/1996 | Siracusa | |
| 5,485,197 A | 1/1996 | Hoarty | |
| 5,485,221 A | 1/1996 | Banker et al. | 348/563 |
| 5,488,409 A | 1/1996 | Yuen et al. | 348/5 |
| 5,493,339 A | 2/1996 | Birch et al. | 348/461 |
| 5,493,638 A | 2/1996 | Hooper et al. | |
| 5,500,933 A | 3/1996 | Schnorr | |
| 5,502,504 A | 3/1996 | Marshall et al. | 348/565 |
| 5,508,815 A | 4/1996 | Levine | 358/335 |
| 5,515,106 A | 5/1996 | Chaney et al. | |
| 5,515,173 A | 5/1996 | Mankovitz et al. | 358/335 |
| 5,517,257 A | 5/1996 | Dunn et al. | |
| 5,523,794 A * | 6/1996 | Mankovitz et al. | 705/14.26 |
| 5,523,796 A | 6/1996 | Marshall et al. | 348/589 |
| 5,526,034 A | 6/1996 | Hoarty et al. | |
| 5,530,754 A | 6/1996 | Garfinkle | |
| 5,532,732 A | 7/1996 | Yuen et al. | 348/1 |
| 5,532,754 A | 7/1996 | Young et al. | 348/569 |
| 5,534,944 A | 7/1996 | Egawa et al. | |
| 5,539,391 A | 7/1996 | Yuen | 340/825.72 |
| 5,539,822 A | 7/1996 | Lett | 380/20 |
| 5,543,852 A | 8/1996 | Yuen et al. | 348/478 |
| 5,543,853 A | 8/1996 | Haskell et al. | |
| 5,544,161 A * | 8/1996 | Bigham et al. | 370/397 |
| 5,550,576 A | 8/1996 | Klosterman | 348/6 |
| 5,550,863 A | 8/1996 | Yurt et al. | |
| 5,552,837 A | 9/1996 | Mankovitz | 348/734 |
| 5,553,123 A | 9/1996 | Chan et al. | 379/102 |
| 5,559,548 A | 9/1996 | Davis et al. | |
| 5,559,549 A | 9/1996 | Hendricks et al. | 348/6 |
| 5,559,550 A | 9/1996 | Mankovitz | 348/6 |
| 5,559,870 A | 9/1996 | Patton et al. | 379/107 |
| 5,568,272 A | 10/1996 | Levine | 386/48 |
| 5,579,055 A | 11/1996 | Hamilton et al. | 348/476 |
| 5,579,057 A | 11/1996 | Banker et al. | 348/589 |
| 5,581,614 A | 12/1996 | Ng et al. | 380/20 |
| 5,583,560 A | 12/1996 | Florin et al. | |
| 5,583,576 A | 12/1996 | Perlman et al. | |
| 5,585,838 A * | 12/1996 | Lawler et al. | 725/54 |
| 5,585,865 A | 12/1996 | Armano et al. | |
| 5,585,866 A | 12/1996 | Miller et al. | |
| 5,589,892 A | 12/1996 | Knee et al. | |
| 5,592,551 A | 1/1997 | Lett et al. | 380/20 |
| 5,594,509 A | 1/1997 | Florin et al. | |
| 5,596,373 A | 1/1997 | White et al. | |
| 5,598,415 A | 1/1997 | Nuber et al. | |
| 5,598,525 A | 1/1997 | Nally et al. | |
| 5,600,364 A | 2/1997 | Hendricks et al. | |

(56) References Cited

U.S. PATENT DOCUMENTS

| | | | |
|---|---|---|---|
| 5,600,378 A | 2/1997 | Wasilewski et al. | 348/468 |
| 5,600,711 A | 2/1997 | Yuen | 379/102 |
| 5,604,528 A | 2/1997 | Edwards et al. | 348/5.5 |
| 5,619,247 A | 4/1997 | Russo | 348/3 |
| 5,619,249 A | 4/1997 | Billock et al. | |
| 5,619,269 A | 4/1997 | Lee et al. | |
| 5,619,274 A | 4/1997 | Roop et al. | 348/46.1 |
| 5,619,337 A | 4/1997 | Naimpally | |
| 5,619,383 A | 4/1997 | Ngai | 360/20 |
| 5,621,579 A | 4/1997 | Yuen | 386/121 |
| 5,623,308 A | 4/1997 | Civanlar et al. | |
| 5,625,405 A | 4/1997 | DuLac et al. | |
| 5,625,406 A | 4/1997 | Newberry et al. | |
| 5,630,119 A | 5/1997 | Aristides et al. | 395/601 |
| 5,633,683 A | 5/1997 | Rosengren et al. | |
| 5,633,810 A | 5/1997 | Mandal et al. | |
| 5,635,978 A | 6/1997 | Alten et al. | |
| 5,635,989 A | 6/1997 | Rothmuller | |
| 5,639,350 A | 6/1997 | Aula et al. | |
| 5,644,354 A | 7/1997 | Thompson et al. | 348/13 |
| 5,652,614 A | 7/1997 | Okabayashi | |
| 5,652,615 A | 7/1997 | Bryant et al. | |
| 5,657,072 A | 8/1997 | Aristides et al. | |
| 5,659,350 A | 8/1997 | Hendricks et al. | |
| 5,659,367 A | 8/1997 | Yuen | 348/465 |
| 5,666,487 A | 9/1997 | Goodman et al. | |
| 5,666,645 A | 9/1997 | Thomas et al. | |
| 5,668,599 A | 9/1997 | Cheney et al. | |
| 5,673,089 A | 9/1997 | Yuen et al. | 604/95 |
| 5,675,575 A | 10/1997 | Wall, Jr. et al. | 370/326 |
| 5,682,511 A | 10/1997 | Sposato et al. | |
| 5,684,525 A | 11/1997 | Klosterman | 348/12 |
| 5,687,331 A | 11/1997 | Volk et al. | |
| 5,692,214 A | 11/1997 | Levine | 395/833 |
| 5,694,176 A | 12/1997 | Bruette et al. | 348/563 |
| 5,699,107 A | 12/1997 | Lawler et al. | |
| 5,701,383 A | 12/1997 | Russo et al. | 386/46 |
| 5,701,610 A | 12/1997 | Hsu | |
| 5,703,877 A | 12/1997 | Nuber et al. | |
| 5,710,601 A | 1/1998 | Marshall et al. | 348/564 |
| 5,710,610 A | 1/1998 | Kim | |
| 5,714,273 A | 2/1998 | Wake et al. | |
| 5,715,515 A | 2/1998 | Akins, III et al. | 455/4.1 |
| 5,716,273 A | 2/1998 | Yuen | 463/29 |
| 5,719,646 A | 2/1998 | Kikuchi et al. | |
| 5,724,203 A | 3/1998 | Kwoh et al. | 360/72.3 |
| 5,724,525 A | 3/1998 | Beyers, II et al. | 395/240 |
| 5,724,543 A | 3/1998 | Ozden et al. | |
| 5,724,646 A | 3/1998 | Ganek et al. | |
| 5,727,060 A | 3/1998 | Young | 380/10 |
| 5,729,549 A | 3/1998 | Kostreski et al. | |
| 5,731,844 A | 3/1998 | Rauch et al. | 348/563 |
| 5,732,217 A | 3/1998 | Emura | |
| 5,734,589 A | 3/1998 | Kostreski et al. | |
| 5,745,710 A | 4/1998 | Clanton, III et al. | |
| 5,751,282 A | 5/1998 | Girard et al. | 345/327 |
| 5,754,783 A | 5/1998 | Mendelson et al. | |
| 5,754,940 A | 5/1998 | Smith et al. | 455/5.1 |
| 5,757,416 A | 5/1998 | Birch et al. | 348/6 |
| 5,758,257 A * | 5/1998 | Herz et al. | 725/116 |
| 5,758,259 A | 5/1998 | Lawler | |
| 5,764,739 A | 6/1998 | Patton et al. | 379/106.03 |
| 5,768,491 A | 6/1998 | Lobodzinski et al. | |
| 5,768,539 A | 6/1998 | Metz et al. | |
| 5,768,551 A | 6/1998 | Bleiweiss et al. | |
| 5,771,064 A | 6/1998 | Lett | 348/10 |
| 5,780,474 A | 7/1998 | Peglion et al. | |
| 5,781,228 A | 7/1998 | Sposato | |
| 5,784,095 A | 7/1998 | Robbins et al. | |
| 5,790,172 A | 8/1998 | Imanaka | |
| 5,790,198 A | 8/1998 | Roop et al. | 348/460 |
| 5,790,806 A | 8/1998 | Koperda | 395/200.82 |
| 5,793,364 A | 8/1998 | Bolanos et al. | |
| 5,793,410 A | 8/1998 | Rao | |
| 5,793,438 A | 8/1998 | Bedard | 348/569 |
| 5,798,785 A | 8/1998 | Hendricks | |
| 5,801,747 A | 9/1998 | Bedard | 348/1 |
| 5,801,753 A | 9/1998 | Eyer | 348/13 |
| 5,801,787 A | 9/1998 | Schein et al. | 348/569 |
| 5,802,063 A | 9/1998 | Deiss | |
| 5,805,155 A | 9/1998 | Allibhoy et al. | |
| 5,805,204 A | 9/1998 | Thompson et al. | 348/13 |
| 5,805,762 A | 9/1998 | Boyce | |
| 5,805,763 A | 9/1998 | Lawler et al. | |
| 5,808,608 A * | 9/1998 | Young et al. | 725/52 |
| 5,809,204 A | 9/1998 | Young et al. | 386/83 |
| 5,812,123 A | 9/1998 | Rowe et al. | |
| 5,812,205 A | 9/1998 | Milnes et al. | 348/460 |
| 5,812,754 A | 9/1998 | Lui et al. | |
| 5,815,145 A | 9/1998 | Matthews, III | |
| 5,818,438 A | 10/1998 | Howe et al. | |
| 5,818,439 A | 10/1998 | Nagasaka et al. | |
| 5,822,014 A | 10/1998 | Steyer et al. | |
| 5,822,123 A | 10/1998 | Davis et al. | |
| 5,822,324 A | 10/1998 | Kostresti et al. | |
| 5,826,110 A | 10/1998 | Ozden et al. | |
| 5,828,420 A | 10/1998 | Marshall et al. | 348/564 |
| 5,828,945 A | 10/1998 | Klosterman | 455/4.2 |
| RE35,954 E | 11/1998 | Levine | 380/10 |
| 5,835,792 A | 11/1998 | Wise | |
| 5,838,383 A | 11/1998 | Chimoto et al. | |
| 5,838,678 A | 11/1998 | Davis et al. | |
| 5,838,873 A | 11/1998 | Blatter et al. | |
| 5,841,433 A | 11/1998 | Chaney | |
| 5,844,600 A | 12/1998 | Kerr | |
| 5,844,620 A * | 12/1998 | Coleman et al. | 725/54 |
| 5,847,771 A | 12/1998 | Cloutier et al. | |
| 5,850,218 A | 12/1998 | Lajoie et al. | 345/327 |
| 5,850,232 A | 12/1998 | Engstrom et al. | |
| 5,852,478 A | 12/1998 | Kwoh | 348/734 |
| 5,854,840 A | 12/1998 | Cannella, Jr. | 380/9 |
| 5,859,660 A | 1/1999 | Perkins et al. | |
| 5,859,949 A | 1/1999 | Yanagihara | |
| 5,861,881 A | 1/1999 | Freeman et al. | |
| 5,861,906 A | 1/1999 | Dunn et al. | |
| 5,867,208 A | 2/1999 | McLaren | |
| 5,870,150 A | 2/1999 | Yuen | 348/553 |
| 5,870,474 A | 2/1999 | Wasilewski et al. | 380/21 |
| 5,880,768 A * | 3/1999 | Lemmons et al. | 725/41 |
| 5,892,508 A | 4/1999 | Howe et al. | |
| 5,894,328 A | 4/1999 | Negishi | |
| 5,903,314 A | 5/1999 | Niijima et al. | |
| 5,903,816 A | 5/1999 | Broadwin et al. | |
| 5,907,323 A | 5/1999 | Lawler et al. | |
| 5,914,757 A | 6/1999 | Dean et al. | |
| 5,915,068 A | 6/1999 | Levine | 386/83 |
| 5,917,830 A | 6/1999 | Chen et al. | |
| 5,926,230 A | 7/1999 | Niijima et al. | |
| 5,933,141 A | 8/1999 | Smith | |
| 5,940,073 A | 8/1999 | Klosterman et al. | |
| 5,940,738 A | 8/1999 | Rao et al. | |
| 5,945,987 A | 8/1999 | Dunn | |
| 5,949,476 A | 9/1999 | Pocock et al. | 348/24 |
| 5,949,792 A | 9/1999 | Yasuda et al. | |
| 5,951,639 A | 9/1999 | McInnis | |
| 5,956,088 A | 9/1999 | Shen et al. | |
| 5,966,120 A | 10/1999 | Arazi et al. | |
| 5,966,162 A | 10/1999 | Goode et al. | |
| 5,978,043 A | 11/1999 | Blonstein et al. | |
| 5,978,855 A | 11/1999 | Metz et al. | |
| 5,982,445 A | 11/1999 | Eyer et al. | |
| 5,986,650 A | 11/1999 | Ellis et al. | |
| 5,987,245 A | 11/1999 | Gish | |
| 5,990,927 A | 11/1999 | Hendricks et al. | |
| 5,990,972 A | 11/1999 | Bond-Harris et al. | |
| 5,991,799 A | 11/1999 | Yen et al. | |
| 5,995,095 A | 11/1999 | Ratakonda | |
| 5,999,173 A | 12/1999 | Ubillos | |
| 6,002,394 A | 12/1999 | Schein et al. | |
| 6,002,444 A | 12/1999 | Marshall et al. | |
| 6,005,561 A | 12/1999 | Hawkins et al. | 345/327 |
| 6,005,562 A | 12/1999 | Shiga et al. | |
| 6,005,565 A | 12/1999 | Legall et al. | |
| 6,005,601 A | 12/1999 | Ohkura et al. | |

(56) References Cited

U.S. PATENT DOCUMENTS

| | | |
|---|---|---|
| 6,005,631 A | 12/1999 | Anderson et al. |
| 6,006,256 A | 12/1999 | Zdepski et al. |
| 6,008,803 A | 12/1999 | Rowe et al. |
| 6,014,184 A | 1/2000 | Knee et al. |
| 6,014,368 A | 1/2000 | Sanami |
| 6,016,144 A | 1/2000 | Blonstein et al. |
| 6,018,372 A | 1/2000 | Etheredge |
| 6,022,223 A | 2/2000 | Taniguchi et al. |
| 6,025,837 A | 2/2000 | Matthews, III et al. |
| 6,029,045 A | 2/2000 | Picco et al. |
| 6,034,677 A | 3/2000 | Noguchi et al. |
| 6,038,000 A | 3/2000 | Hurst, Jr. |
| 6,040,867 A | 3/2000 | Bando et al. |
| 6,044,396 A | 3/2000 | Adams |
| 6,049,831 A | 4/2000 | Gardell et al. |
| 6,061,097 A | 5/2000 | Satterfield |
| 6,061,399 A | 5/2000 | Lyons et al. |
| 6,061,451 A | 5/2000 | Muratani et al. |
| 6,062,868 A | 5/2000 | Toriumi |
| 6,064,376 A | 5/2000 | Berezowski et al. |
| 6,075,575 A | 6/2000 | Schein et al. |
| 6,104,391 A | 8/2000 | Johnston, Jr. et al. |
| 6,128,009 A | 10/2000 | Ohkura et al. |
| 6,130,898 A | 10/2000 | Kostreski et al. |
| 6,131,161 A | 10/2000 | Linnartz |
| 6,141,003 A | 10/2000 | Chor et al. |
| 6,141,385 A | 10/2000 | Yamaji |
| 6,141,448 A | 10/2000 | Khansari et al. |
| 6,151,059 A | 11/2000 | Schein et al. |
| 6,157,673 A | 12/2000 | Cuccia |
| 6,160,545 A | 12/2000 | Eyer et al. |
| 6,160,546 A | 12/2000 | Thompson et al. |
| 6,163,316 A | 12/2000 | Killian |
| 6,163,345 A | 12/2000 | Noguchi et al. |
| 6,167,188 A | 12/2000 | Young et al. |
| 6,169,843 B1 | 1/2001 | Lenihan et al. |
| 6,172,674 B1 | 1/2001 | Etheredge |
| 6,172,677 B1 | 1/2001 | Stautner et al. |
| 6,172,687 B1 | 1/2001 | Kitamura et al. |
| 6,173,330 B1 | 1/2001 | Guo et al. |
| 6,177,930 B1 | 1/2001 | Chernock et al. |
| 6,177,931 B1 | 1/2001 | Alexander |
| 6,182,287 B1 | 1/2001 | Schneidewend et al. |
| 6,188,725 B1 | 2/2001 | Sugiyama |
| 6,191,782 B1 | 2/2001 | Mori et al. |
| 6,198,478 B1 | 3/2001 | Ota et al. |
| 6,201,536 B1 * | 3/2001 | Hendricks et al. ............ 715/716 |
| 6,208,335 B1 | 3/2001 | Gordon et al. |
| 6,209,129 B1 | 3/2001 | Carr et al. |
| 6,209,130 B1 | 3/2001 | Rector, Jr. et al. |
| 6,212,680 B1 | 4/2001 | Tsinberg et al. |
| 6,212,860 B1 | 4/2001 | Preisner et al. |
| 6,222,531 B1 | 4/2001 | Smith |
| 6,230,322 B1 | 5/2001 | Saib et al. |
| 6,230,324 B1 | 5/2001 | Tomita et al. |
| 6,239,794 B1 | 5/2001 | Yuen et al. |
| 6,240,555 B1 * | 5/2001 | Shoff et al. .................. 725/110 |
| 6,243,142 B1 | 6/2001 | Mugura et al. |
| 6,256,785 B1 | 7/2001 | Klappert et al. |
| 6,259,487 B1 | 7/2001 | Bril |
| 6,260,192 B1 | 7/2001 | Rosin et al. |
| 6,262,722 B1 | 7/2001 | Allison et al. |
| 6,263,501 B1 | 7/2001 | Schein et al. |
| 6,268,849 B1 | 7/2001 | Boyer et al. |
| 6,288,738 B1 | 9/2001 | Dureau et al. |
| 6,298,482 B1 | 10/2001 | Seidman et al. |
| 6,305,016 B1 | 10/2001 | Marshall et al. |
| 6,357,043 B1 * | 3/2002 | Ellis et al. ...................... 725/61 |
| 6,357,046 B1 | 3/2002 | Thompson et al. |
| 6,359,910 B1 | 3/2002 | Takahashi |
| 6,385,771 B1 | 5/2002 | Gordon |
| 6,388,714 B1 | 5/2002 | Schein et al. |
| 6,389,477 B1 | 5/2002 | Simmon et al. |
| 6,401,242 B1 | 6/2002 | Eyer et al. |
| 6,404,818 B1 | 6/2002 | Obikane |
| 6,405,371 B1 | 6/2002 | Oosterhout et al. |
| 6,414,970 B1 | 7/2002 | Negishi et al. |
| 6,415,437 B1 | 7/2002 | Ludvig et al. |
| 6,421,067 B1 | 7/2002 | Kamen et al. |
| 6,421,359 B1 | 7/2002 | Bennett et al. |
| 6,425,133 B1 | 7/2002 | Leary |
| 6,426,779 B1 | 7/2002 | Noguchi et al. |
| 6,442,755 B1 | 8/2002 | Lemmons et al. |
| 6,449,654 B1 | 9/2002 | Blackwell et al. |
| 6,453,471 B1 | 9/2002 | Klosterman |
| 6,456,782 B1 | 9/2002 | Kubota et al. |
| 6,457,010 B1 | 9/2002 | Eldering et al. |
| 6,459,427 B1 | 10/2002 | Mao et al. |
| 6,460,018 B1 | 10/2002 | Kasai et al. |
| 6,460,181 B1 | 10/2002 | Donnelly |
| 6,463,586 B1 | 10/2002 | Jerding |
| 6,469,753 B1 | 10/2002 | Klosterman et al. |
| 6,470,460 B1 | 10/2002 | Kashiwagi et al. |
| 6,473,425 B1 | 10/2002 | Bellaton et al. |
| 6,473,804 B1 | 10/2002 | Kaiser et al. |
| 6,477,705 B1 | 11/2002 | Yuen et al. |
| 6,481,010 B2 | 11/2002 | Nishikawa et al. |
| 6,481,011 B1 | 11/2002 | Lemmons |
| 6,481,012 B1 | 11/2002 | Gordon et al. |
| 6,487,722 B1 | 11/2002 | Okura et al. |
| 6,490,728 B1 | 12/2002 | Kitazato et al. |
| 6,510,152 B1 | 1/2003 | Gerszberg et al. |
| 6,510,555 B1 | 1/2003 | Tsurumoto |
| 6,515,680 B1 | 2/2003 | Hendricks et al. |
| 6,518,986 B1 | 2/2003 | Mugura |
| 6,519,009 B1 | 2/2003 | Hanaya et al. |
| 6,526,577 B1 | 2/2003 | Knudson et al. |
| 6,530,082 B1 | 3/2003 | Del Sesto et al. |
| 6,532,590 B1 | 3/2003 | Chimoto |
| 6,542,518 B1 | 4/2003 | Miyazawa |
| 6,567,106 B1 | 5/2003 | Wugofski |
| 6,573,942 B1 | 6/2003 | Crinon |
| 6,577,350 B1 | 6/2003 | Proehl et al. |
| 6,578,201 B1 | 6/2003 | LaRocca et al. |
| 6,580,441 B2 | 6/2003 | Schileru-Key |
| 6,584,125 B1 | 6/2003 | Katto |
| 6,584,153 B1 | 6/2003 | Gordon et al. |
| 6,588,014 B1 | 7/2003 | Hayashi |
| 6,594,271 B1 | 7/2003 | Wu et al. |
| 6,606,746 B1 | 8/2003 | Zdepski et al. |
| 6,621,870 B1 | 9/2003 | Gordon et al. |
| 6,625,810 B1 | 9/2003 | Murphy et al. |
| 6,637,029 B1 | 10/2003 | Maissel et al. |
| 6,651,252 B1 | 11/2003 | Gordon et al. |
| 6,671,882 B1 | 12/2003 | Murphy et al. |
| 6,675,385 B1 | 1/2004 | Wang |
| 6,675,387 B1 | 1/2004 | Boucher et al. |
| 6,681,395 B1 | 1/2004 | Nishi |
| 6,704,028 B2 | 3/2004 | Wugofski |
| 6,704,359 B1 | 3/2004 | Bayrakeri et al. |
| 6,741,617 B2 | 5/2004 | Rosengren et al. |
| 6,754,905 B2 | 6/2004 | Gordon et al. |
| 6,763,522 B1 | 7/2004 | Kondo et al. |
| 6,782,132 B1 | 8/2004 | Fogg |
| 6,791,561 B1 | 9/2004 | Dawson |
| 6,807,528 B1 | 10/2004 | Truman et al. |
| 6,828,993 B1 | 12/2004 | Hendricks et al. |
| 6,874,129 B2 | 3/2005 | Smith |
| 6,954,897 B1 | 10/2005 | Noguchi et al. |
| 6,968,567 B1 | 11/2005 | Gordon et al. |
| 6,999,476 B2 | 2/2006 | Lerman et al. |
| 7,031,348 B1 | 4/2006 | Gazit |
| 7,062,777 B2 | 6/2006 | Alba et al. |
| 7,065,709 B2 | 6/2006 | Ellis et al. |
| 7,096,484 B2 | 8/2006 | Mao et al. |
| 7,100,185 B2 | 8/2006 | Bennington et al. |
| 7,110,006 B2 | 9/2006 | MacInnis et al. |
| 7,117,440 B2 | 10/2006 | Gordon |
| 7,137,135 B2 | 11/2006 | Schein et al. |
| 7,143,428 B1 | 11/2006 | Bruck et al. |
| 7,150,029 B1 | 12/2006 | Ebling et al. |
| 7,174,084 B2 | 2/2007 | Edmonds et al. |
| 7,178,158 B2 | 2/2007 | Nishina |
| 7,194,032 B1 | 3/2007 | Easwar et al. |

(56) References Cited

U.S. PATENT DOCUMENTS

| | | | |
|---|---|---|---|
| 7,343,614 B1* | 3/2008 | Hendricks et al. | 725/8 |
| 7,363,645 B1 | 4/2008 | Hendricks | |
| 7,370,342 B2 | 5/2008 | Ismail et al. | |
| 7,404,200 B1 | 7/2008 | Hailey et al. | |
| 7,503,003 B2 | 3/2009 | Kamen et al. | |
| 7,685,619 B1 | 3/2010 | Herz | |
| 7,836,467 B2 | 11/2010 | Gordon | |
| 7,838,467 B2 | 11/2010 | Jones et al. | |
| 8,032,906 B2 | 10/2011 | Gordon et al. | |
| 8,060,905 B1 | 11/2011 | Hendricks | |
| 2001/0005447 A1 | 6/2001 | Kawamura et al. | |
| 2001/0010095 A1 | 7/2001 | Ellis et al. | |
| 2001/0012022 A1 | 8/2001 | Smith | |
| 2001/0056577 A1* | 12/2001 | Gordon et al. | 725/52 |
| 2002/0007493 A1 | 1/2002 | Butler | |
| 2002/0012353 A1 | 1/2002 | Gerszberg et al. | |
| 2002/0026496 A1 | 2/2002 | Boyer et al. | |
| 2002/0032907 A1 | 3/2002 | Daniels | |
| 2002/0035728 A1 | 3/2002 | Fries | |
| 2002/0066102 A1 | 5/2002 | Chapman et al. | |
| 2002/0066103 A1 | 5/2002 | Gagnon et al. | |
| 2002/0120933 A1 | 8/2002 | Knudson et al. | |
| 2002/0133565 A1 | 9/2002 | Huat | |
| 2003/0020744 A1* | 1/2003 | Ellis et al. | 345/723 |
| 2003/0034982 A1 | 2/2003 | Talayssat et al. | |
| 2003/0035007 A1 | 2/2003 | Wugofski | |
| 2003/0052905 A1 | 3/2003 | Gordon et al. | |
| 2003/0056216 A1 | 3/2003 | Wugofski et al. | |
| 2003/0066085 A1 | 4/2003 | Boyer et al. | |
| 2003/0083533 A1 | 5/2003 | Gerba et al. | |
| 2003/0091339 A1 | 5/2003 | Isozaki | |
| 2003/0115603 A1 | 6/2003 | Lemmons et al. | |
| 2003/0149988 A1 | 8/2003 | Ellis et al. | |
| 2003/0200544 A1 | 10/2003 | Ellis et al. | |
| 2003/0209599 A1* | 11/2003 | Gatto | 235/379 |
| 2004/0078824 A1* | 4/2004 | Krisbergh et al. | 725/105 |
| 2004/0107439 A1 | 6/2004 | Hassell et al. | |
| 2004/0117831 A1 | 6/2004 | Ellis et al. | |
| 2004/0128686 A1 | 7/2004 | Boyer et al. | |
| 2004/0261105 A1 | 12/2004 | Marshall et al. | |
| 2005/0028208 A1 | 2/2005 | Ellis et al. | |
| 2005/0278741 A1 | 12/2005 | Robarts et al. | |
| 2006/0282852 A1 | 12/2006 | Purpura et al. | |
| 2007/0011702 A1 | 1/2007 | Vaysman | |
| 2007/0089135 A1* | 4/2007 | Qureshey et al. | 725/45 |
| 2009/0028153 A1 | 1/2009 | Koster et al. | |
| 2010/0333004 A1 | 12/2010 | Kristiansen et al. | |

FOREIGN PATENT DOCUMENTS

| | | |
|---|---|---|
| EP | 0758833 | 2/1997 |
| EP | 0/838958 A1 | 4/1998 |
| EP | 0838958 | 4/1998 |
| EP | 0921682 | 6/1999 |
| EP | 0946060 | 9/1999 |
| EP | 0966164 | 12/1999 |
| EP | 0966164 A2 | 12/1999 |
| EP | 01905040 A1 | 4/2008 |
| GB | 0124726.1 | 12/1919 |
| GB | 2364195 | 1/2002 |
| JP | 8506969 | 7/1996 |
| JP | H08-506939 | 7/1996 |
| JP | 9284739 A | 10/1997 |
| JP | 10-191273 | 7/1998 |
| JP | H08506939 | 5/2001 |
| JP | 2001-519625 A | 10/2001 |
| WO | 94/14280 | 6/1994 |
| WO | 9414282 A1 | 6/1994 |
| WO | 94/30008 A1 | 12/1994 |
| WO | 9430008 | 12/1994 |
| WO | 9637059 | 11/1996 |
| WO | 9713368 | 4/1997 |
| WO | 9713368 A1 | 4/1997 |
| WO | 9746007 A1 | 12/1997 |
| WO | 9831116 | 7/1998 |
| WO | WO 98/47825 | 10/1998 |
| WO | 9853611 | 11/1998 |
| WO | 9853611 A1 | 11/1998 |
| WO | WO 99/04561 | 1/1999 |
| WO | 0005890 | 2/2000 |
| WO | 0005890 A1 | 2/2000 |
| WO | 0005892 | 2/2000 |
| WO | 0005892 A1 | 2/2000 |
| WO | 0040013 | 7/2000 |
| WO | 0064164 A1 | 10/2000 |
| WO | 0064169 A1 | 10/2000 |
| WO | 0156290 | 8/2001 |

OTHER PUBLICATIONS

Notice of Reasons for Rejection in Japanese Patent Application No. 2000-561773, dated Mar. 30, 2010 (with English translation).
Office Action in U.S. Appl. No. 12/899,797, dated Nov. 30, 2011.
Japan Patent Application No. P2009-164786 Notice of Reasons for Rejection dated Feb. 7, 2012 with English translation.
International Search Report PCT/US99/15522, Oct. 15, 1999.
International Search Report PCT/US00/10187, Jul. 11, 2000.
International Search Report PCT/US01/02440, Aug. 2, 2001.
International Search Report PCT/US97/22850, Oct. 22, 1998.
International Search Report PCT/US99/16265, Feb. 3, 2000.
International Search Report PCT/US99/16786, Oct. 18, 1999.
International Search Report PCT/US99/16764, Oct. 18, 1999.
International Search Report PCT/US00/10059, Jul. 6, 2000.
International Preliminary Examination Report PCT/US00/10059, Sep. 30, 2001.
International Search Report PCT/US00/29806, Jan. 19, 2001.
International Preliminary Examination Report PCT/US00/29806, Nov. 18, 2001.
International Search Report PCT/US00/29805, Jan. 22, 2001.
International Preliminary Examination Report PCT/US00/29805, Nov. 13, 2001.
International Preliminary Examination Report PCT/US00/10188, May 15, 2001.
International Preliminary Examination Report PCT/US01/02440, Apr. 15, 2003.
International Preliminary Examination Report—PCT/US99/15522—Feb. 17, 2000.
EP Search Report, EP 01963811 dated Sep. 22, 2005.
Third Office Action in Canadian Patent Application No. 2677520 dated May 17, 2011.
Second Office Action in Canadian Patent Application No. 2677520 dated Oct. 26, 2010.
IPRP for PCT/US01/02440 dated Aug. 20, 2001.
Supplementary EP Search Report in EP01905040 dated Feb. 21, 2006.
IPRP for PCT/US99/15522 dated Feb. 17, 2000.
Communication for EP99933821.3-2223 dated Mar. 16, 2006.
Notice of Reasons for Rejection in JP App. No. 2000-561772 dated Jan. 7, 2009 (Jan. 13, 2009), with English Translation.
Examination Report in EP99934182.9-2223 dated Jan. 9, 2007.
Notice of Reasons for Rejection in JP App. No. 2000-561773 dated Jan. 13, 2009, with English Translation.
First Office Action in CA2370227 dated May 23, 2006.
First Office Action in CA2370382 dated May 23, 2006.
Examination Report in GB0124724.6 dated Nov. 13, 2002.
Notice of Reasons for Rejection in JP2000-561774 dated Jan. 9, 2009.
Notice of Reasons for Rejection JP2000-561770 dated Jan. 7, 2009.
International Search Report for PCT/US00/10188 dated Jun. 15, 2000.
Notice Requesting Submission of Opinion with English Translation for KR10-2001-7001110 dated Feb. 21, 2006.
Notice Requesting Submission of Opinion with English Translation for KR10-2001-7001123 dated Feb. 21, 2006.
Examination Report for EP99937298.0-1241 dated Apr. 7, 2010.
Examination Report for GB 0124726.1 dated Nov. 13, 2002.
Search and Examination Report for GB 0124726.1 dated Aug. 8, 2003.

(56) References Cited

OTHER PUBLICATIONS

Examination Report for EP99937298.0-1241 dated May 17, 2005.
Examination Report for EP99937446.5-2223 dated Mar. 8, 2005.
International Preliminary Report on Patentability for PCT/US99/16786 dated Dec. 18, 2000.
Office Action in European Patent Application No. 07016891.9-2202, dated Apr. 21, 2010.
Office Action in Canadian Patent Application No. 2680673, dated Oct. 7, 2010.
Office Action in Canadian patent application No. 2680673. dated May 24, 2011.
Office Action in European Patent Application No. 07007019.8, dated Oct. 21, 2011.
Rule 69 EPC Communication in European Patent Application No. 07016891.9, dated Aug. 9, 2010.
Search Report and Written Opinion in European Patent Application No. 07016891.9-2202, dated Jul. 5, 2010.
Search Report in European Patent Application No. 07007019.8, dated Feb. 11, 2011.
Freier, Alan O. et al., "The SSL Protocol Version 3.0," Mar. 1996, pp. 1-52, Netscape.
Kaliski. Burton S.. "A Layman's Guide to a Subset of ASN.1, BER and DER," Nov. 1, 1993, pp. 1-38, RSA Laboratories.
Malpani, AM Barish et al., "Simple Certificate Validation Protocol (SCVP)," Jul. 2001, pp. 1-23.
PKCS #7: Cryptographic Message Syntax Standard, Nov. 1993, pp. 1-29, RSA Laboratories.
Office Action in European Application No. 07016891.9-2202, dated Apr. 21, 2010.

\* cited by examiner

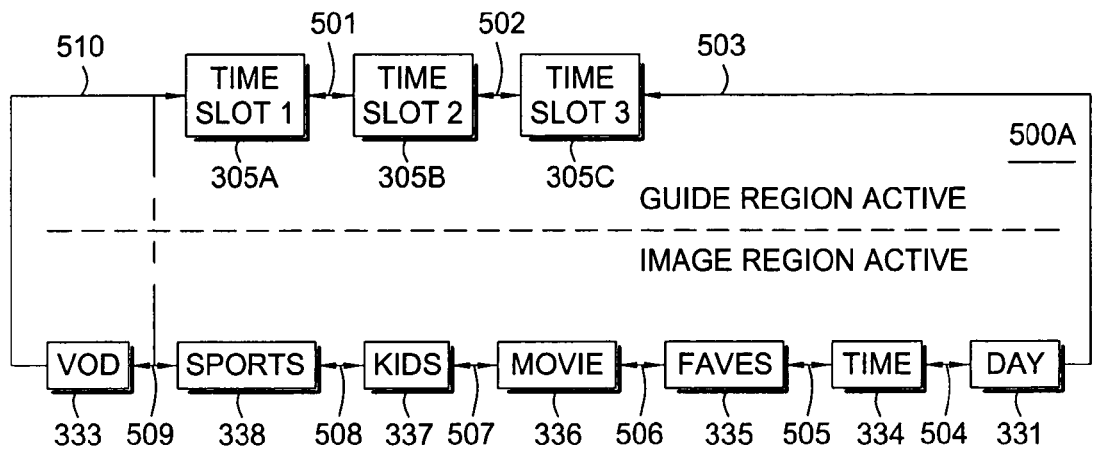
FIG. 5A
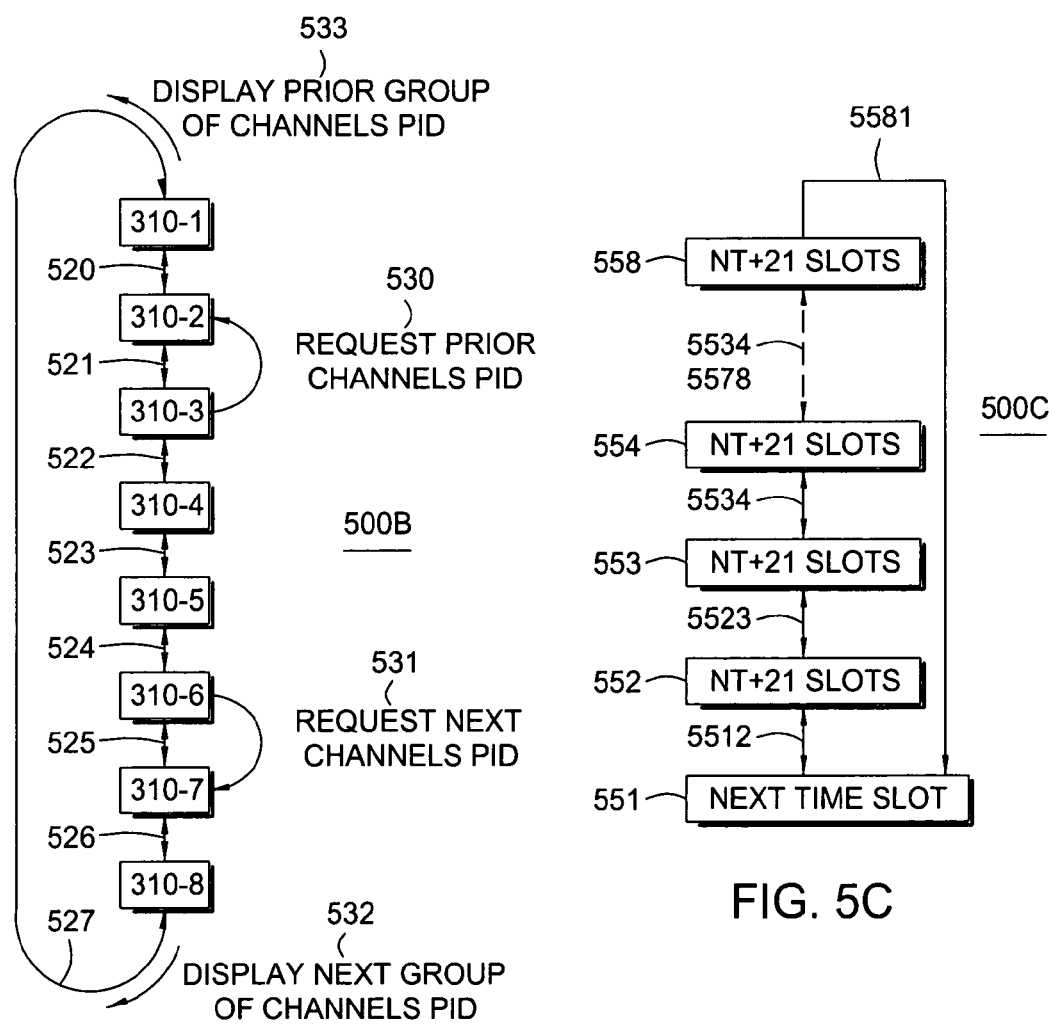
FIG. 5B
FIG. 5C

| KEY | GUIDE REGION ACTION | IMAGE REGION ACTION |
|---|---|---|
| ↑ (INC) | INDICATE NEXT CHANNEL OR LAST CHANNEL OR PRIOR CHANNEL PID | VIEW NEXT TIME SLOTS POSSIBLY ENTER-POINTCAST MODE |
| ↓ (DEC) | INDICATE PRIOR CHANNEL OR FIRST CHANNEL OF NEXT CHANNEL PID | VIEW PRIOR TIME SLOTS OR ENTER TIME SHIFT MODE |
| ⇑ (PAGE UP) | INDICATE CHANNEL IN PRIOR CHANNEL PID (CORRESPONDING, FIRST, LAST OR DEFAULT) | VIEW NEXT DAY POSSIBLY ENTER TIME SHIFT MODE |
| ⇓ (PAGE DOWN) | INDICATE CHANNEL IN NEXT CHANNEL PID (CORRESPONDING, FIRST, LAST OR DEFAULT) | VIEW PRIOR DAY POSSIBLY ENTER TIME SHIFT MODE |
| → MOVE RIGHT | EMPHASIZE NEXT TIME SLOT OR FIRST IMAGE REGION OBJECT | SELECT NEXT OBJECT |
| ← MOVE LEFT | EMPHASIZE PRIOR TIME SLOT OR LAST IMAGE REGION OBJECT | SELECT PRIOR OBJECT |
| SELECT | TUNE PRESENTLY INDICATED CHANNEL | SELECT HIGHLIGHTED OBJECT OR ENTER NEW OPERATING MODE |
| ADD/REMOVE | ADD/REMOVE INDICATED TITLE IN HIGHLIGHTED TIME SLOT TO FAVORITES | N/A |

IMPULSE PPV PURCHASING VIA SERVER-CENTRIC INTERACTIVE UI

PREMIUM SERVICE SUBSCRIPTION VIA SERVER-CENTRIC INTERACTIVE UI

PREMIUM SERVICE SUBSCRIPTION VIA SERVER-CENTRIC INTERACTIVE UI

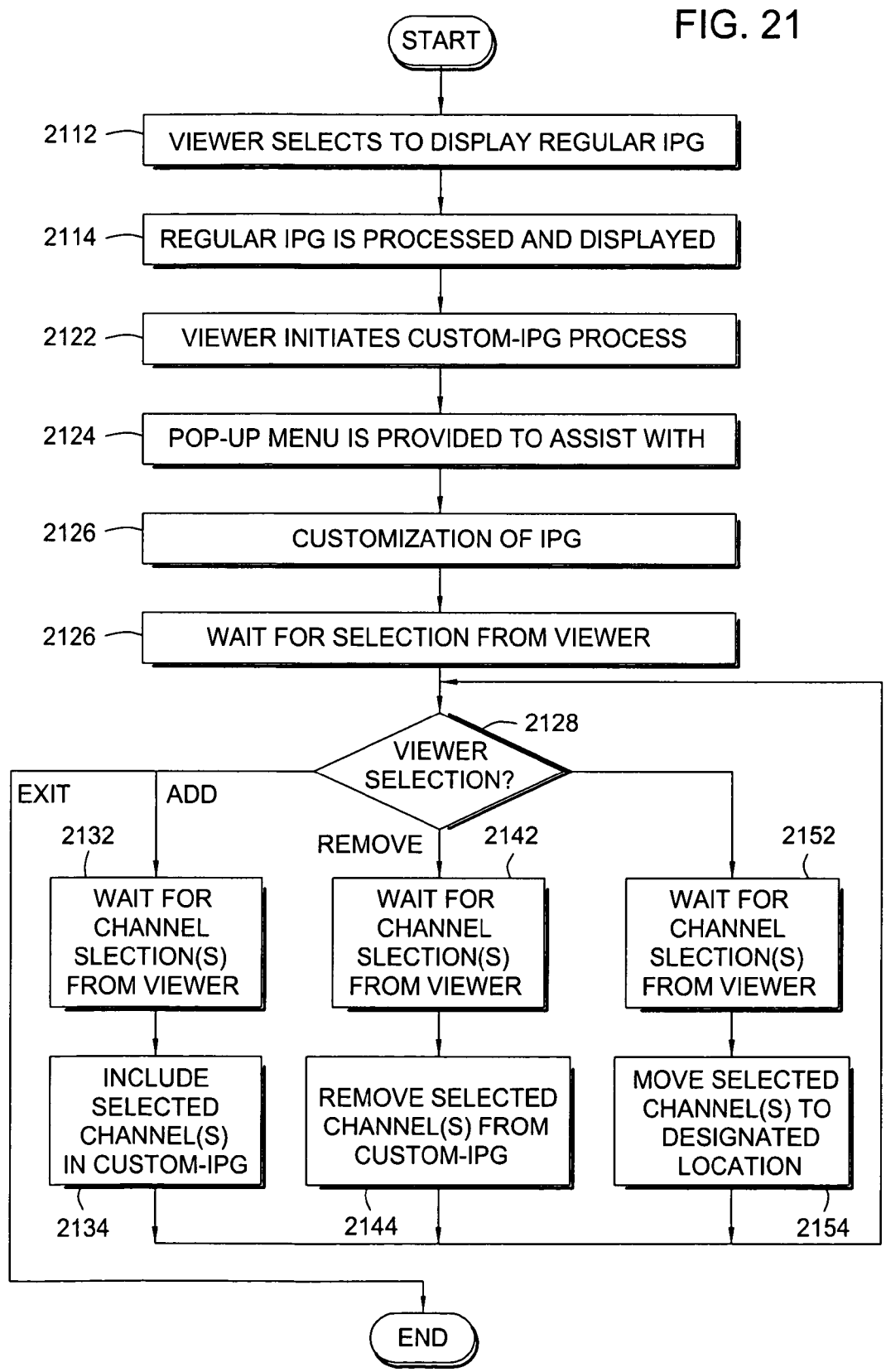

SERVER-CENTRIC CUSTOMIZED INTERACTIVE PROGRAM GUIDE IN AN INTERACTIVE TELEVISION ENVIRONMENT

CROSS-REFERENCES TO RELATED APPLICATIONS

This application is a continuation of U.S. patent application Ser. No. 09/605,522 filed Jun. 27, 2000 now U.S. No. 6,904,610 which application claims the benefit of U.S. provisional Application Ser. No. 60/141,334, entitled "SERVER-CENTRIC CUSTOMIZED INTERACTIVE PROGRAM GUIDE IN AN INTERACTIVE TELEVISION ENVIRONMENT," filed Jun. 28, 1999; both prior applications are incorporated herein by reference in their entireties for all purposes.

The aforementioned U.S. patent application Ser. No. 09/605,522 is also a continuation-in-part of the following U.S. patent applications, all of which are assigned to the assignee of the present invention, and incorporated herein by reference in their entireties for all purposes:

Ser. No. 09/293,526, entitled "DATA STRUCTURES AND METHODS FOR PROVIDING AN INTERACTIVE PROGRAM GUIDE," filed Apr. 15, 1999 now U.S. Pat. No. 6,754,905;

Ser. No. 09/359,559, entitled "SYSTEM FOR GENERATING, DISTRIBUTING AND RECEIVING AN INTERACTIVE USER INTERFACE," filed Jul. 22, 1999 now abandoned;

Ser. No. 09/384,394, entitled "METHOD AND APPARATUS FOR COMPRESSING VIDEO SEQUENCES," filed Aug. 27, 1999 now U.S. Pat No. 6,621,870; and Ser. No. 09/602,547, entitled "EFFICIENT ENCODING ALGORITHMS FOR DELIVERY OF SERVER-CENTRIC INTERACTIVE PROGRAM GUIDE," filed Jun. 21, 2000, now U.S. Pat. No. 6,704,359.

BACKGROUND OF THE INVENTION

The invention relates to communications systems in general. More specifically, the invention relates to an interactive user interface suitable for use in an interactive multimedia information delivery system.

Over the past few years, the television industry has seen a transformation in a variety of techniques by which its programming is distributed to consumers. Cable television systems are doubling or even tripling system bandwidth with the migration to hybrid fiber coax (HFC) cable plant. Customers unwilling to subscribe to local cable systems have switched in high numbers to direct broadcast satellite (DBS) systems. And, a variety of other approaches have been attempted focusing primarily on high bandwidth digital technologies, intelligent two way set top terminals, or other methods of trying to offer service differentiated from standard cable and over the air broadcast systems.

With this increase in bandwidth, the number of programming choices has also increased. Leveraging off the availability of more intelligent set top terminals, several companies such as Starsight Telecast Inc. and TV Guide, Inc. have developed elaborate systems for providing an interactive listing of a vast array of channel offerings, expanded textual information about individual programs, the ability to look forward to plan television viewing as much as several weeks in advance, and the option of automatically programming a VCR to record a future broadcast of a television program.

Unfortunately, the existing program guides have several drawbacks. They tend to require a significant amount of memory, some of them needing upwards of one megabyte of memory at the set top terminal (STT). They are very slow to acquire their current database of programming information when they are turned on for the first time or are subsequently restarted (e.g., a large database may be downloaded to a STT using only a vertical blanking interval (VBI) data insertion technique). Disadvantageously, such slow database acquisition may result in out of date database information or, in the case of services such as pay per view (PPV) or video on demand (VOD), limited scheduling flexibility for the information provider. Furthermore, the user interface of existing program guides do not usually look like a typical television control interface; rather the user interface looks like a 1980's style computer display (i.e., blocky, ill-formed text and/or graphics).

Therefore, it is seen to be desirable to provide an interactive program guide in a manner tending to reduce the above-described problems.

SUMMARY OF THE INVENTION

The invention provides techniques to create, generate, and deliver customized interactive program guide (i.e., custom-IPG). The custom-IPG allows each viewer to create an IPG based on the viewer's preference, and is highly desirable in providing an enjoyable viewer experience. With the custom-IPG, search time for the desired programs can be reduced, the likelihood of not finding the desired programs among the clutter of programs and channels can be minimized, viewer satisfaction may be enhanced, and other benefits may also be realized. With certain embodiments of the invention, the viewer can elect to view either the custom-IPG or the regular IPG. The viewer can also simultaneously view the custom-IPG overlaid on the program currently being viewed.

An embodiment of the invention provides a method for providing a custom interactive program guide (custom-IPG). In accordance with the method, selections indicative of a set of channels to be included in the custom-IPG are received. In response, one or more custom-IPG screens having included therein the set of selected channels are rendered at a head end. The rendered custom-IPG screens are provided from the head end to a set top terminal upon receiving a viewer request for the custom-IPG. Command indicative of a particular location at which to overlay the custom-IPG screens may also be received. In this case, the custom-IPG screens are then re-rendered at the location indicated by the received command and delivered from the head end.

In one implementation, the custom-IPG screens are overlaid on a video sequence being played on a particular channel. This particular channel can be the channel currently being viewed or some other channel. The custom-IPG screen can be turned off by the viewer (e.g., by depressing a particular key on the remote control unit). The custom-IPG can also be provided on a channel that is independent of the channels used to carry regular programming and program guide. The custom-IPG can also be provided on the channel used to carry the regular program guide and multiplexed with the regular IPG. In this implementation, either the custom-IPG or the regular IPG is provided on the program guide channel, depending on which IPG is selected.

The custom-IPG screens can be formed as subsets of the regular IPG screens, or as new screens in which the viewer has freedom to select and arrange the contents. The custom-IPG can be rendered and stored at the head end, possibly as part of a profile for a particular viewer. The custom-IPG can also be dynamically modified and re-rendered at the head end.

Another embodiment of the invention provides a method for creating a custom-IPG. In accordance with the method, a program guide customization process is activated (e.g., by highlighting a particular object provided on a regular IPG screen, by depressing a particular key on a remote control unit, or by some other mechanism). In response, a pop-up menu (which can be generated at a head end) is provided to assist in the customization process. The pop-up menu can be overlaid on the current screen being viewed. A set of channels can then be selected for inclusion in the custom-IPG. One or more custom-IPG screens, which are rendered at the head end, having included therein the set of selected channels are then received. A particular arrangement or layout for the selected channels can also be indicated by the viewer, in which case the custom-IPG screens are re-rendered and include therein the selected channels in the indicated arrangement.

The invention further provides systems (e.g., head-ends) and set top terminals that supports and/or implements the custom-IPG described herein.

The foregoing, together with other aspects of this invention, will become more apparent when referring to the following specification, claims, and accompanying drawings.

BRIEF DESCRIPTION OF THE DRAWINGS

The teachings of the present invention can be readily understood by considering the following detailed description in conjunction with the accompanying drawings.

FIGS. 5A-5C depicts a flow diagram of a process for moving from one object to another in the first embodiment of the interactive user interface;

FIG. 11 is a table of functional descriptions of the keys on an input device used to control the user interface;

FIG. 21 is a flow diagram of a specific embodiment of a process for creating or modifying a custom-IPG.

To facilitate understanding, identical reference numerals have been used, where possible, to designate identical elements that are common to the figures.

DESCRIPTION OF THE SPECIFIC EMBODIMENTS

This invention is a unique user interface that is illustratively embodied in an interactive program guide that enables a user to interactively review, preview and select programming for a television system.

Figure 1:
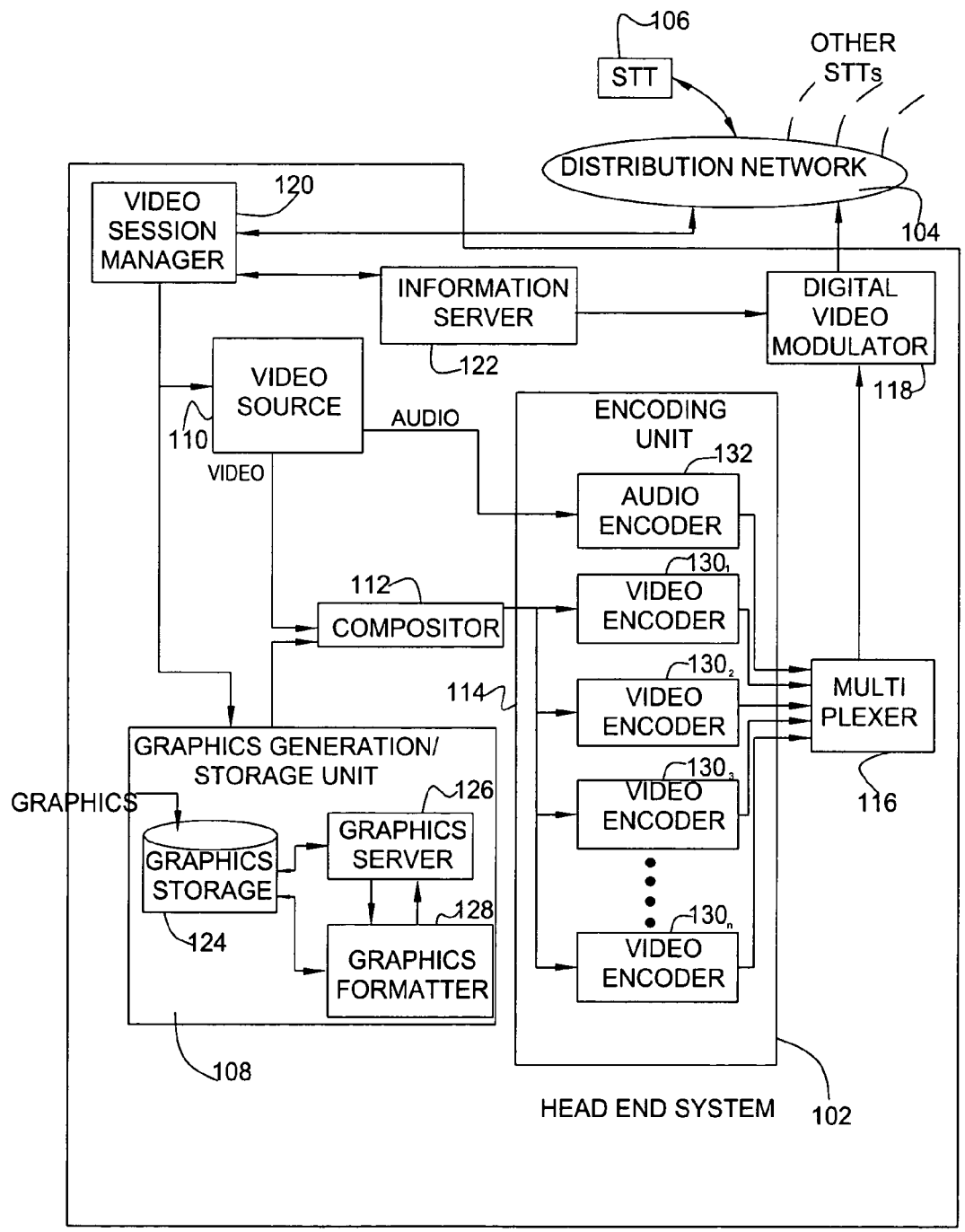
FIG. 1 depicts a block diagram of an illustrative interactive information distribution system that can benefit from the interactive user interface of the present invention.

FIG. 1 illustrates a high-level block diagram of an information distribution system 100 that generates an interactive user interface in accordance with the present invention. The system 100 comprises a head end 102, a distribution network 104, and a user terminal 106 (commonly referred to as a set top terminal (STT) or set top box, although the terminal may be embedded into a user's television or other video display equipment). For simplicity, the diagram shows a single head-end 102 and a single STT 106, while it is possible to combine multiple head-end systems to provide a desired functionality for the overall system. In a practical application, there are multiple STTs 106 coupled to the network 104 to enable a plurality of users to receive information from the head end 102.

The distribution network 104 is generally a high bandwidth, full duplex communications network, such as a hybrid fiber-coax network. However, the network 104 may comprise multiple simplex communications channels where together the simplex channels provide bidirectional communications between the head end and the STT, e.g., a forward channel could carry information from the head end to the STT through a cable system, while a back channel could carry information from the STT to the head end via a telephone system.

The head-end 102, which carries the most user interface-related processing power and storage capability, comprises a user interface graphics generation/storage unit 108, video source 110, compositor 112, encoding unit 114, multiplexer 116, video modulator 118, a video session manager (VSM) 120 or multiple VSM's depending on the viewer/subscriber load, and a video server 122.

The VSM 120 performs the command and control functionality and operates as a bridge between the user interface graphics generation/storage unit 108 and the STTs (one of which is depicted as STT 106), being responsible from the establishment and maintenance of the head end-to-STT communication. Specifically, the VSM controls user interface transmission to the STT and controls the response of the system to user requests that are made through the user interface As shall be discussed in detail below, the user interface comprises both graphical information and video information under the control of the VSM 120. The video information for the user interface is produced by the video source 110 (or sources). The graphical information for the user interface is produced in the user interface graphics generation/storage unit 108. The unit 108 comprises a graphics storage unit 124, a graphics server 126 and a graphics formatter 128. The graphics server 126 recalls the graphics information from the storage unit 124 and has the recalled information formatted in the graphics formatter 128 such that the graphics are in an appropriate format for use in a user interface. The server 126 sends a bitmap containing the graphical information for a user interface to the compositor 112.

The compositor combines the graphics with the video to produce a composite video frame sequence. The frame sequence is then encoded within the encoding unit 114. The encoding unit 114 comprises a plurality of real-time MPEG encoders $130_1$, $130_2$, ... $130_n$ (where n is an integer). The encoding unit 114 also comprises an audio encoder 132 that encodes the audio information associated with the video source signal.

The compositor 112 produces a plurality of frame sequences containing graphics and video. For example, to produce interrelated user interfaces, the video is the same in each sequence, but the graphics are different. Each of these sequences is encoded using, for example, a real-time encoder that produces an MPEG compliant bitstream. Each of the bitstreams are coupled to the multiplexer 116 to form one or more transport streams, for example, MPEG compliant transport streams. Each of the encoded user interfaces are identified in the transport streams using a unique identifier, e.g., a program identifier (PID) code. As such, the STT 106 can select a particular user interface for display by selecting the identifier, e.g., selecting a PID. Once encoded and multiplexed, the transport stream or streams are then coupled to the digital video modulator 118 (e.g., a quadrature amplitude modulation (QAM) modulator) for transmission through the distribution network 104 to the STT 106.

As shall be described in detail below, the user interface that is transmitted as a digital video bitstream can be used to control and request video and other information from the information server 122. The information server 122 interacts with the VSM 120 to produce requested information for transmission to a particular STT 106, to all the STT's or a particular subset of STT's.

Figure 2:
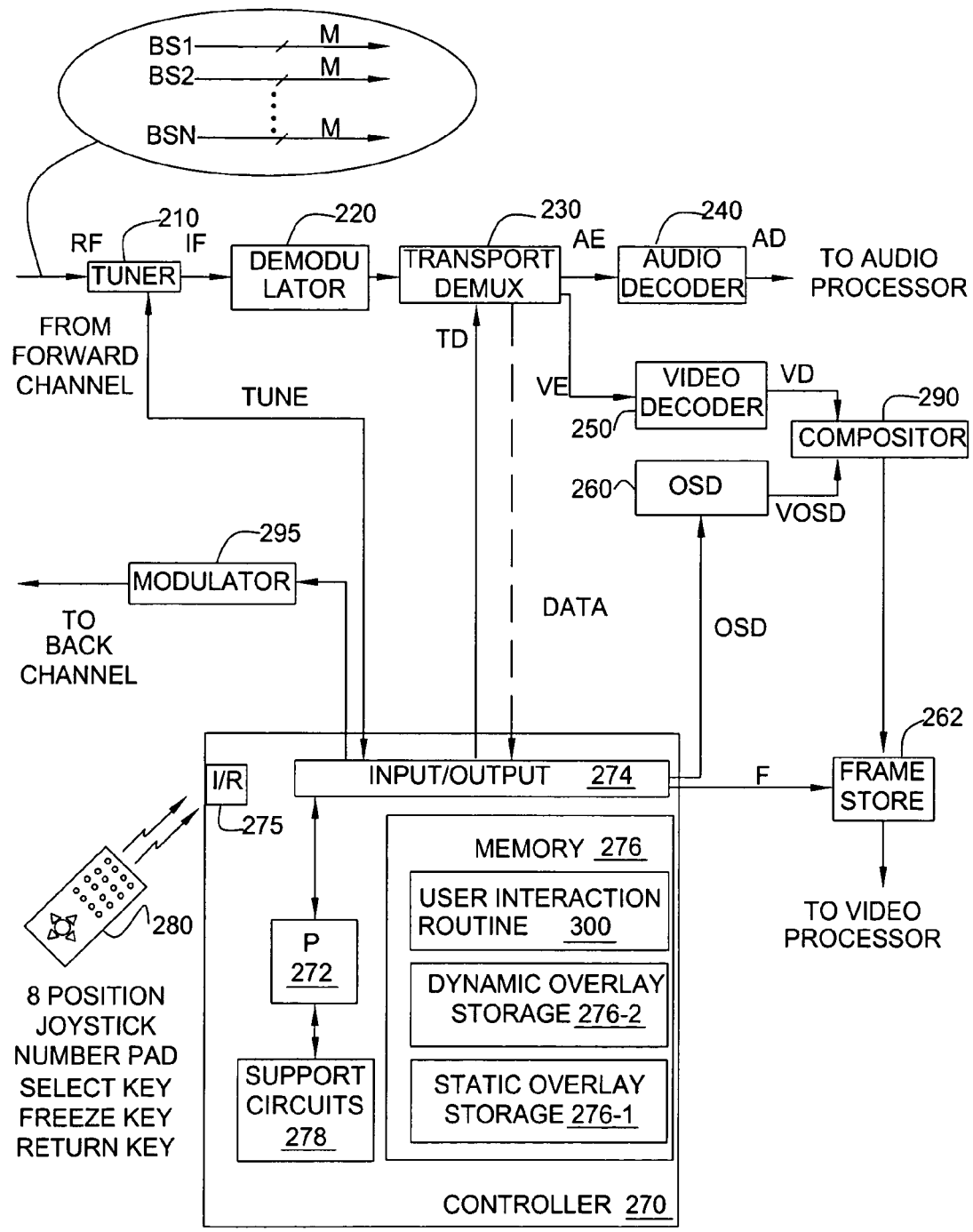
FIG. 2 depicts a block diagram of subscriber equipment suitable for use in an interactive information distribution system.

FIG. 2 depicts a block diagram of the STT 106 suitable for use in producing a display of a user interface in accordance with the present invention. The STT 106 comprises a tuner 210, a demodulator 220, a transport demultiplexer 230, an audio decoder 240, a video decoder 250, an on-screen display processor (OSD) 260, a frame store memory 262, a video compositor 290 and a controller 270. User interaction is provided via a remote control unit 280. Tuner 210 receives, e.g., a radio frequency (RF) signal comprising, for example, a plurality of quadrature amplitude modulated (QAM) information signals from a downstream (forward) channel. Tuner 210, in response to a control signal TUNE, tunes a particular one of the QAM information signals to produce an intermediate frequency (IF) information signal. Demodulator 220 receives and demodulates the intermediate frequency QAM information signal to produce an information stream, illustratively an MPEG transport stream. The MPEG transport stream is coupled to a transport stream demultiplexer 230.

Transport stream demultiplexer 230, in response to a control signal TD produced by controller 270, demultiplexes (i.e., extracts) an audio information stream A and a video information stream V. The audio information stream A is coupled to audio decoder 240, which decodes the audio information stream and presents the decoded audio information stream to an audio processor (not shown) for subsequent presentation. The video stream V is coupled to the video decoder 250, which decodes the compressed video stream V to produce an uncompressed video stream VD that is coupled to the video compositor 290. OSD 260, in response to a control signal OSD produced by controller 270, produces a graphical overlay signal VOSD that is coupled to the video compositor 290.

The video compositor 290 merges the graphical overlay signal VOSD and the uncompressed video stream VD to produce a modified video stream (i.e., the underlying video images with the graphical overlay) that is coupled to the frame store unit 262. The frame store unit 262 stores the modified video stream on a frame-by-frame basis according to the frame rate of the video stream. Frame store unit 262 provides the stored video frames to a video processor (not shown) for subsequent processing and presentation on a display device. The frame store unit 262, in response to a control signal F produce by the controller 270, "freezes" in memory (i.e., does not update) a presently stored video frame such that the video information provided to the video process results in a still image. This is useful when, e.g., a user interface utilizes scrolling information, a telephone number or address is briefly displayed or a user simply wants to view a presently displayed frame for a longer period of time.

Controller 270 comprises a microprocessor 272, an input/output module 274, a memory 276, an infrared (IR) receiver 275 and support circuitry 278. The microprocessor 272 cooperates with conventional support circuitry 278 such as power supplies, clock circuits, cache memory and the like as well as circuits that assist in executing the software routines that are stored in memory 276. The controller 270 also contains input/output circuitry 274 that forms an interface between the controller 270 and the tuner 210, the transport demultiplexer 230, the onscreen display unit 260, the back channel modulator 295, and the remote control unit 280. Although the controller 270 is depicted as a general-purpose computer that is programmed to perform specific interactive program guide control function in accordance with the present invention, the invention can be implemented in hardware as an application specific integrated circuit (ASIC). As such, the process steps described herein are intended to be broadly interpreted as being equivalently performed by software, hardware, or a combination thereof.

In the exemplary embodiment of FIG. 2, the remote control unit 280 comprises an 8-position joystick, a numeric pad, a "select" key, a "freeze" key and a "return" key. User manipulations of the joystick or keys of the remote control device are transmitted to a controller via an infrared (IR) link. The controller 270 is responsive to such user manipulations and executes appropriate user interaction routines 300, uses particular dynamic overlays that are available in a dynamic overlay storage 276-2 and uses particular static overlays form a static overlay storage 276-1.

Figure 3A:
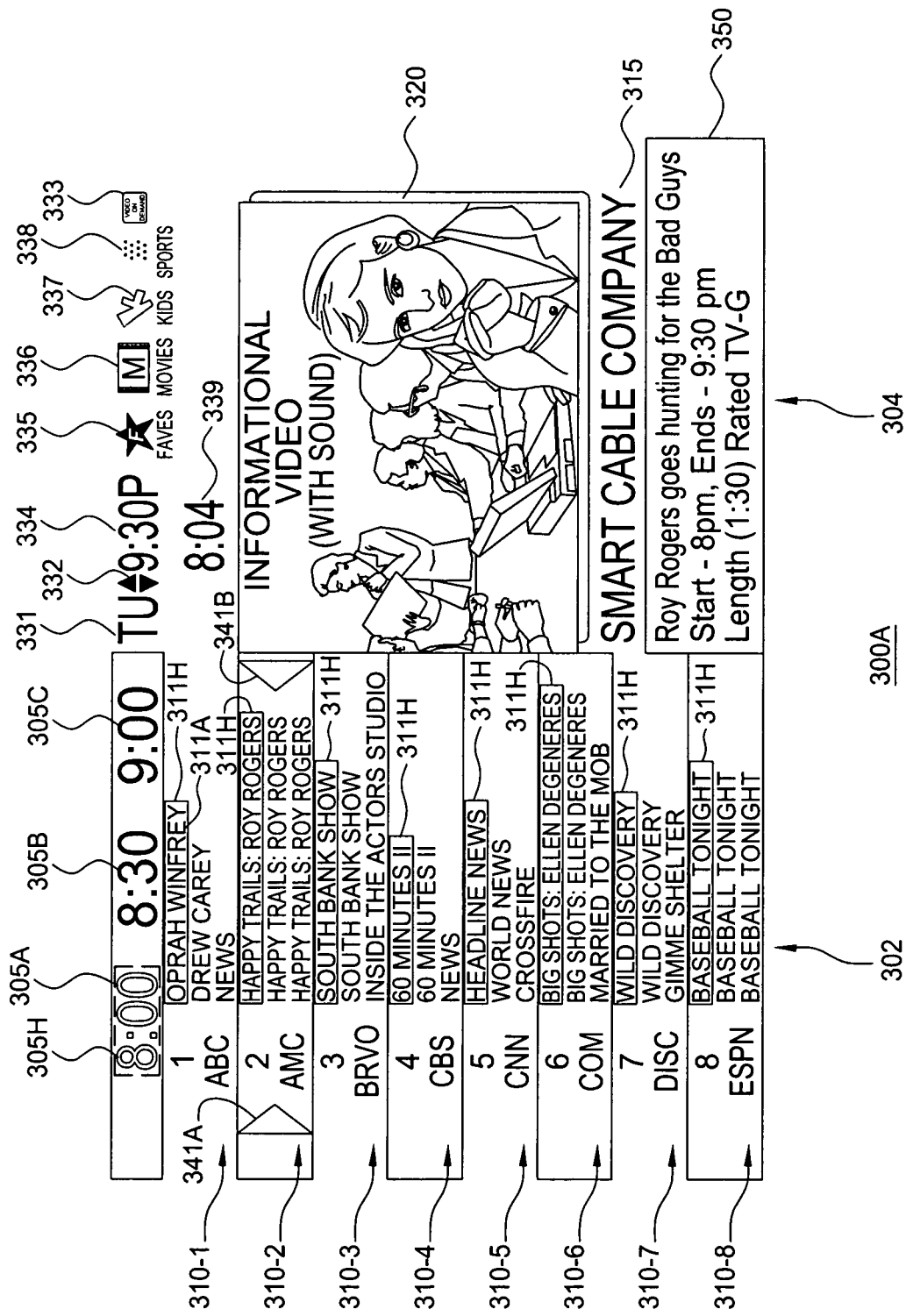
FIGS. 3A-3C depict a first embodiment of an interactive user interface.
Figure 3B:
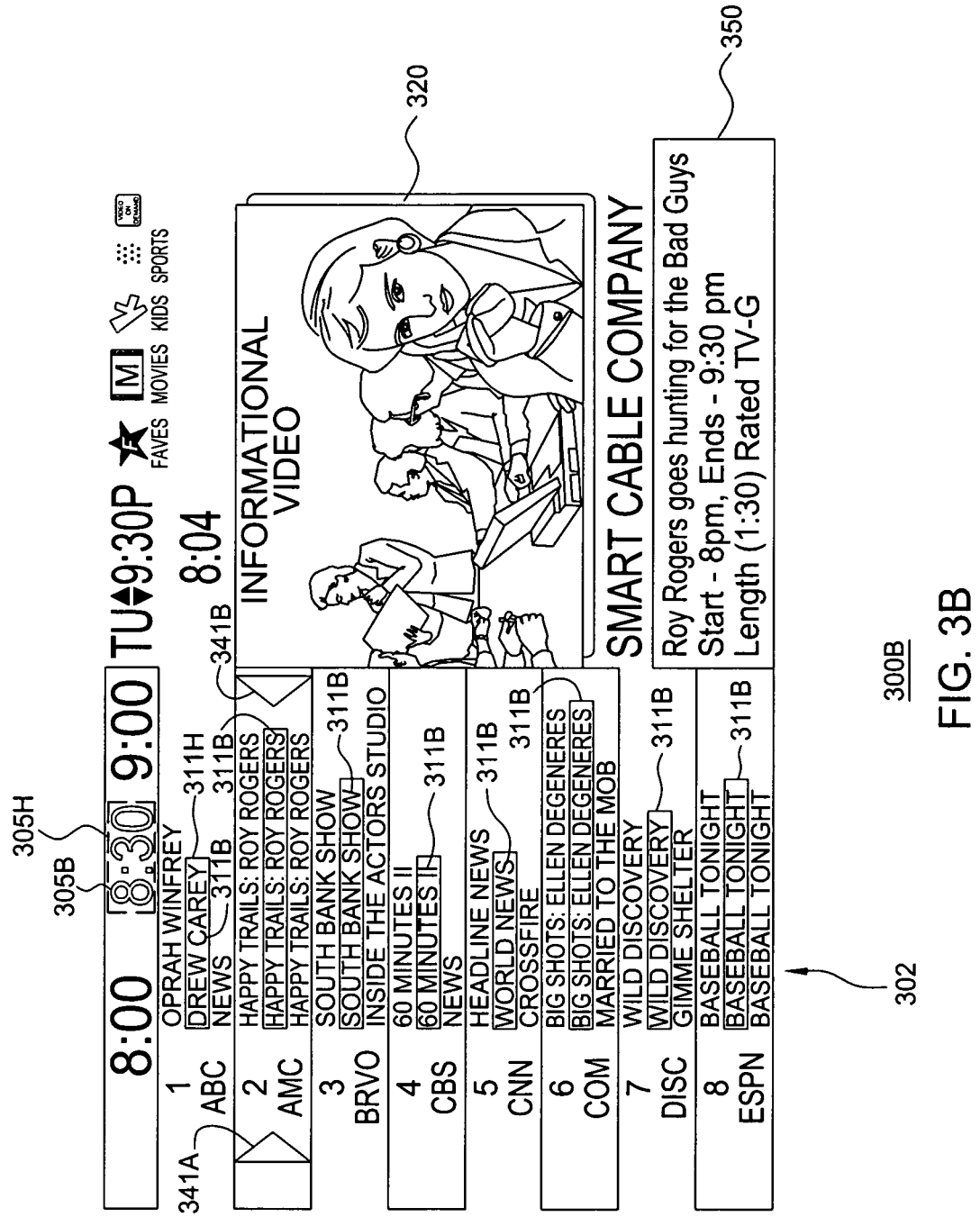
Figure 3C:
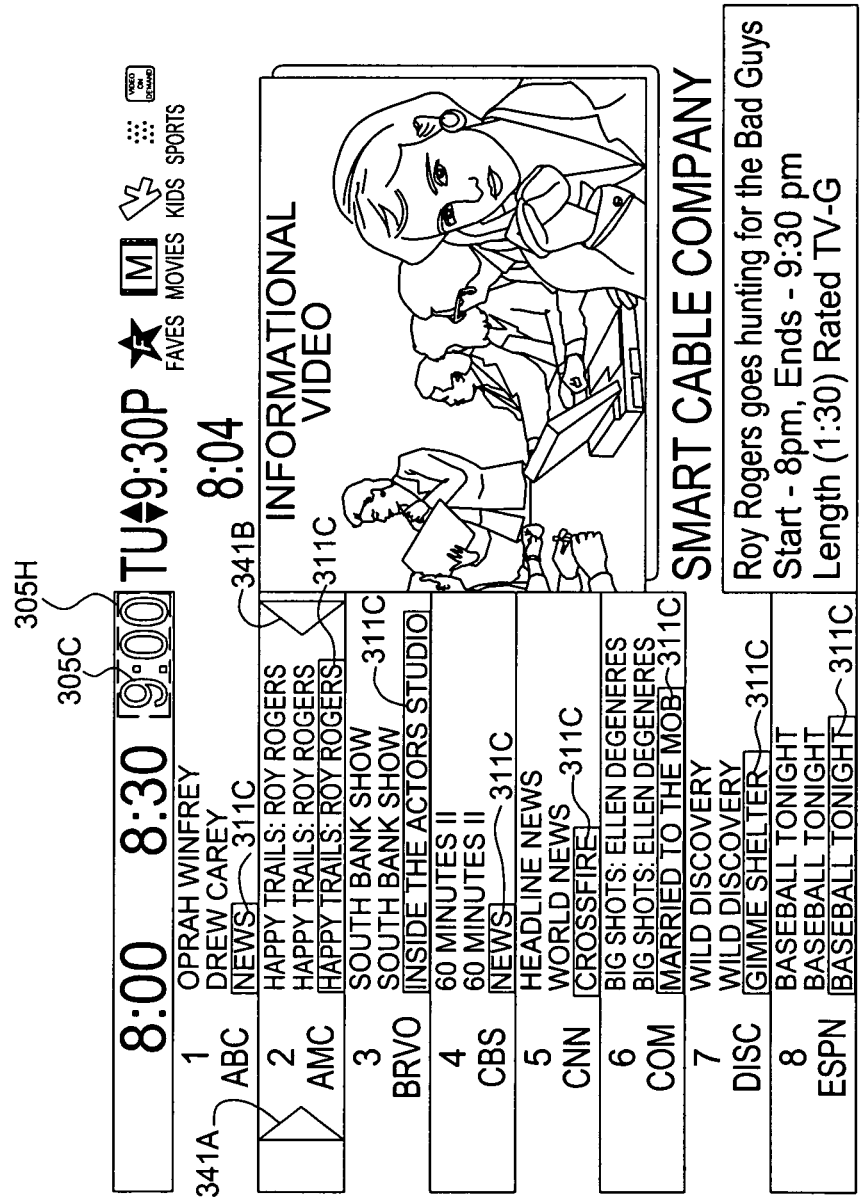

FIGS. 3A-3C depict an illustrative embodiment of a user interface that contains program guide information, i.e., the interface forms an interactive program guide for television systems. This program guide is created entirely in the head end of the information distribution system of FIG. 1 and transmitted to the user's STT for decoding and display. An OSD graphics layer is either stored in the STT or transmitted with the user interface to facilitate a mask and reveal function that provides a technique to highlight, mask, or otherwise identify objects (graphical icons and/or text) within the user interface.

The IPG display 300A of FIG. 3A comprises a first 305A, second 305B and third 305C time slot object, a plurality of channel content objects 310-1 through 310-8, a pair of channel indicator icons 341A, 341B, a video barker 320 (and associated audio barker), a cable system or provider logo 315, a program description region 350, a day of the week identification object 331, a time of day object 339, a next time slot icon 334, a temporal increment/decrement object 332, a "favorites" filter icon 335, a "movies" filter object 336, a "kids" (i.e., juvenile) programming filter icon 337, a "sports" programming filter object 338 and a VOD programming icon 333. It should be noted that the day of the week object 331 and next time slot icon 334 may comprise independent objects (as depicted in FIG. 3A) or may be considered together as parts of a combined object.

Additionally, to better understand the invention, FIGS. 3A-3C depict respective display screens of the interactive program guide (IPG) of the guide of FIG. 3A with various objects (icons and/or text) emphasized.

The interactive program guide display 300A comprises a "video layer" and a "graphics layer". In this context, the "video layer" comprises the imagery from the decoded digital video bitstream containing the video and graphical information of the user interface. As described above with respect to FIG. 1, video information, representative of each of the objects (icons and text), is generated at the head end of the system, and transmitted as part of a video stream. Thus, the actual display parameters (i.e., the size, shape, color, position and other visual parameters) associated with each object are entirely controlled at the head end.

The modifiable, via viewer interaction, objects (icons and text) are selected by, for example, a remote control device associated with the STT. Selecting the screen objects causes a locally stored and/or locally generated graphical overlay to identify the selected objects on the screen by associating each manipulable object or element with a corresponding graphical overlay element (e.g., an x-y coordinate box or other element). An overlay element is selectively emphasized or de-emphasized (e.g., selectively shading, highlighting coloring, and the like) via manipulation of the remote control unit.

The IPG display 300A of FIG. 3A is logically divided into two operational regions; a guide region (the graphical region) 302 and an image region (the video region) 304. The guide region 302 comprises the time slot objects 305, channel content objects 310-1 through 310-8 and channel indicator icons 341A, 341B. The image region 304 comprises the remaining objects that are delineated above. When a user or viewer is interacting with the program guide of the present invention, only one of these two regions will be active at any one time. Some keys or controls utilized by a viewer to control the IPG will operate differently, depending upon which region is active. The operational differences between the two regions will be described in more detail below.

Referring to the guide region 302 of FIG. 3A, it can be seen that the first time slot 305A is emphasized by a time slot highlighting object 305H. The slot 305A is emphasized with respect to the other time slots 305B and 305C, which can be said to be de-emphasized. The slot 305A can be emphasized by highlighting the slot using a colored highlighting overlay graphic 305H, or the highlighting graphic may provide a 0% opacity window through which the slot text 305A can be seen and the others slots may be overlaid with a graphic having an opacity that is more than 0%, e.g., 25, 50 or 75 percent opacity. The level of opacity is selected to facilitate clear emphasis of the selected time slot by muting the intensity of the un-selected slots. Similarly, it can be seen that each respective first title object 311A of each of the plurality of channel content objects 310-1 through 310-8 is also emphasized or highlighted by a title highlighting object 311H. Time slot emphasis is coordinated with title slot emphasis. That is, if the first time slot object 305A is emphasized or highlighted, then the first title object 311A of each of the plurality of channel content objects 310-1 through 310-8 is also emphasized or highlighted. Similarly, if the second time slot object 305B is emphasized or highlighted as in FIG. 3B, then the second title object 311B of each of the plurality of channel content objects 310-1 through 310-8 is also emphasized or highlighted. Lastly, if the third time slot 305C is emphasized as shown in FIG. 3C, then the third title objects 311C are emphasized or highlighted. This coordinated highlighting or emphasizing of time slot 305 and title 311 objects assists the viewer in determining which titles within the respective channel content objects 310-1 through 310-8 are associated with which time slot.

In another embodiment of the invention, the coordinated emphasis or highlighting of time slot and title objects is accomplished by using the graphics layer to adjust a color, brightness or other attributes of an object, or display area surrounding the object. For example, an x-y coordinate grid (a rectangular cell) or other shape surrounding an object to be highlighted or emphasized may be changed in color or brightness level such that the surrounded or proximate object is emphasized. Similarly, an x-y coordinate grid or other shape surrounding an object to be non-highlighted or de-emphasized may be changed in color or brightness level such that the surrounded or proximate object is de-emphasized.

The program description region 350 of the image region 304 is used to display a description of a presently indicated (emphasized) title. The description comprises, illustratively, one or more of a brief textual description of the title, title start and end times, title run time, title ratings (e.g., MPAA or other ratings), title reviews (e.g., "thumbs-up" or "thumbs-down" or other qualitative indicia), ranking of title in comparison to other titles (e.g., popularity, aggregated positive or negative viewer feedback) and the like.

The pair of channel indicator icons 341A, 341B (or a single channel indicator icons 341A or 341B) is used to indicate which of the plurality of channel content objects 310-1 through 310-8 includes a highlighted or emphasized title object 311 having associated with it title description within the program description icon 350. That is, the channel indicator icons 341A, 341B provide a visual indication of a presently indicated channel to the viewer.

It is important to note that the video barker 320 of FIG. 3A is, itself, an object that may be selected in some embodiments of the invention. Specifically, in such an embodiment where the video barker 320 is used to present a movie trailer, selection of the video barker object 320 by the user implies a desire to view that movie in, e.g., a video-on-demand context. Thus, in an embodiment of the invention where the video barker comprises an active or selectable object, selection of the video barker brings the user to a video-on-demand interaction screen where the user is provided the opportunity to purchase the movie presented in the video barker. Similarly, where the video barker is used to present merchandise or other products and/or services for sale, selection of the video barker results in the user being brought to an interaction screen suitable for fulfilling a user's desire to purchase or shop for such goods and/or services (e.g., an advertisement from a store is associated with a virtual mall, an advertisement for a restaurant is associated with a food coupon retrieval system, either virtual or via regular mail after entering a name and address).

Referring to FIG. 3B the second channel 310-2, which is indicated by the channel icons 341A and 341B, includes a second title 311B that is associated with the highlighted or emphasized second time slot 305B. In one embodiment of the invention, selecting this title (i.e., pressing the "select" key when the guide region is active), which is to be presented in the future, results in the user being transferred to a preview screen depicting a preview of the selected title. For example, in the case of the selected title being a television sitcom to be broadcast in, e.g., 20 minutes from the present time, selecting that title results in the display of a preview information screen related to the sitcom. Similarly, in the case of the selected title being a boxing match or other sporting event, usually associated with a pre-game show or pre-fight program of some sort on one or more channels, the user is displayed a screen in which he or she may select which of these pre-event programs to view. Alternatively, the viewer is displayed a screen describing the upcoming fight.

When the guide region 302 is active, user manipulations of left or right arrow keys on, e.g., a remote control device, result in a change in the highlighted or emphasized time slot; while user manipulations of up or down arrow keys result in a change in the indicated channel. In the case of a change in time slot or channel indication, contents of the title description information, which is displayed in the program description region 350, is also changed. The guide region 302 becomes inactive and the image region 304 becomes active when the user utilizes the left or right arrow keys to highlight or emphasize an object within the image region (i.e., icons 331-339).

As noted above, the video streams for the IPG display may be included as a PES within a single transport stream. Thus, a user desiring to view the next 1.5 hour time interval (e.g., 9:30-11:00) may activate a "scroll right" object (or move the joystick to the right when a program within program grid 302 occupies the final displayed time interval). Such activation will result in the controller of the STT noting that a new time interval is desired. The video stream corresponding to the new time interval will then be decoded and displayed. If the corresponding video stream is within the same transport stream (i.e., a new PID), then the stream will be immediately decoded and presented. If the corresponding video stream is within a different transport stream, then the different transport stream will be extracted from the broadcast stream and the appropriate video stream will be decoded and presented. If the corresponding transport stream is within a different broadcast stream, then the different broadcast stream will be tuned, the different transport stream will be extracted from the different broadcast stream and the appropriate video stream will be decoded and presented.

It is important to note that each extracted video stream is associated with a common audio stream. Thus, the video/audio barker function of the program guide is continuously provided, regardless of the selected video stream.

Similarly, a user interaction resulting in a prior time interval or a different set of channels results in the retrieval and presentation of an appropriate video stream. If the appropriate video stream is not normally part of the broadcast video streams, then a pointcast session is initiated. That is, the STT sends a request to the head end via the back channel requesting a particular stream. The head end processes the request, retrieves the appropriate stream from the information server, incorporates the stream within a transport stream as a video PID (ideally the transport stream currently being tuned/selected by the STT) and informs the STT which PID should be demultiplexed, and from which transport stream it should be demultiplexed. The STT then retrieves the appropriate video PID. In the case of the appropriate video PID being within a different transport stream, the STT must first demultiplex the different transport stream (possibly even tuning a different QAM stream within the forward channel).

Upon completion of the viewing of the appropriate stream, the STT indicates to the head end that the STT no longer needs the stream, whereupon the head end tears down the pointcast session.

Figure 4:
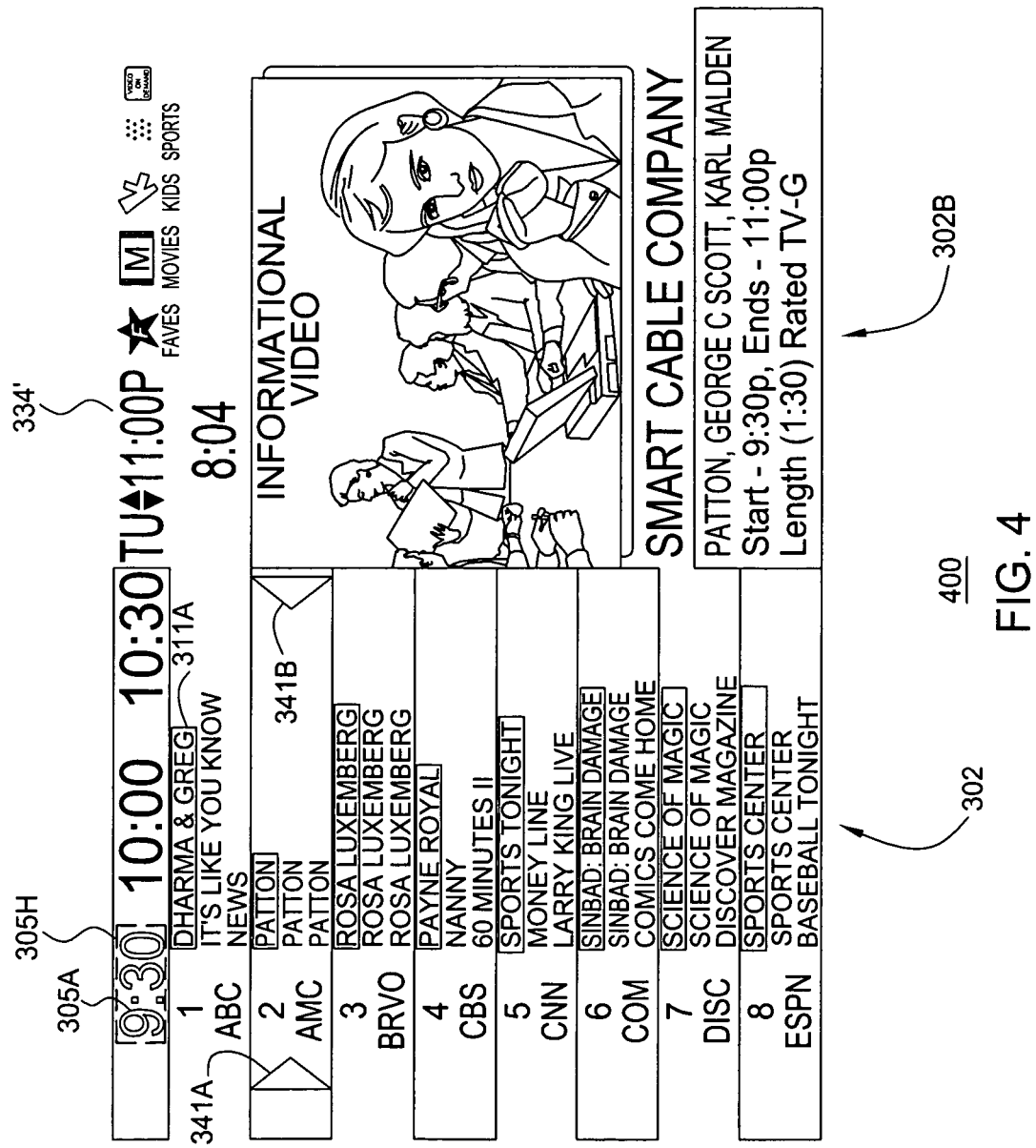
FIG. 4 depicts the first embodiment of the interactive user interface while emphasizing a new time slot.

FIG. 4 shows an IPG display 400 illustrating the user interface in the next time slot, which is 9:30 to 11:00 PM. The next time slot object 334 in FIG. 3A indicates 9:30 PM as each time slot in the exemplary embodiment comprise one and half hour time interval. Upon viewer selection of object 334 in FIG. 3A, the time slot in guide region changes to 9:30 PM to 11:00 PM. Therefore, the time slot objects 305A, 305B, and 305C in FIG. 4 indicates 9:30, 10:00 and 10:30 PM respectively. The time slot object also changes and indicates 11:00 PM in FIG. 4.

When the image region 304 is active, activations of up or down arrows by a user via a remote control device results in incrementing and decrementing the indicated next time slot. Upon receiving a select command, the video PID including the channel information for the time indicated by the selected next time slot object 334 is retrieved. In the case of that video stream being part of a currently broadcast or currently used video stream (e.g., another user had requested this stream), the head end provides information to the set top terminal enabling the set top terminal to identify the video PID including the appropriate channel guide information. The set top terminal then retrieves the appropriate video PID. If the selected video PID is located in a different transport stream, then the audio PID is also retrieved from the new transport stream.

This process of moving from one program guide page to another is depicted in FIGS. 5A-5C. FIG. 5A depicts a flow diagram 500A illustrating contextual changes in the IPG display screen 300A in response to horizontal increment and decrement (right/left) commands, such as right arrow and left arrow key activations from, e.g., a remote control. Each of the objects depicted in the contextual flow diagram comprises a video object having associated with it a graphical overlay providing emphasis to indicate an active (i.e., selectable) object or de-emphasis to indicate a non-active object (i.e., non-selectable).

The objects depicted in the contextual flow diagram 500A of FIG. 5A comprise a subset of the objects shown in the IPG display screen 300 of FIG. 3A. Specifically, the objects depicted in the contextual flow diagram 500A of FIG. 5A comprise, in the order of emphasis in response to a right arrow or horizontal increment: the first 305A, second 305B and third 305C time slot objects of the IPG display screen guide region. These objects are followed by the following IPG display screen image region objects: day of week identification object 331, next time slot object 334, "favorites" filter object 335, "movies" filter object 336, a "kids" filter object 337 "sports" filter object 338 and VOD user interface object 338. It should be noted that while the objects depicted in the contextual flow diagram 500A comprise objects depicted in the IPG display screen 300, other IPG display screens may be adapted accordingly.

For purposes of this discussion it is assumed that the first object to be highlighted or emphasized is the first time slot object 305A. Referring to FIG. 5A, in response to a first right arrow or horizontal increment 501, the first time slot object 305A is de-emphasized and the second time slot object 305B is emphasized; in response to a second right arrow or horizontal increment 502, the second time slot object 305B is de-emphasized and the third time slot object 305C is emphasized; in response to a third right arrow or horizontal increment 503, the third time slot object 305C is de-emphasized and the day of week identification object 331 is emphasized, and so on for the (504) next time slot object 334; (505) "favorites" object 335; (506) "movies" selection object 336; (507) "kids" selection object 337; (508) "sports" selection object 338; (509) "VOD" selection object 436 and, finally, is returned to the (510) first time slot object 305A.

The graphical representation of FIG. 3A is divided into guide region objects (the three timeslots 305A-305C) and image region objects (the remaining objects 331-338). The functionality of vertical increment (up arrow), vertical decrement (down arrow), page up, and page down depends on which region is activated. The differences between guide region and image region key functionality will be discussed in more detail below with respect to FIG. 5B and FIG. 5C.

When the guide region is active (any of objects 305A-305C emphasized), the up and down arrow keys are used to scroll through the various portions of the guide region. That is, the content object number (310-1 through 310-8) is changed by one (i.e., incremented or decremented) in response to up arrow or down arrow activation. Similarly, the displayed video stream is changed (via selecting the next or prior video PID) in response to page up or page down key activation. Thus, active guide region functionality provides for navigation of the various video streams providing broadcast IPG screens to a user.

When the image region is active (any of objects 331-338 emphasized), the up and down arrow keys are used to change the next time slot object 334, while the page up and page down keys are used to change the day of week identification object 331. Specifically in response to an up arrow key activation, the next time slot object 334 is incremented by, e.g., 1.5 hours by selecting the video PID including the guide information for the next three time slot objects of the current channels presented in the guide region. Similarly, in response to a page up key activation, the day of week identification object 331 is incremented by 1 day by selecting the video PID including the guide information for the next day of the current channels presented in the guide region.

FIG. 5B depicts a contextual flow diagram to illustrate the changes in the IPG display screen 300A in response to vertical increment and decrement (up/down) commands received while a guide region object is highlighted or emphasized.

The objects depicted in the contextual flow diagram 500B of FIG. 5B comprise a subset of the objects shown in the IPG display screen 300 of FIG. 3. Specifically, the objects depicted in the contextual flow diagram 500B of FIG. 5B comprise the channel content object 310-1 through 310-8 as indicated by the channel indicator objects 341A and/or 341B. In response to successive down arrow or vertical decrement key activations, the indicated channel content object traverses from 310-1 to 310-2 (520); 310-2 to 310-3 (521); 310-3 to 310-4 (522); 310-4 to 310-5 (523); 310-5 to 310-6 (524); 310-6 to 310-7 (525) and 310-7 to 310-8 (526). Similarly, activating an up arrow or vertical increment key changes the indicated channel in the reverse order.

In response to a down arrow activation while channel object 310-8 is indicated, the "next" video PID is selected for display. That is, the video PID containing the next eight channels to be displayed for the currently viewed time slot is selected. If the last eight channels are presently being displayed, then the video PID associated with the first eight channels is selected (i.e., channel "roll-over"). In the case of the "next" video PID being part of a different transport stream, the related transport stream is retrieved and the appropriate video PID and the associated audio and data PIDs are extracted.

In response to an up arrow activation while channel object 310-1 is indicated, the "prior" video PID is selected for display. That is, the video PID containing the prior eight channels to be displayed for the currently viewed time slot is selected. If the first eight channels are presently being displayed, than the video PID associated with the last eight channels is selected (i.e., channel "roll-under") In the case of the "prior" video PID being part of a different transport stream, the related transport stream is retrieved and the appropriate video PID and the associated audio and data PIDs are extracted.

FIG. 5C depicts a contextual flow diagram to illustrate the changes in the IPG display screen 300A in response to vertical increment and decrement (up/down) commands received while an image region object is highlighted or emphasized.

The object depicted in the contextual flow diagram 500C of FIG. 5C comprises the next time slot object 334 shown in the IPG display screen 300A of FIG. 3. Specifically, when an image region object is activated, the next time slot object 334 is incremented or decremented in response to, respectively, an up arrow or vertical increment key activation and a down arrow or vertical decrement key activation. In the exemplary embodiment, the next time slot object 334 is delineated in 1.5 hour intervals (i.e., the time slot following the three time slots 305A, 305B and 305C of the guide region) for a 24 hour period.

In one embodiment of the invention, the operations described in the contextual flow diagram 5C only occur if the next time slot object 334 or a combined object comprising the day object 331 and next time slot object 334 are highlighted or emphasized. In another embodiment of the invention, the operations described in the contextual flow diagram 5C occur when any image regions object is highlighted or emphasized.

In response to successive up arrow or vertical increment key activations, the indicated next time slot object traverses from the actual (with respect to the present time) next time slot (551) to a next time slot+3 (552) via path 5512; a next time slot+6 (553) via path 5523; a next time slot+9 (554) via path 5534 and so on up to a next time slot+21 (558) via path 5578. An additional up arrow or vertical increment key activation results, in the present embodiment, in a return to the next time slot (551) via path 5581. Similarly, activating a down arrow or vertical decrement key changes the indicated next time slot object in the reverse manner, except for one case. Specifically, in the case of activating a down arrow or vertical decrement key when the next time slot (551) is indicated, the system enters a time shift mode 556 via path 5516.

Figure 6A:
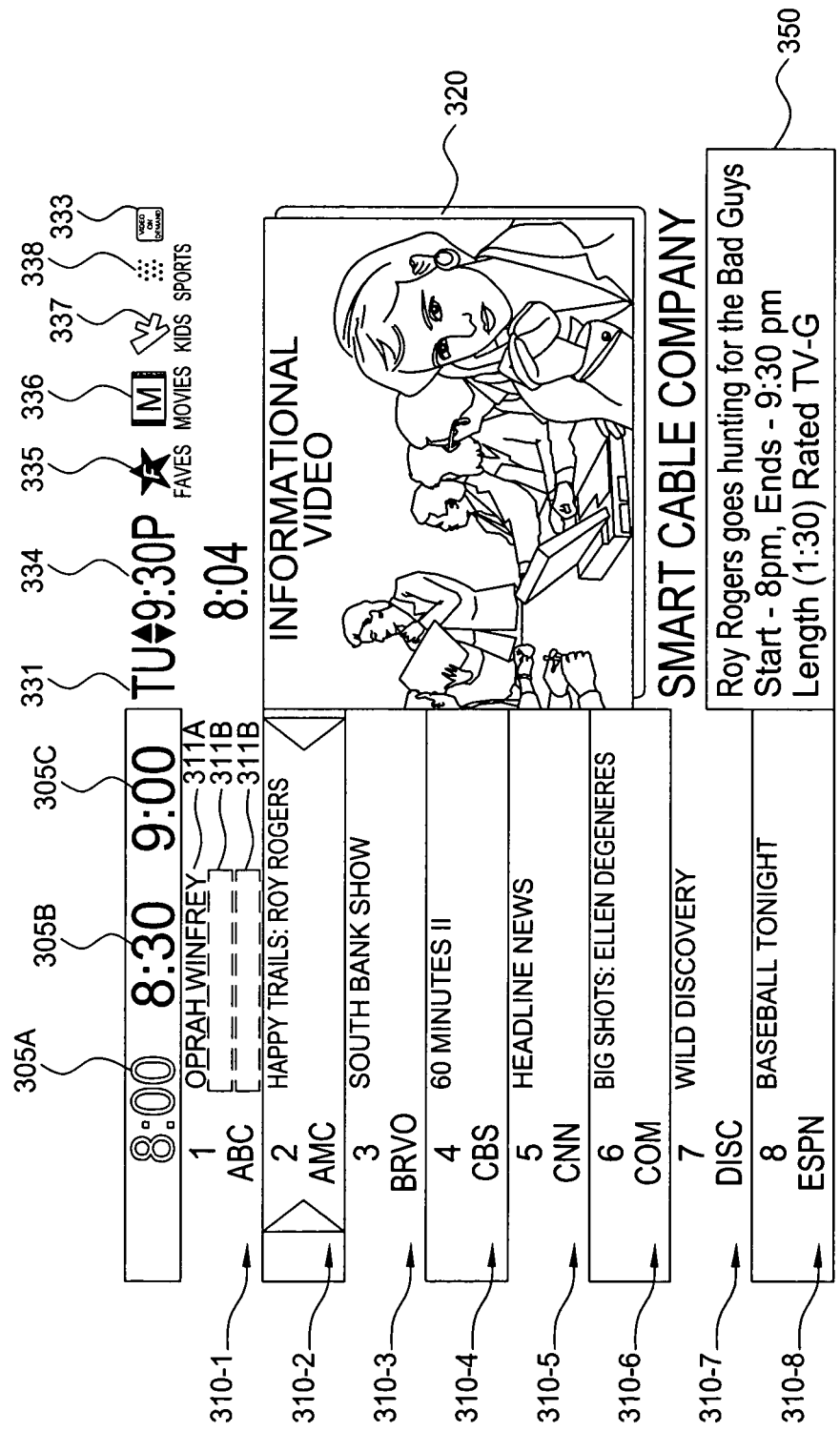
FIGS. 6A-6C depict a second embodiment of an interactive user interface.

FIG. 6A depicts a second embodiment of a user interface in accordance with the present invention. The first time slot 305A is emphasized and that only the first title object 311A within each of the channel content objects 310 is shown. That is, only the title object associated with the emphasized time slot is "revealed," while the title objects associated with the non-emphasized time slots are "masked." This "mask and reveal" method of presentation provides an IPG display that some viewers find more desirable than the previously described (with respect to FIGS. 3A-3C) muting or reduced opacity de-emphasis method of presentation. However, the muting or reduced opacity de-emphasis method of presentation does present more information to the viewer in each IPG display.

Figure 6B:
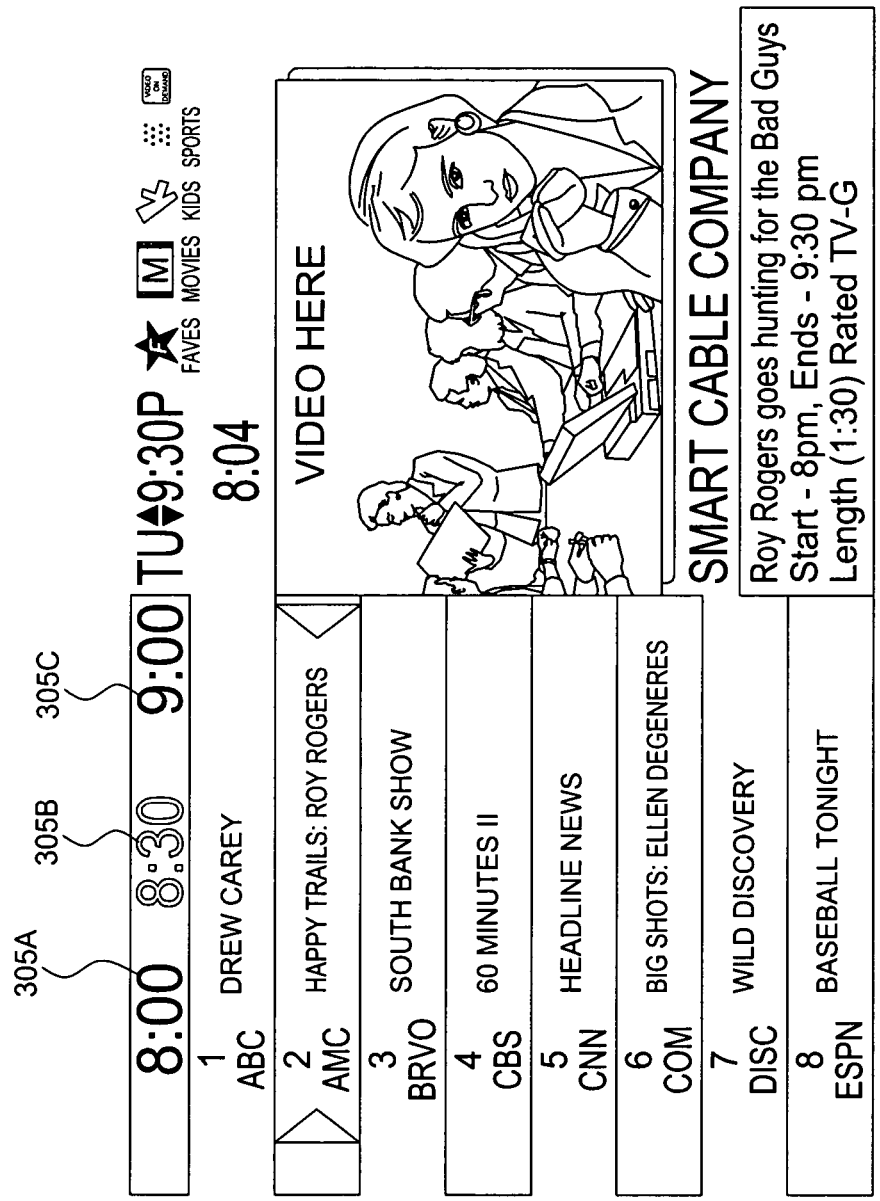
Figure 6C:
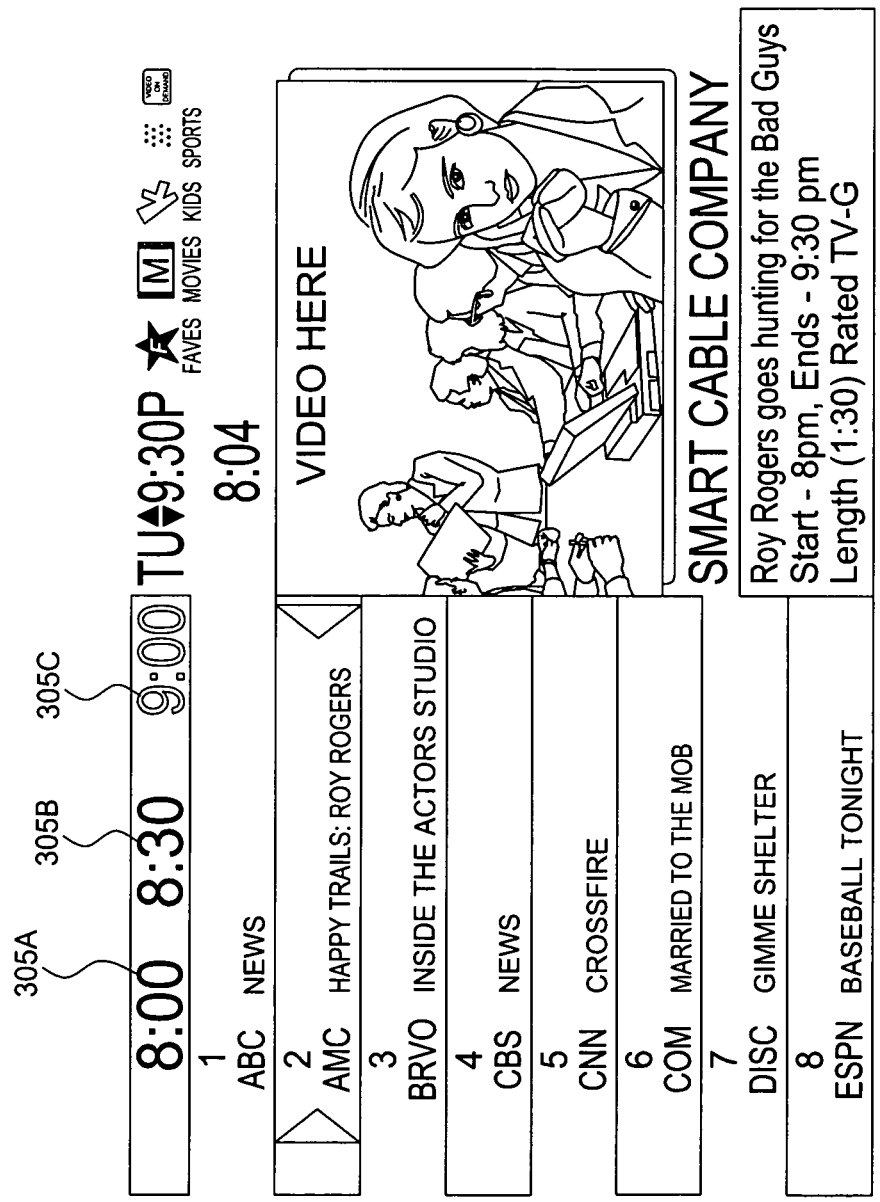

Referring simultaneously to FIGS. 6A through 6C, FIG. 6A depicts an IPG display 600A having the first time slot 305A emphasized and each of the title objects 311A associated with the first time slot being revealed, while each of the title objects 311B, 311C associated with the non-emphasized time slots 305B and 305C are masked (hidden). In FIG. 6A, the first time slot object 305A is emphasized, and the second and third time slots 305B and 305C are de-emphasized; in FIG. 6B the second time slot object 305B is emphasized, while the first and third time slot objects 305A and 305C are de-emphasized; and in FIG. 6C the third time slot object 305C is emphasized while the first and second time slot objects 305A and 305B are de-emphasized. Note that in all cases the operation of the title description object 350 remains unchanged, as does the operation of the video barker 320 and all the other functional elements of the program guide. By using the mask and reveal technique, the irrelevant information in the IPG is effectively removed to simplify the user interface. When the user has previously defined certain programs as favorites, the subsequent selection of the "favorites" icon 335 masks all non-favorite programming. Similarly, selecting the "sports" icon 338 masks all non-sports programming.

Figure 7A:
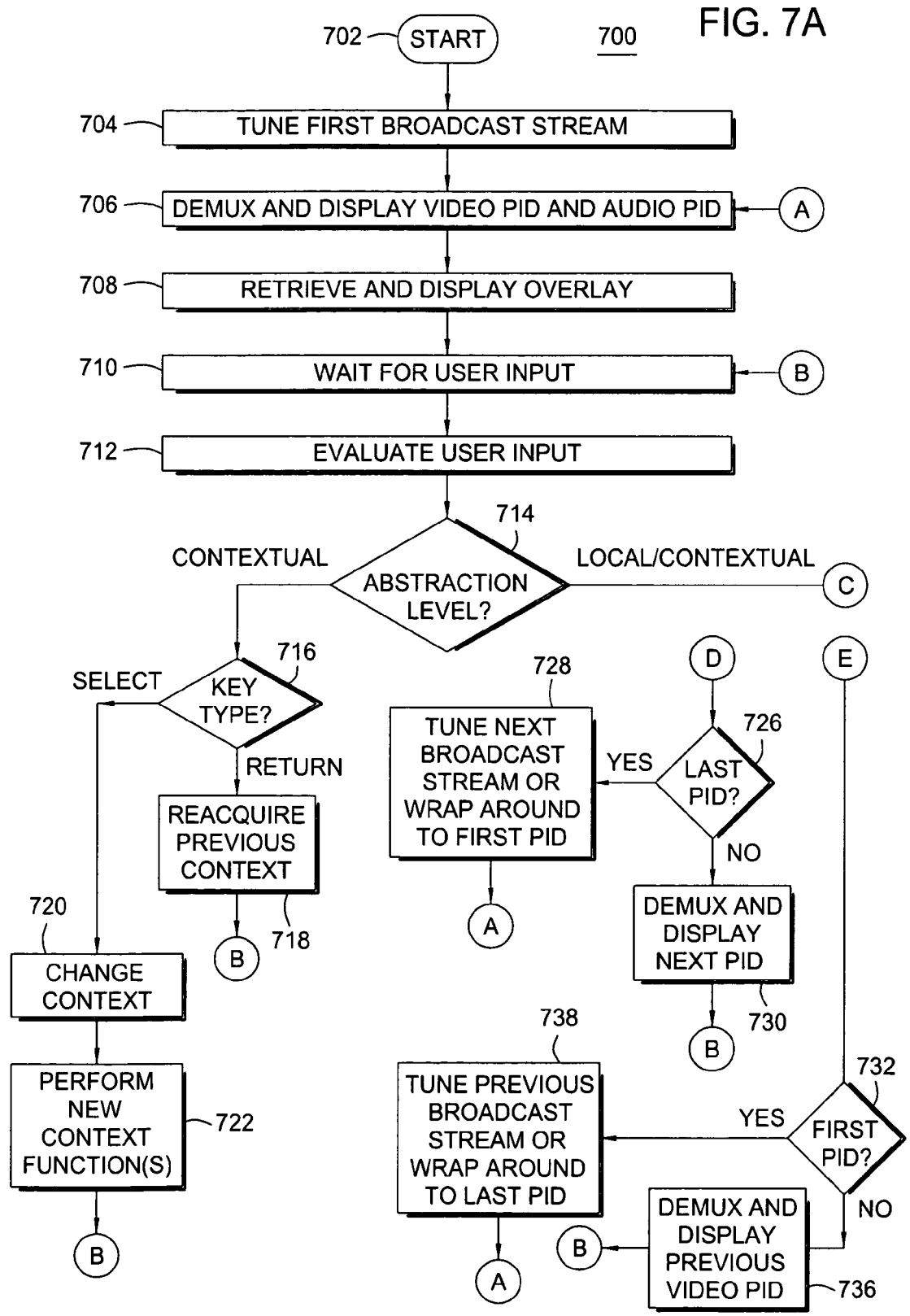
FIGS. 7A-7B depict a flow diagram of a user interaction routine.
Figure 7B:
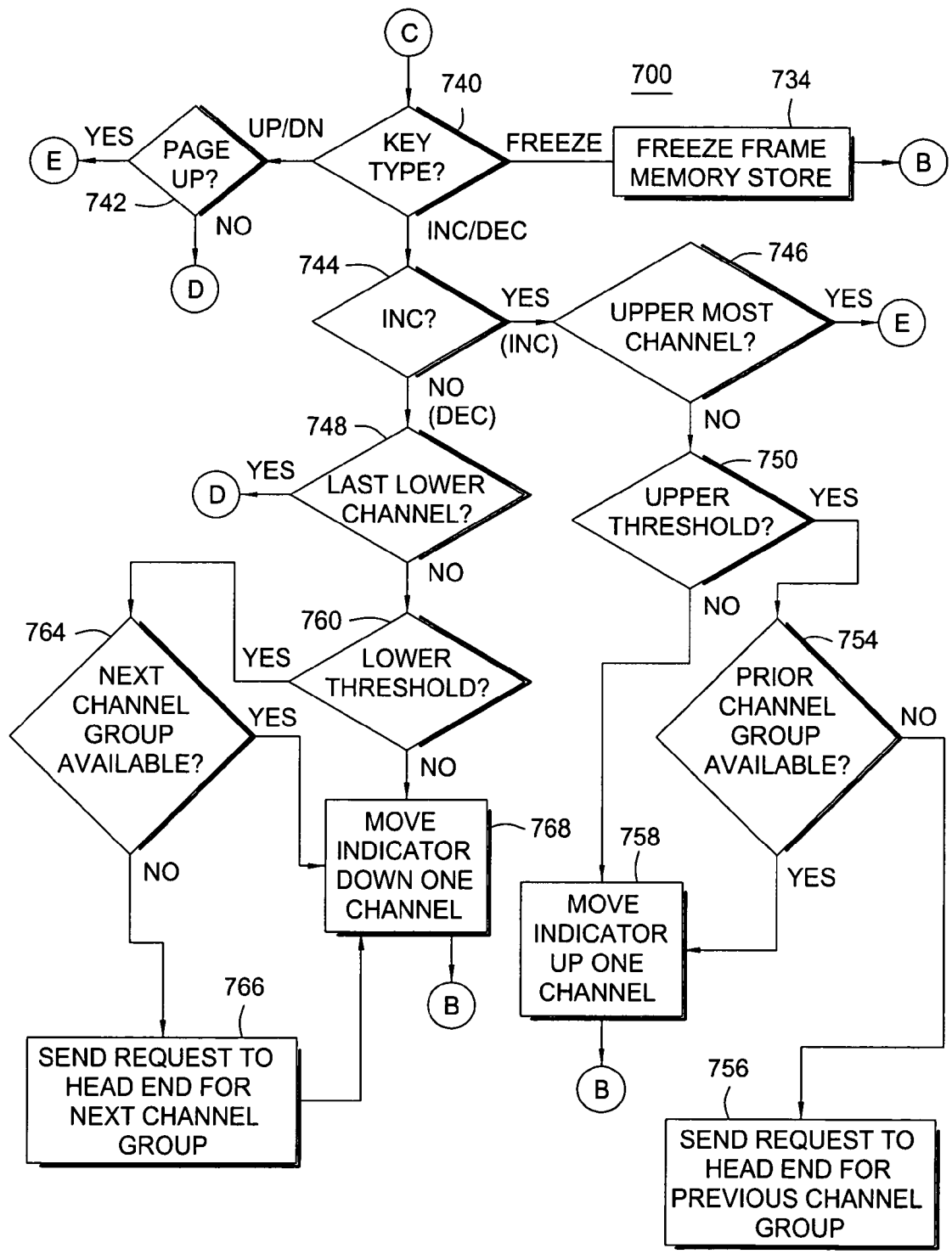

FIGS. 7A and 7B together form FIG. 7 and comprise a user interaction method 700 according to the invention. FIG. 7 depicts a user interaction routine 700 according to the invention. The routine 700 is entered at step 702, when the subscriber equipment is initially powered on or initialized. The routine then proceeds to step 704, the first or default stream is tuned and demodulated. The routine 700 then proceeds to step 706, the first or default video stream and associate audio stream is demultiplexed and displayed. The routine 700 then proceeds to step 708, where an appropriate overlay is retrieved and displayed along with the displayed or presented video stream. The routine 700 then proceeds to step 710, where the STT waits for user input via, e.g., remote control device 280. Upon receipt of user input, the routine proceeds to step 712 to evaluate the input. The routine 700 then proceeds to step 714, where a query is made as to whether the user interaction abstraction level is contextual, i.e., the contextual IPG changes that requires information to be sent from head end or local/contextual that carries interaction processes both locally at STT and request information from head end.

If the query at step 714 indicates that a contextual change is requested by the viewer, then the method 700 proceeds to step 716, where a query is made for the pressed key type. If a RETURN key is pressed, the algorithm proceeds to 718, where the system reacquires the previous context. For example, the viewer may have previously been viewing a movie preview and, at the end of the preview, the viewer has been returned to the IPG context. If the viewer then presses the RETURN key, he or she is returned to the previous context and the movie preview is re-displayed. At the end of the requested context presentation, the method 700 returns to step 710.

If, at step 716, the viewer presses a SELECT key to select a presently emphasized or highlighted object, the method 700 proceeds to step 720 where the context is identified as being changed. At step 722, the new context functions are performed. For example, the user may have highlighted and then selected the "video-on-demand" icon. Such a selection will cause the system to enter the video-on-demand (VOD) context. In this context, the STT is sent a VOD navigator in a pointcast manner to enable the user to select a movie to view. Other context changes result when the viewer selects the video barker, any of the programs in the guide region of the IPG display, and the like. Barker selection causes the system to enter a barker defined context, i.e., a movie, if the barker was displaying a movie preview; a sales page, if the barker was advertising a product; and so on. The selection of a program available for viewing in the current time frame causes the system to send the program video to the STT's either as pointcast or broadcast stream. The stream type depends upon the program selection. The selection of a program listed in an upcoming time slot results in display of a preview of the selected program.

If the query at step 714 indicates that local interactivity is requested by the user, then the method 700 proceeds to step 740, where a query is made to identify the type of key pressed by the user. If the query at step 740 indicates that a freeze key has been pressed, then the method 700 proceeds to step 734, where the video frame presently stored in the frame store unit 262 is frozen. That is, the frame store unit 262 is not updated by subsequent video frames until such time as a freeze key or other key is pressed. The method 700 then proceeds to step 710, where the processor waits for user input.

If the query at step 714 indicates that one of an increment or decrement key has been pressed (e.g., a channel indication increment or decrement command), then the method proceeds to step 744. If the query at step 740 indicates that one of the page up or page down keys has been depressed, then the method 700 proceeds to step 742.

At step 742, a query is made to determine whether the page up key has been pressed. If this is the case, then the method 700 proceeds to step 732. Then, a query is made at step 732 to determine whether the PID being viewed is the first PID in the transport stream. If this is the case, then, depending on the organization of the video PID's in a single or multiple transport streams, either it is tuned to the previous broadcast stream or it is wrapped around to the last video PID in the same transport stream. If the query at step 732 reveals that the PID is being viewed is not the first PID in the transport stream, then the previous video PID in the same transport stream is demultiplexed and displayed at step 736. If the query at 742 indicates that a page down key has been pressed, then the method 700 proceeds to step 726. Then, a query is made at step 726 to determine whether the PID being viewed is the last PID in the transport stream. If this is the case, then, depending on the organization of video PID's in a single or multiple transport streams, either it is tuned to next broadcast transport stream or it is wrapped around to the first video PID in the same transport stream at step 728. If the query at step 726 reveals that the PID being viewed is not the last PID in the transport stream, then the next video PID in the same transport stream is demultiplexed and displayed at step 730.

At step 744, a query is made as to whether an increment key has been pressed. If the query at step 744 is answered affirmatively, then the method 700 proceeds to step 746. If the query at step 744 is answered negatively (i.e., a decrement key has been pressed), then the method 700 proceeds to step 748.

At step 746, a query is made as to whether the upper most channel of the program guide (i.e., channel content object 310-1) is presently indicated by channel icons 341A and 341B. If the query at step 746 is answered affirmatively, then the method 700 proceeds to step 732 and continues as described above with respect to step 732. If the query at step 746 is answered negatively, then the method 700 proceeds to step 750.

At step 750 a query is made as to whether an upper threshold level has been reached. An upper threshold level is a pre-set channel number (in the group of channels of an IPG page) at which a request for a prior channel PID should be made if such a prior channel PID is unavailable. If the query at step 750 is affirmatively answered, then the method 700 proceeds to step 754. If the query at step 750 is negatively answered, then the method 700 proceeds to step 758.

At step 754, a determination is made as to whether the prior channel group is available. An available channel group is a channel group within a video stream that is presently being broadcast or narrow cast or pointcast to one or more set top terminals. As previously noted, the set top terminal receives information associating each channel group with a particular video stream as identified by a unique PID. If the unique PID, or the stream associated with the unique PID is not being broadcast, narrow cast or pointcast, then it is appropriate at this time to request that the head end begins a pointcast session so that the prior channel group can be received by the set top terminal without undue delay (e.g., without the user experiencing latency due to the amount of time required to process and respond to a request for a video stream). If the query at step 754 is answered negatively, then the method 700 proceeds to step 756, where a request for the prior channel group is sent to the head end for processing. The method then proceeds to step 756. If the query at step 754 is answered affirmatively, then the method proceeds to 758.

At step 758, the channel indicator is moved up by one channel content object 310. That is, the channel content object immediately above the presently indicated channel content object is now indicated. The method 700 then proceeds to step 710, to wait for the next user input.

If the query at step 744 is negatively answered, then the method 700 then proceeds to 748. At step 748, a query is made as to whether the presently indicated channel is the last lower channel. That is, a query is made as to whether the presently indicated channel is channel content object 310-8 in FIG. 3A. If the query at step 748 is answered affirmatively, then the method 700 proceeds to step 726. It is important to note that if the presently indicated channel is associated with channel content object 310-8, then a decrement command, as noted above with respect to FIG. 5B and path 532 requires the selection of the next channel PID to display the upper most channel of the next channel group (i.e., channel content object 310-1 of the next channel group). If the query at step 748 is answered negatively, then the method 700 precedes to step 760.

At step 760, a query is made as to whether a lower threshold has been reached. If the query at step 760 is answered negatively, then the method 700 proceeds to step 768. If the query at step 760 is answered affirmatively, then the method 700 proceeds to step 764.

At step 764, a determination is made if the next channel group is available. This is, similar to step 754 described above, a determination is made if a presently broadcast, narrowcast, or pointcast stream includes an IPG guide display including information related to the next channel group. If the query at step 764 is answered affirmatively, then the method 700 proceeds to step 768. If the query at step 764 is answered negatively, then the method 700 proceeds to step 766.

At step 766, a request is made by the set top terminal to the head end for the head end to send information associated with the next channel group (i.e., the guide and image portions of the IPG display including the next channel group, or alternatively, a previously stored video screen including the appropriate information). As previously noted, by requesting such information at this point the apparent latency of the system, as experienced by the user, is greatly reduced. The method 700 then proceeds to step 768.

At step 768, channel icons 341A and 341B are decremented or moved down by one channel content object 310. The method 700 then proceeds to step 710, where it waits for user input.

FIG. 11 depicts a tabular representation of the functions of various keys on an input device, such as a remote control, during guide region and image region operation. The functions of some of the depicted keys have been described above and, therefore, will not be additionally discussed. Specifically, FIG. 11 depicts the guide region and image region functionality of the increment (up arrow), decrement (down arrow) page up, page down, horizontal increment (move right), horizontal decrement (move left) select and add/remove keys. The Select key is used to select a highlighted or emphasized object to, e.g., enter a different operating mode (image region response) of tune an indicated channel (guide region response). The add/remove key is used to add a presently tuned channel to the list of favorites. If the presently tuned channel is already on the list, then the channel is removed form the list of favorites. Optionally, the viewer is queried as to whether the viewer really intends to remove the channel from the favorites list.

Figure 8:
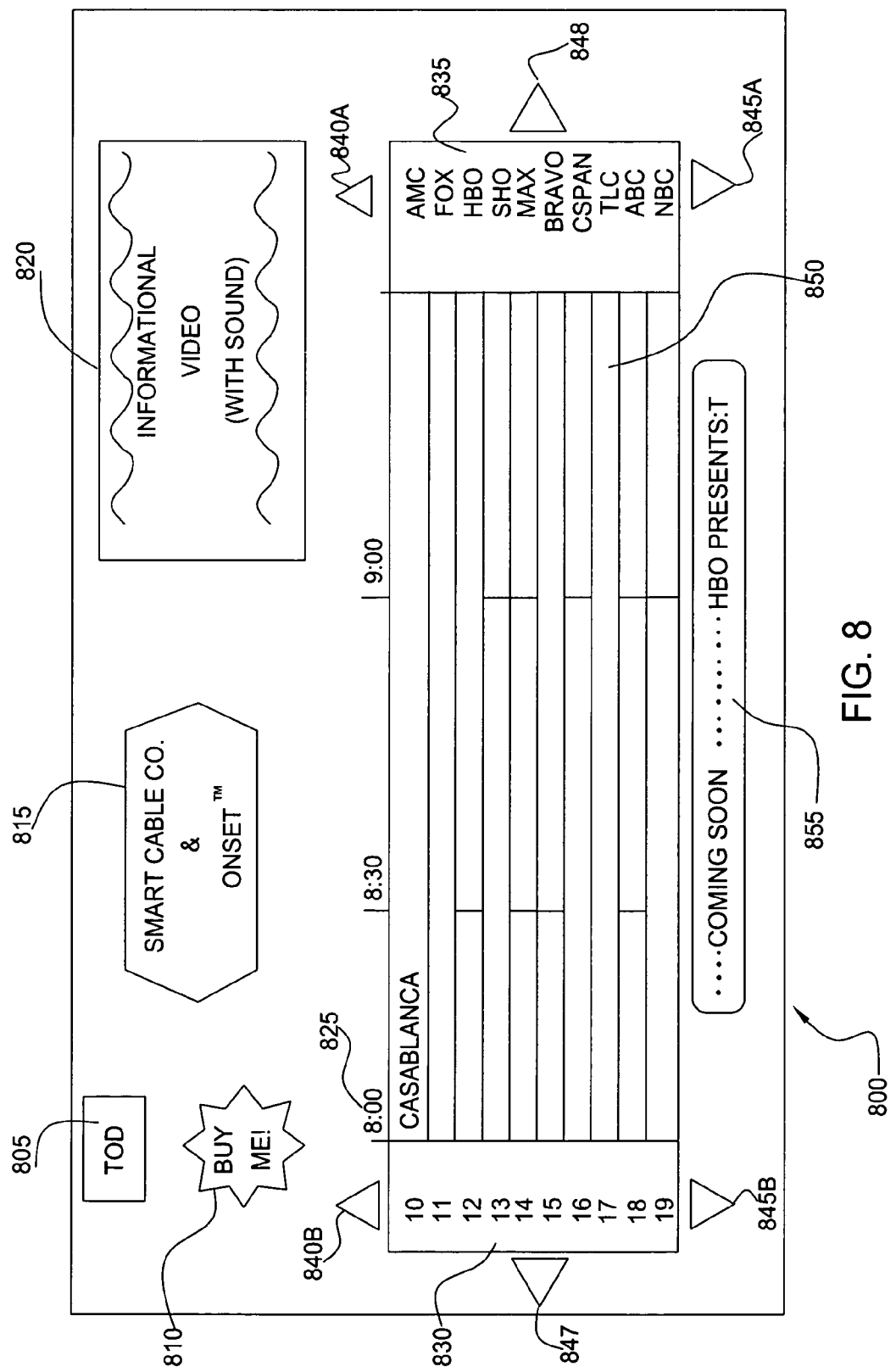
FIG. 8 is a third embodiment of an interactive user interface.

FIG. 8 depicts third embodiment of an interactive program guide (IPG) 800 according to the invention. Specifically, the exemplary interactive program guide screen 800 comprises a time of day/date (TOD) indicator 805, a promotional "splash" icon 810, a cable system or provider logo 815, a video barker 820 (and associated audio barker), a program time indicator 825, a channel number indicator 830, a channel identifier (text or logo) 835, a pair of channel display decrement icons 840a and 840b, a pair of channel display increment icons 845a and 845b, a temporal increment icon 848, a temporal decrement icon 847, a program grid 850 and a scrolling promotional banner 855. The interactive program guide display 800 is displayed on a television screen or other video presentation device in, e.g., the home of a subscriber to a cable television or other information distribution system utilizing the interactive electronic program guide.

FIG. 8 depicts third embodiment of a display screen of an interactive program guide (IPG) 800 that is formed in a manner similar to that described above with respect to the IPG display 300 of FIG. 3. The primary differences between the IPG displays of FIG. 8 and FIG. 3A are as follows:

1. The IPG display 300 shows only the programs at a specified time interval, such as 8:30 to 9 PM, whereas display 800 shows the complete time interval.

2. The IPG display 300 does not contain grid structure to show the program versus time interval information. It is a completely unique user interface design.

3. The IPG display 800 of FIG. 8 utilizes a program grid 850 to present programming information, whereas the IPG display 300 of FIG. 3A utilizes an enhanced "mask and reveal" technique to present more information to a viewer while reducing the amount of display clutter experienced by the viewer in navigating through the available programming choices. Only the desired programs are shown.

4. The IPG display 300 of FIG. 3A includes a program description object 350 that is used to display, illustratively, a brief textual description of a program occupying a presently indicated time slot of a presently indicated channel.

In addition to these differences, there can be found many other ones to differentiate the two user interfaces. However, the supporting system is designed to produce either of these interfaces.

Upon receiving a "select" entry from the remote control unit, the set top terminal transmits, via a back channel or some other communications path, the information that identifies the selected object to the head end. It is important to note that, as with the mask and reveal technique, changing the emphasis of an object or element is performed entirely at a local level within the STT. That is, there is no change in the actual video information transmitted by the head end to the subscriber.

Only the graphical overlay layer on the display is changed within the STT to facilitate object emphasis.

The interactive program guide display 800 (i.e., the video layer provided by the head end) depicts a program offering of 10 channels within a 1.5 hour time interval. Since there are 24 hours in a day, 16 video streams (each representing one program guide screen) are required to depict 24 hours of program offerings of 10 channels. These 16 video streams may be included within a single transport stream. Thus, a user desiring to view the next 1.5 hour time interval (e.g., 9:30-11:00) may activate a "scroll right" object (or move the joystick to the right when a program within the program grid 850 occupies the final displayed time interval). Such activation will result in the controller of the STT noting that a new time interval is desired. The digital video stream corresponding to the new time interval will then be decoded and displayed, i.e., the STT selects the bitstream within the transport stream that represents the desired program guide and decodes that bitstream. The process for selecting and decoding a bitstream is accomplished in the same manner as described above.

Figure 9:
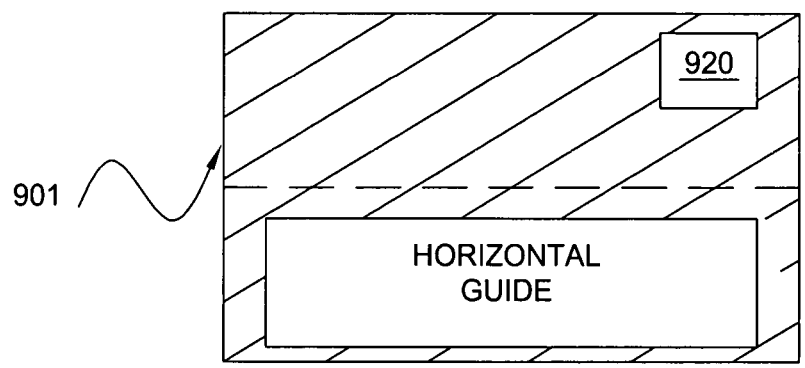
FIG. 9 depicts a first example of a layout for an IPG page.
Figure 10:
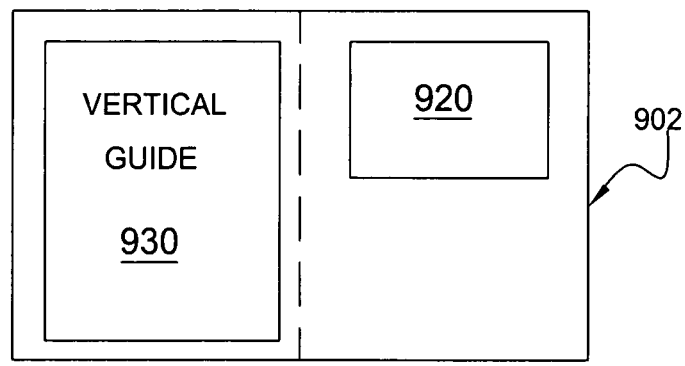
FIG. 10 depicts a second example of a layout of an IPG page.

FIGS. 9 and 10 are graphical depictions of two different program guide layout formats. FIG. 9 depicts a program guide screen comprising a horizontally disposed guide region 910 occupying a large portion of a lower half of the IPG screen 901, and a video barker or image portion 920 occupying a portion of the top half of the screen 901. FIG. 10 depicts a program guide screen comprising a horizontally disposed guide region 1010 occupying a large portion of a lower half of the IPG screen 1002, and a video barker or image portion 1020 occupying a portion of the top half of the screen 1002.

The foregoing description details three layouts for a user interface, however, any user interface layout that can be produced in a head end as a digital video bitstream and sent to a user is considered to be within the scope of the invention. As a further example, the informational video could be a program that is being watched and the graphical imagery could be an HTML page that is associated with the program. The program video could also be contained in the IPG display such that the viewer can continue watching a program while browsing the IPG for other program scheduling information.

Figure 12A:
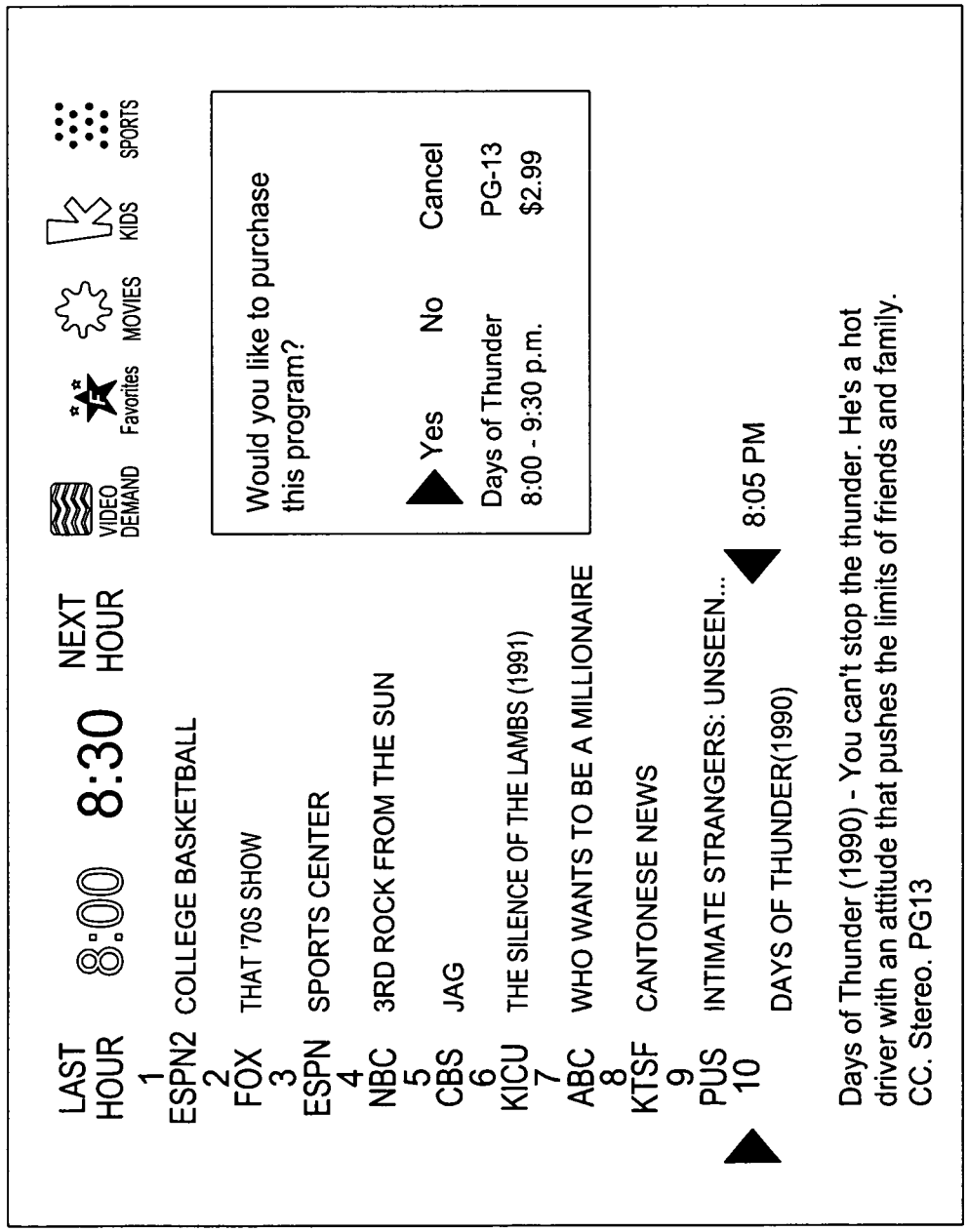
FIGS. 12A-B depict a fourth embodiment of a server-centric interactive user interface.
Figure 12B:
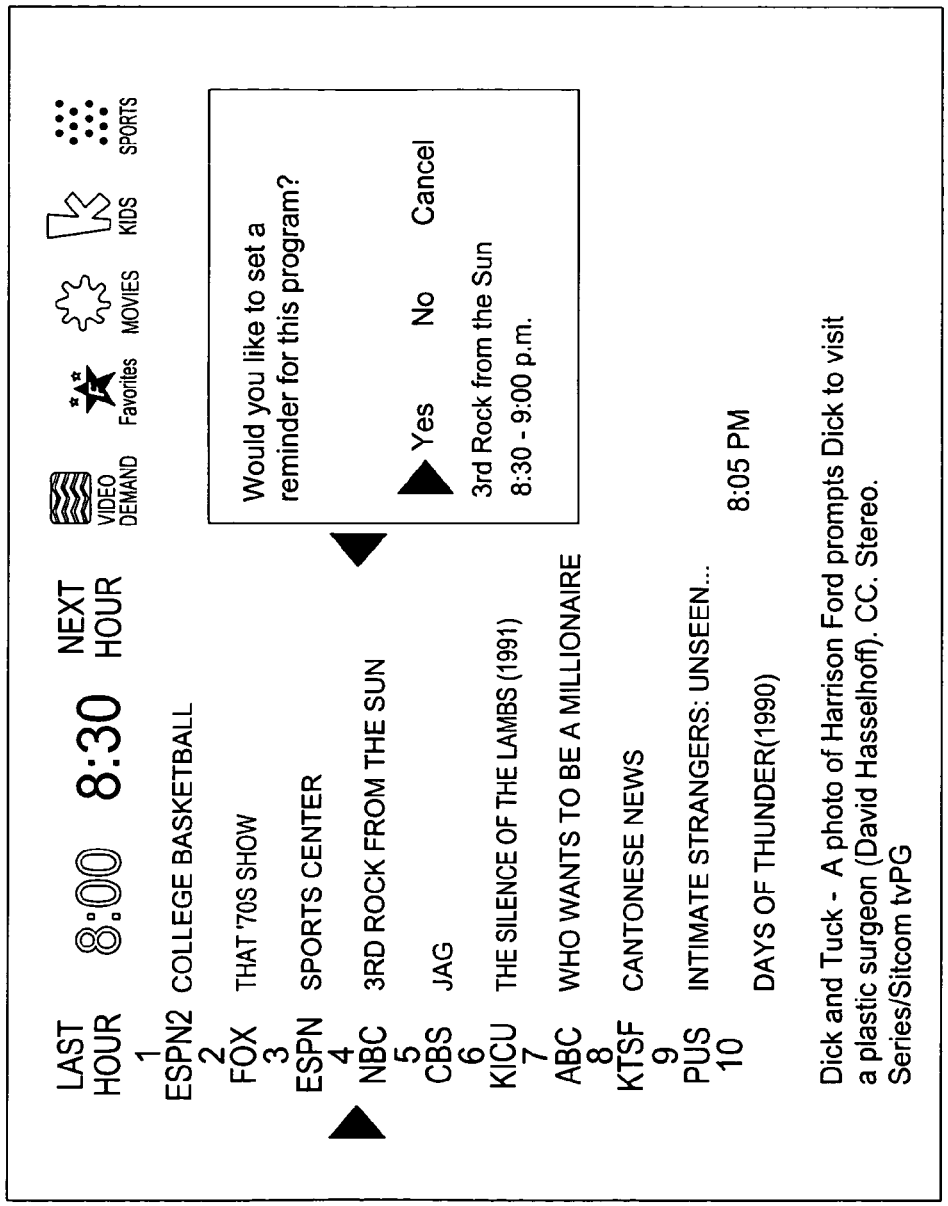

FIG. 12A-B depict a fourth embodiment of a server-centric interactive user interface. Preferably, the present invention is used in conjunction with this embodiment of a server-centric UI. However, the present invention also has applicability beyond this particular embodiment.

The UI 1200 of FIGS. 12A-B provides for services such as impulse purchasing and reminders. In particular, FIG. 12A shows a screen 1200 which provides for impulse purchasing of pay per view (PPV) content, and FIG. 12B shows a screen 1250 which provides for a programming reminder.

The screen 1200 of FIG. 12A illustrates impulse purchasing of PPV content. A selectable PPV broadcast ["Days of Thunder (1990)"] and a corresponding beginning time of the PPV broadcast ["8:05 PM"] are displayed on the screen 1200. This PPV information is provided along with the broadcast programming data for timeslots during which the PPV broadcast occurs. For example, if the PPV broadcast is to occur from 8:05 pm to 9:25 pm, then the in order to encourage impulse purchasing of the PPV content. In the particular screen 1200 shown, the PPV information would be displayed along with programming guide data for the 8:00 pm, 8:30 pm, and 9:00 pm timeslots.

When the title of the PPV content is selected, the title is highlighted (for example, by changing color), and a description of the PPV content is provided ["Days of Thunder (1990)—You can't stop the thunder. He's a hot driver with an attitude . . . "]. The description is provided in a box that goes from the left side to the right side on the bottom of the screen. In contrast, a similar description box in FIG. 6A-6C goes from only the middle to the right side on the bottom of the screen.

In addition, a pop-up object appears which prompts the viewer as to whether he/she wishes to purchase the PPV program. The pop-up object may lay over the video barker and may be drawn by the STT from data stored at the STT (or alternately encoded at the head end and downloaded as a video stream to the STT). By selecting the "Yes" in the pop-up object, the viewer is able to purchase the PPV program for viewing. In one embodiment, a password would need to be entered in order to authorize the purchase. Optionally, the ability to make such a purchase may be disabled during the last several minutes of the PPV program since viewers are unlikely to want to pay for viewing only the last several minutes.

The screen 1250 of FIG. 12B illustrates provision of a programming reminder. A broadcast program ("4 NBC 3rd Rock from the Sun") is shown at a particular future timeslot (8:30 PM).

When the title of the broadcast is selected, the title is highlighted (for example, by changing color), and a description of the broadcast program is provided ["Dick and Tuck—A photo of Harrison Ford . . . "]. In addition, a pop-up object appears which prompts the viewer as to whether he/she wishes to set a reminder for the program. The pop-up object may lay over the video barker and may be drawn by the STT from data stored at the STT (or alternately encoded at the head end and downloaded as a video stream to the STT). By selecting "Yes" in the pop-up object, the viewer sets the reminder. Once the reminder is set, then at or slightly before the program is to begin, the STT will provide a reminder by display and/or sound.

Figure 13:
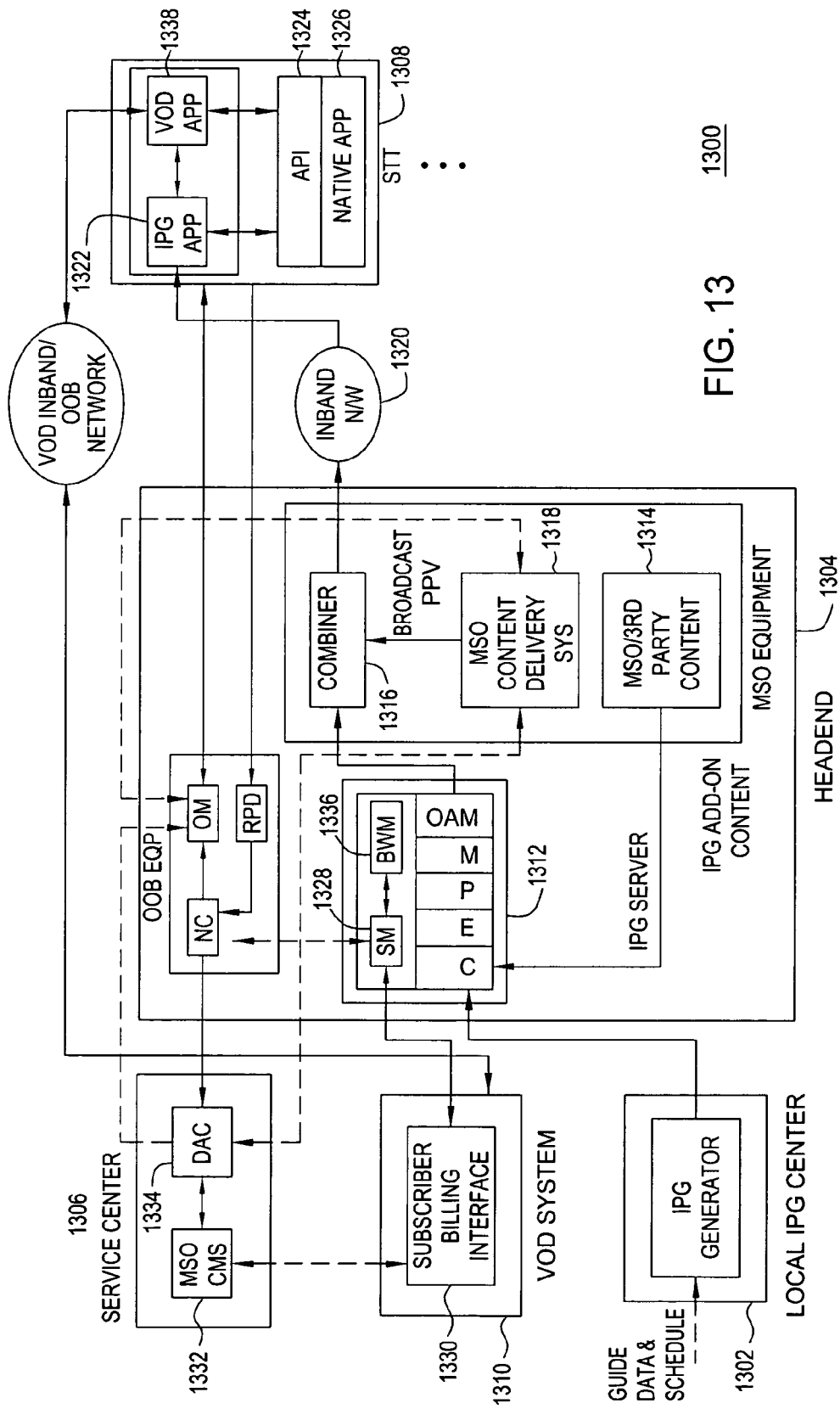
FIG. 13 depicts a server-centric system architecture for managing delivery of an interactive user interface.

FIG. 13 depicts a server-centric system architecture 1300 for managing delivery of an interactive user interface. A preferred embodiment of the present invention utilizes the server-centric system architecture 1300 to provide for impulse purchasing and other services. However, the present invention also has applicability in conjunction with other system architectures.

The server-centric system architecture 1300 includes a local interactive program guide (IPG) center 1302, a head end 1304, a service center 1306, and a plurality of set-top terminals (STT) 1308. In addition, the system may be integrated with a video on-demand (VOD) system 1310 and a corresponding VOD application 1338 at the STT 1308.

The local IPG center 1302 generates guide page user interface (UI) screens and periodically sends the UI screens to an IPG server 1312 at the head end 1304. MSO/third party IPG add-on content 1314 may be provided to the IPG server 1312 from MSO equipment within the head end 1304. For example, the add-on content may include real-time advertisement video or HTML pages for electronic commerce.

The IPG server 1312 composes (C), encodes (E), processes (P), multiplexes (M), and modulates (QAM) the IPG content (guide plus add-on content) and transmits it to a combiner 1316. The combiner 1316 combines the IPG content with broadcast TV, premium content (e.g., HBO), pay-per-view (PPV), and other content from a multiple service operator (MSO) content delivery system 1318. The combined content is then broadcast to the STTs 1308 via an in-band distribution network 1320.

Upon viewer tuning of the STT 1308 to the IPG channel, an IPG application 1322 at the STT 1308 processes the IPG stream and provides the IPG via an application programming interface (API) 1324 to a "native" application 1326 running on the STT 1308. The native application 1326 decodes and presents the IPG to the viewer.

In one embodiment, the TV program guide for a current time period (1.5 hours) is broadcast to viewers. In addition, two weeks of look-ahead TV programming may be delivered to viewers on demand via demand-cast. Upon a view action of moving a cursor to a look-ahead time interval, the STT 1308 sends a request via a back channel to a session manager (SM) 1328 [for example, via an OOB channel to a reverse path demodulator (RPD), then to a network controller (NC), then to the SM 1328]. The SM 1328 then causes the IPG server 1312 to multiplex the requested IPG page into the IPG stream.

The SM 1328 also interacts with a subscription/billing interface 1330 in the VOD system 1310 to coordinate access to VOD services from a link in the IPG user interface (UI). The UI also provides for access to premium content and pay-per-view purchasing by interacting through a two-way interface to a MSO customer management system (CMS) 1332 and digital access controller (DAC) 1334 in the service center 1306. The DAC 1334 generates digital encryption-related keys.

The server-centric system architecture 1300 also includes a bandwidth manager (BWM) 1336. The BWM 1336 provides techniques for more efficient utilization of the finite bandwidth available for distribution of the interactive user interface.

Figure 14:
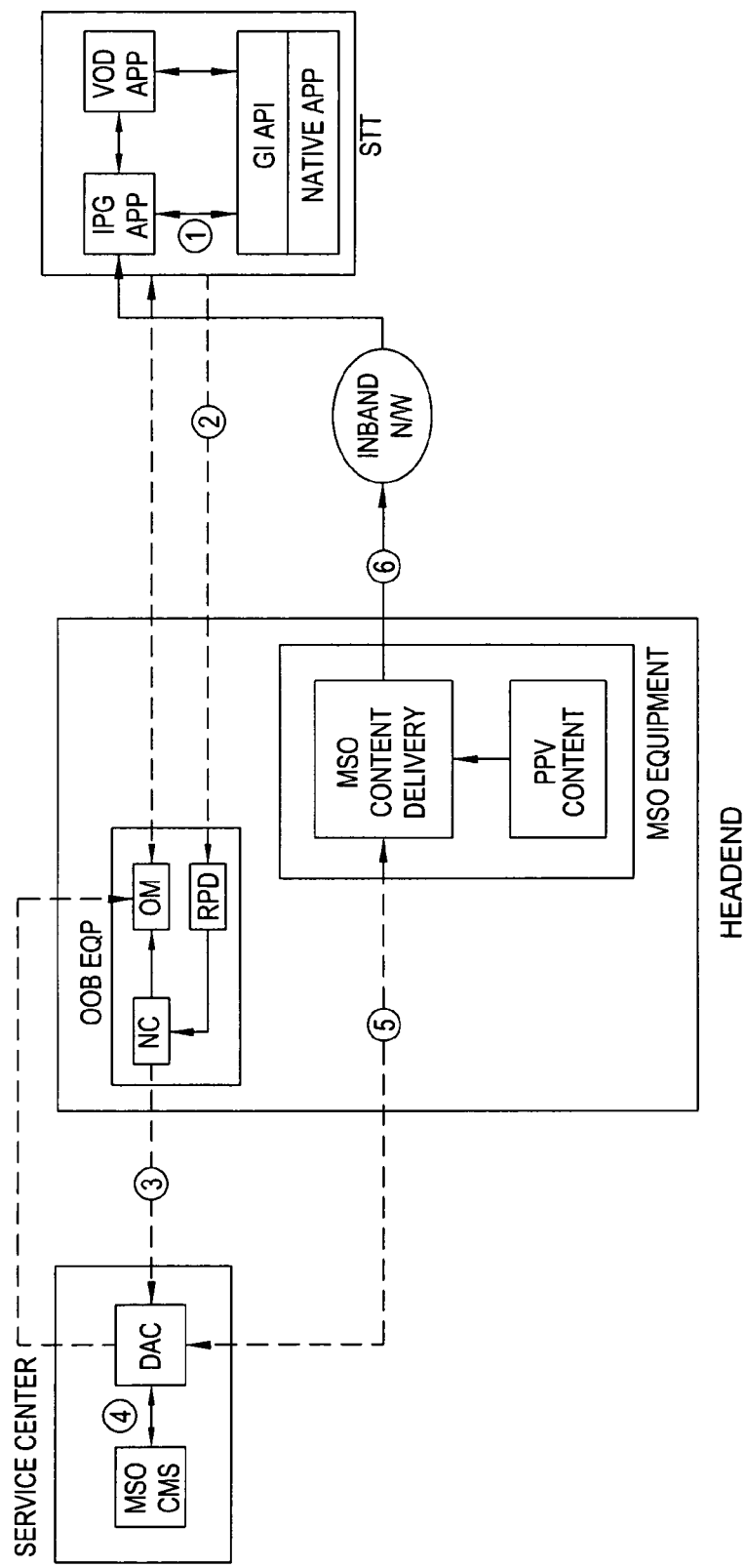
FIG. 14 depicts a process within the system architecture that enables impulse pay-per-view purchasing via a server-centric interactive user interface.

FIG. 14 depicts a process within the system architecture 1300 that enables impulse pay-per-view purchasing via a server-centric interactive user interface. As shown in FIG. 14 with the circled numbers, the IPPV purchasing process starts with step 1 at STT with the IPG Application sending a purchase request to the application programming interface (API). The viewer interactions captured via the IPG PPV user interface and the IPG application is passed through the API to the Native Application via API calls.

The Impulse PPV request messages are stored locally at the STT until they are transmitted to the digital access control (DAC) at the Service Center. The DAC periodically collects purchase order data, collects the purchase requests through the OOB path comprising paths 2 and 3.

After the purchase request reaches to the DAC, it is passed to the CMS for authorization via path 4. The CMS then authorizes (or declines) the request by sending a response to DAC.

If CMS authorizes, then DAC sends the authorization message (ecm) and encryption keys (emm) to the MSO Content Delivery System (IRT's) as step 5. The PPV content is then delivered to the STT as shown in step 6.

If CMS declines the purchase request, then DAC sends the decline response to STT through NC and OM in OOB equipment.

Note that Live Events such as Boxing Games, Music Concerts can be processed within the same context as IPPV by considering such events as PPV but shown only once.

Figure 15:
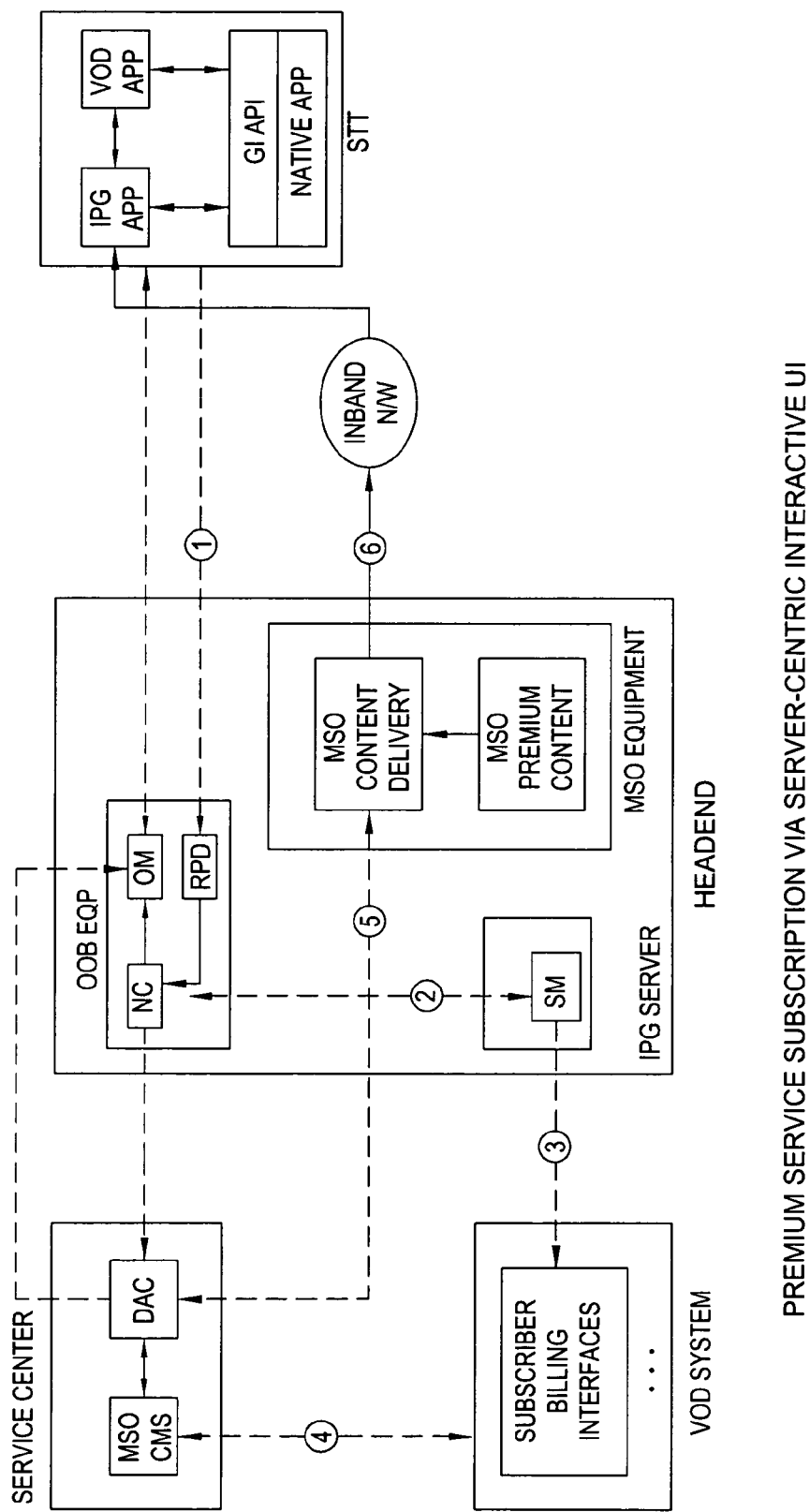
FIG. 15 depicts a process within the system architecture that enables premium service subscriptions via a server-centric interactive user interface.

FIG. 15 depicts a process within the system architecture 1300 that enables premium service subscriptions via a server-centric interactive user interface. In order to provide the subscription process, the IPG Session Manager and IPG/VOD Subscriber/Billing Interface components are involved in the processes, in addition to DAC, with the messaging sequence as shown in FIG. 15.

The process starts as IPG Application sends a subscription request to SM following the OOB paths 1 and 2 in FIG. 15. With this path, the viewer interactions/requests captured via the IPG Premium Services Subscription user interface is passed to SM.

SM then passes the subscription request, along with the STT information, to the MSO CMS via the Billing Interface though paths 3 and 4. As the Premium Services Content and the subscribers belong to the MSO, subscriber information is not required to be maintained within the IPG system. The CMS then authorizes (or declines) the request by sending a message to DAC.

If CMS authorizes the subscription, via checking subscriber information and limits, then DAC sends the authorization message (ecm) and encryption keys (emm) to the MSO Content Delivery System (IRT's) as step 5. The Premium Services content is then delivered to the STT as shown in step 6. If the authorization is handled by a satellite-based national conditional access center, then the path 5 is replaced by the MSO via a satellite delivery. Upon STT receiving the authorization, the STT force-tunes to the Premium Service channel.

Note that in order to provide security in subscription, a password table/update mechanism can be maintained by SM. In such a password protected system, a viewer can subscribe to premium service by providing password information via the interactive user interface, which is then delivered to the SM along with the requested premium service information.

Figure 16:
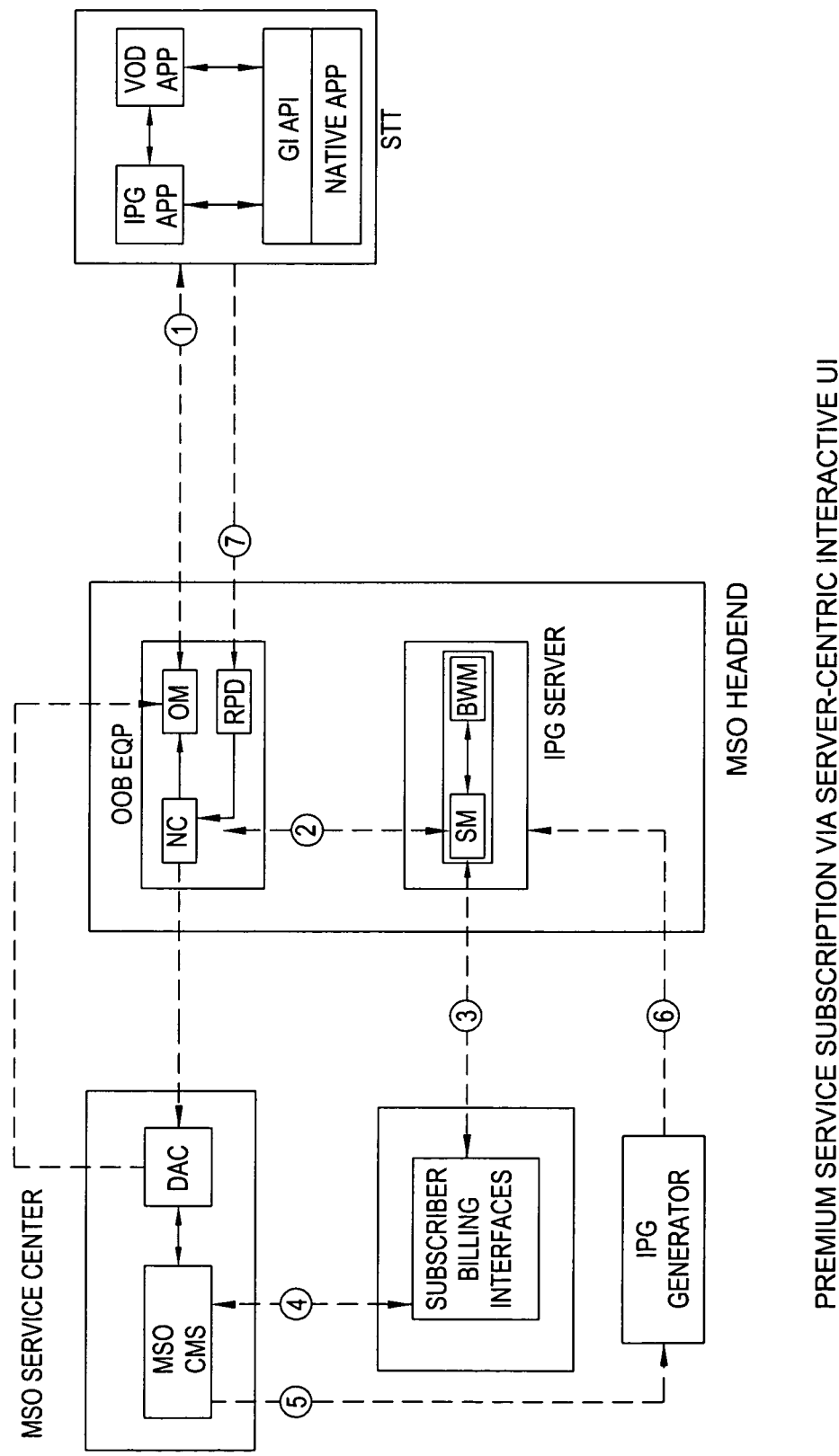
FIG. 16 depicts a process within the system architecture that enables impulse purchasing from advertisements via a server-centric interactive user interface.

FIG. 16 depicts a process within the system architecture 1300 that enables impulse purchasing from advertisements via a server-centric interactive user interface. The impulse purchasing from Ads, where the viewer is not involved personally with a sales person, is another e-commerce type (e.g., TV-commerce) that may attract viewers in near future in broadband world similar to the Internet.

One model is to replace the telephone purchase ordering with the two-way IPG system in dedicated TV-commerce channels and non-commerce channels. A telephone number in a dedicated channel is constantly displayed, and in a non-dedicated channel, a telephone number is displayed during certain periods along with advertisements.

In any of these cases, by replacing the telephone ordering process with the automated ordering via IPG will save operator/operation costs for the product-selling company. Considering these savings, IPG provider and MSO can jointly bill the product-selling company per each transaction as (fixed) commission-based or for a percentage, which is then shared between MSO and IPG provider.

Currently, for impulse ordering from advertisements, the CMS-to-DAC-to-STT path does not have real-time message processing capability. The following sections discusses possible systems and user interfaces for commerce-dedicated and non-dedicated channels.

For such a functionality, the system shown in FIG. 16 can be utilized. The illustrated system assumes CMS having the complete product information being advertised in a dedicated channel (s) which is retrieved by the IPG generator non-realtime ahead of time of purchasing transaction via path 5 (Another data center instead of CMS can be reached via path 5 if CMS does not have complete product information).

The IPG generator produces IPG impulse buying user interface bitmaps, which are then sent to STT through paths 6, 2, and 1 as OOB data. Such bitmap data can be loaded to STT via OOB periodically before the product is advertised, at a different time that the other OOB data. Or, this data can be demandcast to STT as requested. While the later introduces slight delay, it might be preferred due to limited time usage of viewer ordering process and requiring less STT memory footprint.

The TV-commerce user interfaces can be designed in a few different ways. IPG user interface icon, e.g., might appear as a constant screen on a corner of a TV-commerce channel (e.g., where the 800 tel. no. appears), upon click on brings the product information, and consequently ordering pages. Or, the IPG user interface can appear on the TV-commerce screen on request by clicking TV-commerce button, or similar one, on remote control, when the viewer decides to buy a product. A TV-commerce icon in IPG user interface may be clicked to list the current dedicated commerce channels. Upon viewing of this interface, viewer may click on a desired commerce channel to tune to it.

After the IPG user interface appears as overlaid on a dedicated channel, as soon as the viewer hits the purchase icon, a set of new interfaces appears to receive password data, product confirmation, . . . , and information. all of which are forwarded to the SM through reverse path. The same IPG overlay can be made to disappear from the TV-commerce channel upon viewer request.

The IPG Application sends the purchase request information to SM via paths 7 and 2. Then SM, passes this information through Billing Interface to MSO CMS via paths 3 and 4. The CMS checks the purchase request, and if authorizes, sends a response to SM via paths 4 and 3. Then, SM sends an OOB acknowledgement message to STT through paths 2 and 1. There is no inband stream in this example to be sent to STT (Assuming the TV-commerce is selling products/content to be shipped via outside resources than MSO's system)

If the content purchased from advertisement is a music file or some other content to be streamed by MSO, then MSO CMS uses inband content delivery to STT in addition to the described processes above.

For such TV-commerce impulse transactions, password mechanism and customer credit card information may be needed.

In a non-dedicated channel, a telephone number is displayed during certain periods along with the advertisements. The main difference of this case from the dedicated channel is the coordination of tremendous number of product information that appears with advertising in various channels. If the product information is available at CMS or a third party system, then IPG system works the same way as described above for the Dedicated Channels: e.g., during or at the end of an advertising, a pop-up IPG screen is used to initiate the impulse buying process. This user interface may also be demandcast as OOB.

Figure 17:
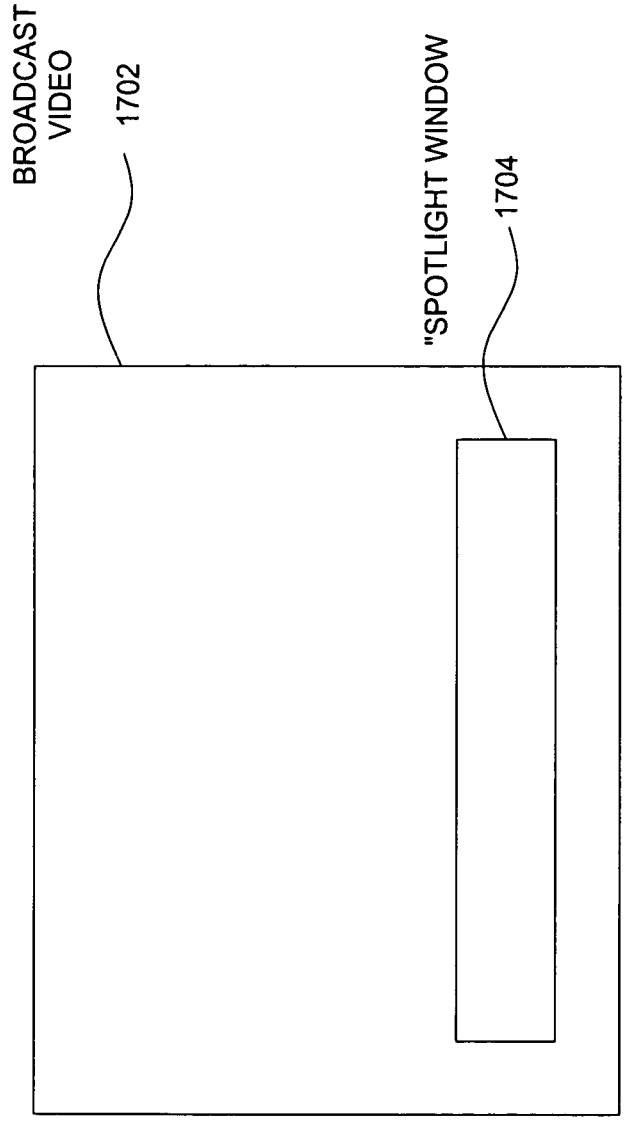
FIG. 17 depicts schematically a spotlight or channel information window overlaying a broadcast video display in accordance with an embodiment of the present invention.

FIG. 17 depicts schematically a spotlight or channel information window 1704 overlaying a broadcast video display 1702 in accordance with an embodiment of the present invention. The spotlight window 1704 is depicted as overlaying part of the lower portion of the screen. However, the spotlight window 1704 may also be overlaid on different portions of the screen. Also, the spotlight window 1704 may be of a different size or shape than depicted.

Prior similar windows have been generated at a set-top terminal 106. The present invention generates such a window at a server in a cable head end 102 or other distribution center. Because the window 1704 is generated at a server in accordance with the present invention, rather than at a terminal, the terminal may be simplified and made less expensively.

In accordance with a preferred embodiment of the present invention, a bitmap for the spotlight window 1704 may be digitally encoded and transmitted from the server to the terminal 106 via an out-of-band channel. In a preferred embodiment, one such a bitmap may be broadcast continually for each broadcast video channel. Alternatively, the bitmaps may be demandcast (sent by the server in response to requests from the terminals), but such an embodiment may have substantial latencies (delays). A terminal 106 (separate from or built into a television) receives and decodes the bitmap, and then overlays the bitmap over the broadcast video 1702.

In accordance with an alternate embodiment of the present invention, a bitmap for the spotlight window 1704 may be sent via an in-band channel. For example, the bitmap may be digitally encoded and multiplexed into a transport stream using an interactive information distribution system 100 like the one described above in relation to FIG. 1. The transport stream is then transmitted via a distribution network 104 to the terminals 106. A terminal 106 capable of receiving the transport stream, retrieving the bitmap, and overlaying the bitmap over broadcast video 1702 is described above in relation to FIG. 2.

A particular button on a remote control may be used to cause the spotlight window 1704 to "pop-up" and overlay the broadcast video 1702. The terminal 106 receives a signal indicating that the button on the remote has been pressed. If bitmaps for the spotlight window 1704 are broadcast continually, then the terminal 106 overlays the appropriate spotlight window 1704 over the broadcast video 1702. Alternatively, if demandcast is used to transmit the spotlight window 1704, then the terminal 106 relays that indication upstream to, for example, the head end system 102. The components within the head end system 102 then sends the appropriate encoded spotlight window 1704 to the terminal 106. The terminal 106 then overlays the window 1704 over the broadcast video 1702.

Figure 18:
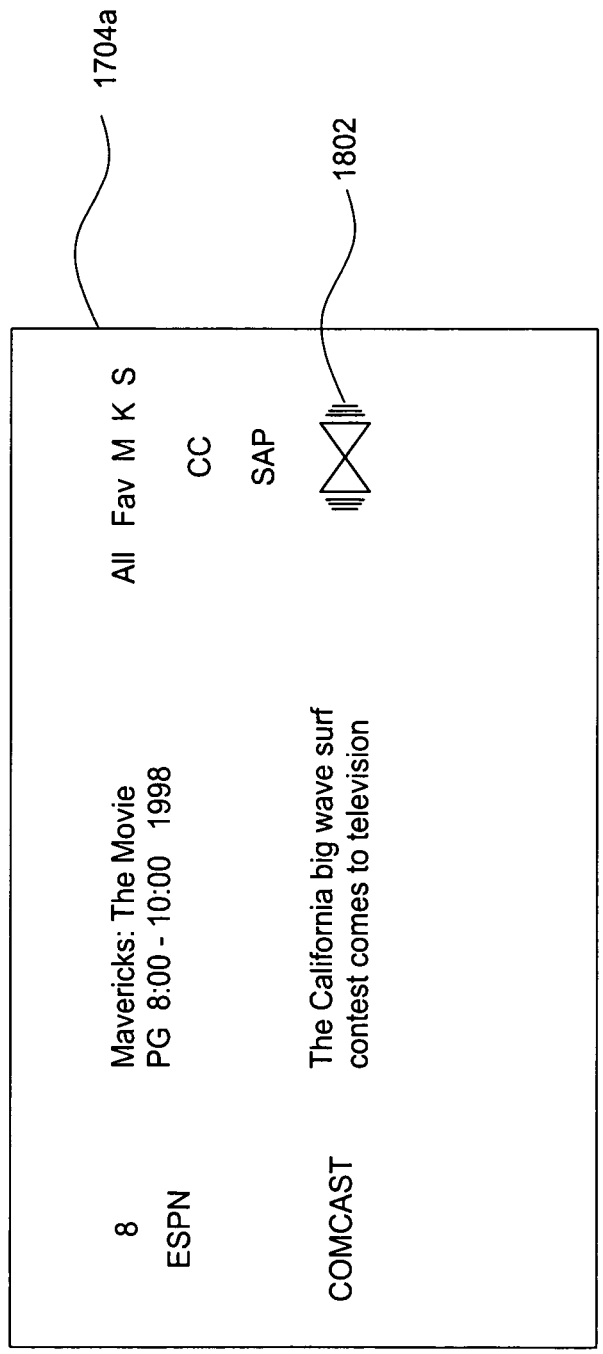
FIG. 18 depicts an example layout for the spotlight or channel information window in accordance with an embodiment of the present invention.

FIG. 18 depicts an example layout 1704a for the spotlight or channel information window in accordance with an embodiment of the present invention. Different layouts are also possible and generally may be within the scope of the present invention.

The example layout 1704a displays channel number (e.g., "8"), broadcast network name (e.g., "ESPN"), and service provider name (e.g., "Comcast"). This information is shown on the left portion of the example layout 1704a, but it may instead be placed at other locations in alternate layouts.

The example layout 1704a also displays a program's title (e.g., "Mavericks: The Movie"), rating (e.g., "PG"), time period (e.g., "8:00-10:00"), copyright or release year (e.g., "1998"), and brief description (e.g., "The California big wave . . . "). This information is shown in the middle portion of the example layout 1704a, but it may instead be placed at other locations in alternate layouts.

In addition, the example layout 1704a displays various modes of operation for the spotlight window 1704. The modes shown include: an "All" or all channels mode, a "Fav" or favorites mode, a "M" or movies mode, a "K" or kids mode, and a "S" or sports mode. These modes are shown in the right portion of the example layout 1704a, but they may instead be placed at other locations in alternate layouts.

Finally, the example layout 1704a includes a close caption icon ("CC"), a secondary audio programming icon ("SAP"), and a stereo icon 1802. The stereo icon 1802 indicates that the program is broadcast in stereo, otherwise the stereo icon does not appear.

Buttons on a remote control may be used to navigate between the modes and among channels within the spotlight window. For example, right and left arrow buttons may be used to select between modes, while up and down arrow buttons may be used to navigate among channels.

In the "All" mode, all channels available to the terminal 106 are navigable from within the spotlight system. For example, a press of the up arrow button on the remote will bring up the channel information for the next higher available channel (e.g., from 8 to 9), and a press of the down arrow button will bring up the channel information for the next lower available channel (e.g., from 8 to 6, if 7 is unavailable).

While the contents of the spotlight window 1704 change, the background broadcast video 1702 remains the same during such navigation (unless or until an "OK" or "Enter" button is pressed, at which point the broadcast video 1702 may change to the channel shown in the spotlight window 1704).

In the "Fav" mode, only channels marked as favorite channels are navigated within the spotlight window 1704. For example, in the Fav mode, a press of the up arrow will bring up the channel information for the next higher favorite channel. Designations of favorite channels may be accomplished by user selection via a portion of the interactive program guide.

Similarly, in the M mode, only movie channels or channels broadcasting movies are navigated. In the K mode, only kids channels or channels broadcasting content appropriate for children are navigated. In the S mode, only sports channels or channels broadcasting sports-related content are navigated. Other modes for other categories of specialized content may also be implemented.

Note that common graphics used by the spotlight window 1704 (such as the background for the window, the spotlight logo, and the various icons including All, Fav, M, K, S, CC, SAP, and the stereo icon) may be stored at the terminal 106. The bitmaps for the non-common information (such as program names, descriptions of programs, rating, time, channel number, and channel name) are rendered (encoded) at the server and sent to the terminal 106.

Figure 19:
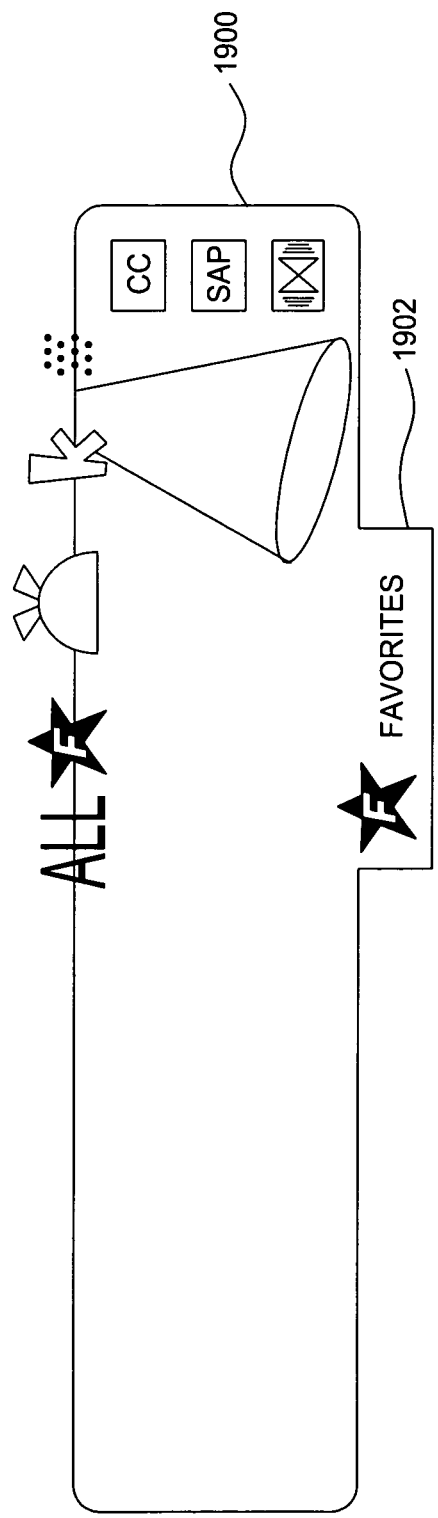
FIG. 19 depicts an illustration that includes common portions of the channel information window in accordance with an embodiment of the present invention.

FIG. 19 depicts an illustration 1900 that includes common portions of the channel information window 1704a in accordance with an embodiment of the present invention. The Favorites pull-down at the bottom of the illustration 1900 is activated when the channel information window is in "Favorites" mode 1902. Similarly, other pull-downs would be visible in other navigation modes.

The above-described technique for navigating among channels does not change the background broadcast video 1702 during navigation among channels within the spotlight window 1704. An alternate or additional technique to navigate among channels involves changing the background broadcast video 1702 to display the broadcast of the channel currently being shown and described in the spotlight window 1704. Changing the broadcast video display may be accomplished, for example, by changing which video packet stream is being decoded and presented. Advantageously, this provides real-time updating of the background broadcast video 1702 in synchronization with the navigation in the spotlight window 1704.

In one embodiment of this alternate or additional technique, a special button on a remote control may be used to navigate in loop fashion amongst a series of channels. For example, in a "Fav" mode, pressing the special button may switch to the next available higher "favorite" channel. When the highest number "favorite" channel is reached, then pressing the special button may switch to the first (lowest number) "favorite" channel. Similarly, the special button may be used to navigate in loop fashion for other navigation modes.

The interactive program guide (IPG) display shown in FIGS. 3A-3C, and variations of this display shown in FIGS. 4, 6A-6C, 8-10, and 12A-12B represent specific designs of the IPG screen. Various other IPG screens can also be designed and are within the scope of the invention. For example, different number of channels, different number of time slots, different objects, and different arrangements of the channels and objects can be provided in the IPG screen.

In accordance with an aspect of the invention, techniques are provided to allow for customization of the IPG (custom-IPG) by a user (i.e., a viewer). The custom-IPG allows each viewer to define and arrange the IPG display according to the viewer's preference, and is highly desirable in providing an enjoyable viewer experience. For example, a particular viewer may want to arrange movies, news, sports, shopping, educational, and other types of channel together. The viewer may further prefer to arrange these channels in a particular layout that the viewer finds pleasing. The selection of the channels and the arrangement of the layout allow the viewer to quickly scan the available programs in the channels normally viewed by the viewer, instead of having to flip through pages and pages of channels in the regular program guide which may be of no interest to the viewer. With the custom-IPG, search time for the desired programs can be reduced, the likelihood of not finding the desired programs among the clutter of programs and channels may be minimized, viewer satisfaction may be enhanced, and other benefits may also be realized.

In accordance with another aspect of the invention, techniques are provided to efficiently generate and deliver the custom-IPG to the viewer, and for the STT to process and display the custom-IPG. With certain embodiments of the invention, the viewer can elect to view either the custom-IPG or the regular IPG (both of which are generated at the head end in accordance with an aspect of the invention). With certain other embodiments, the viewer can simultaneously view the custom-IPG overlaid on a program video.

The ability to create, render, and deliver the custom-IPG in an efficient manner becomes more important as the number of available programs and channels continues to grow (e.g., to hundred of channels or more) due to, for example, data compression, increased system bandwidth, and other factors.

Figure 20:
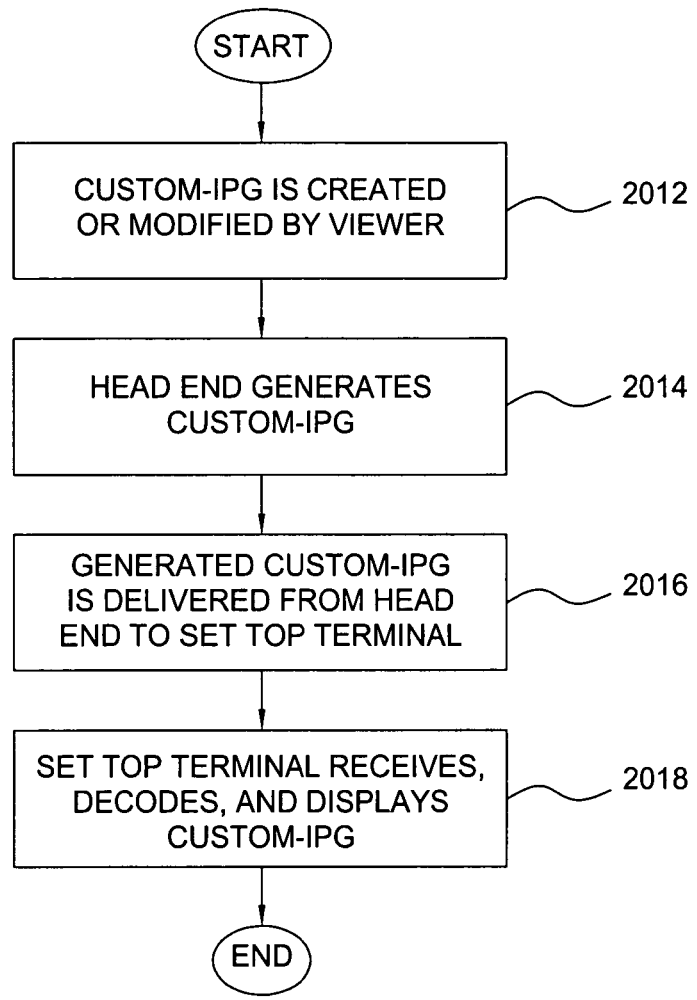
FIG. 20 is a simplified flow diagram of a specific embodiment of a process to provide custom-IPG.

FIG. 20 is a simplified flow diagram of an embodiment of a process to provide a custom-IPG. Initially, the custom-IPG is created or modified by a viewer, at step 2012. Various mechanisms can be used to facilitate the creation and modification of the custom-IPG, as described below. Once the custom-IPG has been defined or updated, it is generated at the head end, at step 2014. Various data structures and encoding schemes can be used to efficiently generate the custom-IPG. In an embodiment, the custom-IPG is stored for the viewer at the head end. The generated custom-IPG is then delivered from the head end to the STT, at step 2016. Various mechanisms can be used to efficiently deliver the custom-IPG, again as described below. The custom-IPG can be delivered when requested by the viewer or on an independent channel. The STT then receives, processes, and displays the custom-IPG, at step 2018.

Creating/Modifying the Custom-IPG

FIG. 21 is a flow diagram of a specific embodiment of a process for creating or modifying a custom-IPG. In this embodiment, the viewer initially selects to display the regular IPG screen (e.g., IPG screen 300A in FIG. 3A), at step 2112. This can be achieved, for example, by pressing a "Menu" key on remote control unit 280. In response, the regular IPG screen is processed and displayed on a monitor, a television, or some other display device, at step 2114.

The viewer then initiates the customization process to create or modify the custom-IPG, at step 2122. Various mechanisms to initiate the custom-IPG can be implemented and are within the scope of the invention. In one implementation, to create or modify a custom-IPG, the viewer highlights the "Favorites" object on the regular IPG screen. In another implementation, a "Customize" object or some other object can be provided on the regular IPG screen to allow for entry into the custom-IPG environment. In yet another implementation, a special button on remote control unit 280 can be used to initiate the custom-IPG process.

In an embodiment, after the custom-IPG process is initiated (e.g., by highlighting the "Favorites" or "Customize" object), a pop-up menu is provided to assist the viewer with the customization process, at step 2124. This pop-up menu can be a spotlight window generated and delivered, for example, in the manner described above in reference to FIGS. 17 and 18. The pop-up menu includes a set of objects that can be manipulated (e.g., highlighted or selected) by the viewer to create and modify the custom-IPG.

At step 2126, the process waits for a selection from the viewer. The viewer can elect to perform any one of a number of allowed functions such as, for example: (1) select a desired channel for inclusion in the custom-IPG, (2) remove an undesired channel from the custom-IPG, (3) change the location of one or more channels in the custom-IPG, (4) arrange the channels in the custom-IPG, (5) arrange the layout of the custom-IPG screen, and others. Upon receipt of a viewer selection, a determination is made of the particular selection made by the viewer, at step 2128.

If the viewer's selection is to add a channel to the custom-IPG, the process waits for the viewer's selection of a particular channel or a set of channels to be included in the custom-IPG, at step 2132. The viewer can enter a channel selection, for example, by toggling a channel provided on the display (e.g., if the regular IPG is also displayed concurrent with the pop-up menu), by entering the desired channel (e.g., with the remote control unit), or by some other mechanism. The selected channel(s) are then included in the custom-IPG, at step 2134. The process then returns to step 2126 and waits for another viewer selection.

Back at step 2128, if the viewer's selection is to remove a channel from the custom-IPG, the process waits for the viewer's selection of a particular channel or a set of channels to be removed from the custom-IPG, at step 2142. Again, the viewer can enter a channel selection, for example, by toggling a channel provided on the screen, entering the channel with the remote control unit, or by some other mechanism. The selected channel(s) are then removed from the custom-IPG, at step 2144. The process then returns to step 2126 and waits for another viewer selection.

Back at step 2128, if the viewer's selection is to change the location of a channel in the custom-IPG, the process waits for the viewer's selection of a particular channel or a set of channels to be rearranged in the custom-IPG, at step 2152. Again, the viewer can enter a channel selection, for example, by highlighting a channel provided on the screen. The selected channel(s) can then be moved about the screen, for example, by using the left, right, up, and down arrows on the remote control unit. Other mechanisms can also be used to move the selected channels, such as specifying a particular coordinate for the selected channel(s). The selected channel(s) are then moved to the indicated location in the custom-IPG, at step 2154. The process then returns to step 2126 and waits for another viewer selection.

Back at step 2128, if the viewer's selection is to exit the custom-IPG menu, the process terminates.

Buttons on the remote control unit can be used to assist with the customization of the IPG. As these buttons are depressed, the STT can receive the selections and forward them to the head end. The head end then updates the pop-up menu and/or the custom-IPG screen and sends them back to the STT for decoding and display.

The custom-IPG screen can be updated as the viewer performs the customization. In one specific implementation, upon the initiation of each action by the viewer (e.g., the selection of a set of channels for inclusion or exclusion in the custom-IPG, the movement of a set of channels to a new location in the custom-IPG screen, and so on) a command is sent to the head end. In response to the received command, the head end re-renders the custom-IPG and sends the re-rendered custom-IPG back to the STT for display. In this manner, the viewer is able to view the results of the viewer's selection and can further modify as desired. This allows for an interactive customization session.

In an embodiment, the viewer's custom-IPG screen is formed as a subset of the regular IPG screen. Upon receiving the viewer selection, the head end generates the custom-IPG screen. This can be achieved, for example, by removing the non-selected channels from the regular IPG screen and forming a smaller IPG screen for the requesting viewer. In another embodiment, the custom-IPG is formed as a new screen having the contents (e.g., channels) selected by the viewer and arranged in a particular layout also selected by the viewer.

Other mechanisms can also be used to create and modify the custom-IPG. For example, instead of being provided with a pop-up menu, a "customization" region can be provided (in additional to the guide and image regions described above) to allow for creation and modification of the custom-IPG. The customization region can be easily implemented, for example, with a "Customize" object provided on the regular IPG screen. In this implementation, the customization region can be activated by selecting the Customize object.

Once the customization region is active, the keys in the remote control unit 280 can be used to select (i.e., add) and de-select (i.e., remove) channels from the custom-IPG. Initially, the current custom-IPG is displayed, or the regular IPG screen is displayed if no custom-IPG has been created. The viewer can then simply scroll through the displayed IPG screen and add/remove channels by hitting, for example, the add/remove button on the remote control unit 280. To add a channel that has been previously removed, the viewer can, for example, enter the desired channel number with the numeric keypad in the remote control unit and hit the add/remove button. Upon completion of the customization, the viewer can exit from the customization region, for example, by highlighting an "Exit Customization" object, which can be formed at the same location as the Customize object. Alternatively, the viewer can exit from the customization region via a special key (e.g., an "exit" key) on the remote control unit.

Thus, as can be seen from the above description, various mechanisms can be used to support the creation and modification of the custom-IPG. FIG. 21 and the above description depict two specific embodiments of the process for creating and modifying the custom-IPG. Others mechanisms can also be implemented and are within the scope of the invention.

Using the customization process described above, a viewer can also re-arrange the program guide based on the viewer's preference. The modification of the custom-IPG can be performed dynamically, and in any desired order and subset. The custom-IPG allows the viewer to select a small subset of the (hundreds of) available channels and to organize the selected channels in a viewer friendly arrangement. The custom-IPG screens for a particular viewer can be rendered, composed, formatted, and stored at the head end in a profile for the viewer.

Generating the Custom-IPG

In accordance with an aspect of the invention, the custom-IPG is generated at the head end and provided to the STT. This reduces the complexity and costs of the STT. Moreover, implementation of the custom-IPG at the head end allows for support of new features as they become available, without having to replace the STT.

In an embodiment, the viewer's custom-IPG can be overlaid on the program being viewed at the time of the selection to view the custom-IPG. The generation of the new screens can be achieved at the head end, when requested, by overlaying the custom-IPG on the current program. The generated screens with the overlaid custom-IPG can then be sent to the STT for display.

Various data structures can be used to efficiently encode the video screens having the custom-IPG overlaid thereon. Each custom-IPG screen overlaid on a video sequence results in a corresponding (and different) output video sequence. Multiple output video sequences are generated for multiple custom-IPG screens. These output video sequences have a common video portion but different custom-IPG portions. The redundant common video portion can be removed from processing to simplify the encoding process and to reduce the amount of data needed to represent the output video sequences.

The output video sequences with the overlaid custom-IPG screens can be represented with a matrix representation. Each column of the matrix can represent a group of pictures (GOP) corresponding to the video sequence with a particular custom-IPG screen overlaid on it. Typically, only the video portion changes with time and the custom-IPG portion does not change over the period of interest (i.e., the GOP).

In one data structure, the first picture in each GOP is encoded as an I-picture. The remaining pictures in one of the GOPs are encoded as a sequence of P- and B-pictures, which is referred to as a "base PID". The encoded I-pictures and the base PID are sent to the STT. To view a particular custom-IPG screen, the I-picture for the output video sequence with that custom-IPG screen is decoded, and the base PID is also decoded. The video portion from the decoded based PID is combined with the custom-IPG portion from the decoded I-picture to generate the desired output video sequence.

In another data structure, the first picture in one of the GOPs is encoded as an I-picture and the first picture in each of the remaining GOPs is encoded as a difference picture. The remaining pictures in the GOP with the encoded I-picture are encoded as a sequence of P- and B-pictures, i.e., the base PID. The encoding of the first pictures as difference pictures further reduces the amount of data to be transmitted.

In yet another data structure, a minimum number of pictures required to construct the video sequence and the custom-IPG screens is encoded. For example, if 15 custom-IPG screens are generated (and transmitted using 15 GOPs) and if each GOP includes 15 pictures, only the diagonal elements in the matrix need to be encoded. Each encoded element would include one of the custom-IPG screens and one of the pictures in the video sequence. The selected custom-IPG screen can be generated at the STT by decoding and combining the pictures from the proper rows and columns of the matrix.

The generated output video sequences can also be efficiently multiplexed into a transport stream. In one embodiment, referred to as a "ganging structure", each output video sequence is sent via a respective PID. Three video PIDs (or a different number of video PIDs) can be combined with one audio PID and one data PID into a transport stream. As many transport streams are generated as needed to send the required number of output video sequences. The ganging structure and other efficient structures are described in detail in the aforementioned U.S. patent application Ser. No. 09293,526.

Delivering the Custom-IPG

Various delivery mechanisms can be used to deliver the custom-IPG to the STT such that increased bandwidth efficiency is obtained and viewer interaction is improved (i.e., decreased system response latency). Some of these delivery mechanisms are described below.

In a specific embodiment, the head end overlays the custom-IPG on the program being viewed at the time of the viewer request to view the custom-IPG. Since the rendered custom-IPG screens are stored at the head end, upon receiving the viewer request to view the custom-IPG, the head end can overlay these custom-IPG screens on any particular program and deliver the resultant video sequence to the STT. The viewer can subsequently remove the custom-IPG overlay at any time by various mechanisms such as, for example, the toggle off functionality in the STT remote control. In response to the toggle off command, the head end can remove the custom-IPG overlay and send the unmodified program to the STT.

In the above embodiment, the viewer can also define the overlay position by sending the desired overlay coordinates to the head end. The desired coordinates may be expressed using, for example, the numeric keys on the remote control unit, the arrow keys, some other buttons available on the remote control unit (e.g., the move left and move right buttons), or some other mechanisms. Upon receiving the viewer request, the head end re-composites the custom-IPG and the video sequence and provides the new video sequence to the STT.

In another embodiment, the custom-IPG is provided on a channel that is independent of the channels used to carry the regular programming and program guide. This embodiment is particularly advantageous when the custom-IPG offers functionality related to an interactive service such as, for example, home shopping network. In this embodiment, the custom-IPG can be delivered to the viewer on one or more PIDs in one or more transport streams. Via the dedicated channel(s) assigned to the custom-IPG, the viewer may be able to interact with the head end with less delays.

In yet another embodiment, the custom-IPG is multiplexed and sent in the same channel used to provide the regular IPG. This embodiment conserves bandwidth while allowing the viewer to view the desired IPG. In this embodiment, the viewer can toggle between the custom-IPG and the regular IPG (i.e., via a toggle button on the remote control unit). In response, the head end delivers the viewer selected (custom or regular) IPG to the STT for decoding and display.

Decoding the Custom-IPG

One or more video decoders can be used at the STT to decode the video sequences having the custom-IPG screens overlaid thereon. To reduce the processing delays, multiple decoders can be used to decode the selected custom-IPG screen. The decoders may also be directed to decode custom-IPG screen(s) anticipated to be viewed by the viewer, thereby reducing the delays if and when the viewer does select such screen(s). Multiple decoders can thus be used to increase the parallel processing and efficiency of the receiving STT.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus comprising:
  a video session manager located at a server and configured to receive selections comprising:

a set of channels to be identified in a custom interactive program guide (custom-IPG), and
a customized layout of the custom-IPG, wherein the customized layout comprises an arrangement of the set of channels in a particular layout;
one or more encoders configured to encode the custom-IPG identifying the set of channels; and
a modulator configured to generate an output signal comprising the custom-IPG for transmission on a communication channel, wherein:
the video session manager is configured to receive a request for controlling which of the custom-IPG or a regular IPG is provided on the communication channel; and
the modulator is configured to alternate between providing the custom-IPG and the regular IPG on the communication channel each time the request is received.

2. The apparatus of claim 1, wherein:
the video session manager is configured to receive a command indicative of x-y coordinates for a particular location at which to overlay the custom-IPG;
the one or more encoders are configured to re-render the custom-IPG at the particular location indicated by the received command; and
the modulator is configured to generate a second output signal comprising the re-rendered custom-IPG.

3. The apparatus of claim 1, wherein the custom-IPG is transmitted concurrently on the communication channel with at least a portion of a video sequence.

4. The apparatus of claim 1, wherein the communication channel also transports video content.

5. The apparatus of claim 1, wherein:
the video session manager is configured to receive a second request to turn off the custom-IPG; and
the one or more encoders are configured to provide a video sequence on the communication channel without the custom-IPG responsive to the second request.

6. The apparatus of claim 1, wherein the modulator is configured to provide the custom-IPG on the communication channel, wherein the communication channel is independent of channels used to carry video content and program guides.

7. The apparatus of claim 1, wherein the custom-IPG is formed as a subset of the regular IPG.

8. The apparatus of claim 1, further comprising a memory configured for storing the custom-IPG.

9. The apparatus of claim 8, wherein the custom-IPG is stored as part of a viewer profile.

10. An apparatus comprising:
a processor; and
a memory storing executable instructions that, when executed by the processor, cause the apparatus at least to:
activate a program guide customization process;
present a menu comprising functions provided to assist in the customization process and a set of objects that can be manipulated to create and modify a custom interactive program guide (custom-IPG);
receive a first selection of a set of channels to be identified in the custom-IPG;
receive a second selection for a customized layout of the custom-IPG, wherein the customized layout comprises an arrangement of the set of channels in a particular layout; and
dynamically transmit the first selection of the set of channels to be identified in the custom-IPG to a server;
receive, on a communication channel, the custom-IPG identifying the set of channels; and
communicate a request for controlling the server to alternate between the custom-IPG or a regular IPG being provided on the communication channel.

11. The apparatus of claim 10, wherein the custom-IPG has the set of channels in the customized layout.

12. The apparatus of claim 10 wherein activating the program guide customization process is achieved by detecting highlighting of a particular object provided on the regular IPG.

13. The apparatus of claim 10, wherein activating the program guide customization process is achieved based on receiving a command from a remote control unit.

14. The apparatus of claim 10, wherein the menu is generated at the server.

15. The apparatus of claim 10, wherein the menu is an overlay.

16. The apparatus of claim 10, wherein receiving the first selection of the set of channels is achieved based on detecting highlighting of objects rendered in the menu.

17. A method comprising:
receiving, by a server, a first selection indicative of a set of channels to be identified in a custom interactive program guide (custom-IPG);
receiving, by the server, a second selection of a customized layout of the custom-IPG, wherein the customized layout comprises an arrangement of the set of channels in a particular layout;
generating, by the server, the custom-IPG identifying the set of channels;
subsequent to receiving a first request for the custom-IPG, dynamically overlaying, by the server, the custom-IPG on a video sequence to generate a dynamically modified video sequence;
providing the dynamically modified video sequence on a communication channel; and
receiving a second request for alternating between which of the custom-IPG or a regular IPG is provided on the communication channel.

18. A memory storing computer readable instructions that, when executed, cause an apparatus at least to:
activate a program guide customization process;
receive a menu comprising functions provided to assist in the customization process, and a set of objects that can be manipulated to create and modify a custom interactive program guide (custom-IPG);
receive a first selection of a set of channels to be identified in the custom-IPG;
receive a second selection of a customized layout of the custom-IPG;
dynamically transmit the second selection of the customized layout of the custom-IPG and the first selection of the set of channels to be identified in the custom-IPG to a server;
dynamically receive, on a communication channel, the custom-IPG identifying the set of channels; and
communicate a request for controlling the server to alternate between the custom-IPG or a regular IPG being provided on the communication channel.

19. The apparatus of claim 1, further comprising a transport multiplexer configured to generate add-on content from a third party, wherein the add-on content comprises a real-time advertisement or HTML pages for electronic commerce.

20. The apparatus of claim 12, wherein the menu is generated in response to the highlighting of the particular object.

21. A method comprising:
receiving selections at a video session manager located at one or more servers, the selections comprising:

a set of channels to be identified in a custom interactive program guide (custom-IPG), and a customized layout of the custom-IPG, wherein the customized layout comprises an arrangement of the set of channels in a particular layout;

encoding, at the one or more servers, the custom-IPG identifying the set of channels; and generating, at the one or more servers, an output signal comprising the custom-IPG for transmission on a communication channel;

receiving, at the one or more servers, a request for controlling which of the custom-IPG or a regular IPG is provided on the communication channel; and alternating between providing, from the one or more servers, the custom-IPG and the regular IPG on the communication channel each time the request is received.

22. A method comprising:

activating, at a computing device, a program guide customization process;

presenting, by the computing device, a menu comprising functions provided to assist in the customization process and a set of objects that can be manipulated to create and modify a custom interactive program guide (custom-IPG);

receiving, at the computing device, a first selection of a set of channels to be identified in the custom-IPG;

receiving, at the computing device, a second selection for a customized layout of the custom-IPG, wherein the customized layout comprises an arrangement of the set of channels in a particular layout; and transmitting, dynamically from the computing device, the first selection of the set of channels to be identified in the custom-IPG to a server;

receiving, at the computing device over a communication channel, the custom-IPG identifying the set of channels; and communicating, from the computing device, a request for controlling the server to alternate between the custom-IPG or a regular IPG being provided on the communication channel.

* * * * *